(12) United States Patent
Nishida et al.

(10) Patent No.: US 8,677,860 B2
(45) Date of Patent: Mar. 25, 2014

(54) TRANSMISSION

(75) Inventors: Hisato Nishida, Wako (JP); Kazuma Hatakeyama, Wako (JP); Akira Fujimura, Wako (JP); Shuichi Fujimoto, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 361 days.

(21) Appl. No.: 13/126,582

(22) PCT Filed: Nov. 13, 2009

(86) PCT No.: PCT/JP2009/069322
§ 371 (c)(1),
(2), (4) Date: Apr. 28, 2011

(87) PCT Pub. No.: WO2010/055905
PCT Pub. Date: May 20, 2010

(65) Prior Publication Data
US 2011/0203409 A1 Aug. 25, 2011

(30) Foreign Application Priority Data

Nov. 14, 2008 (JP) .................................. 2008-292232
Nov. 25, 2008 (JP) .................................. 2008-299340
Jan. 30, 2009 (JP) .................................. 2009-019880
Apr. 3, 2009 (JP) .................................. 2009-091356

(51) Int. Cl.
*F16H 37/06* (2006.01)

(52) U.S. Cl.
USPC ..................................................... 74/665 B

(58) Field of Classification Search
USPC ............... 74/325, 329, 330, 331, 340, 665 A, 74/665 B, 665 F, 665 G
See application file for complete search history.

(56) References Cited

U.S. PATENT DOCUMENTS 4,565,106 A * 1/1986 Sumiyoshi ........................ 74/359
4,566,348 A * 1/1986 Akashi et al. .................... 74/359

(Continued)

FOREIGN PATENT DOCUMENTS

CN 101275626 A 10/2008
JP 59-126140 A 7/1984

(Continued)

OTHER PUBLICATIONS

Chinese Office Action dated Jun. 21, 2013, issued in corresponding Chinese Patent Application No. 200980145148.1 (5 pages).

(Continued)

*Primary Examiner* — Ha D Ho
*Assistant Examiner* — Jude Agendia
(74) *Attorney, Agent, or Firm* — Westerman, Hattori, Daniels & Adrian, LLP

(57) ABSTRACT

A transmission is provided in which gears (31 to 34) of a first gear group provided on a first auxiliary input shaft (13) to which driving force of a main input shaft (12) is transmitted via a first clutch (24) and gears (37 to 39) of a second gear group provided on a second auxiliary input shaft (14) to which the driving force of the main input shaft (12) is transmitted via an idle gear (17 to 19) and a second clutch (25) use in common gears (43 to 46) of a third gear group provided on an output shaft (16), whereby it becomes possible to cut the number of components and reduce the dimensions of the transmission. Further, since the advance/retard relationship between the timing with which the first and second clutches (24, 25) are switched over and the timing with which the synchronizing devices (35, 36, 41, 42) are switched over can be freely chosen when establishing any of the gear positions, it is possible to prevent the occurrence of shift shock due to timing lag, thus enabling gear shifting to be carried out smoothly.

6 Claims, 78 Drawing Sheets

(56) References Cited

U.S. PATENT DOCUMENTS

| | | | |
|---|---|---|---|
| 4,576,063 A * | 3/1986 | Akashi et al. | 74/745 |
| 5,573,471 A * | 11/1996 | Shubinsky et al. | 475/207 |
| 6,332,371 B1 * | 12/2001 | Ohashi et al. | 74/331 |
| 6,427,547 B1 | 8/2002 | Bowen | |
| 6,494,110 B2 * | 12/2002 | Hatakeyama | 74/331 |
| 6,634,247 B2 * | 10/2003 | Pels et al. | 74/329 |
| 6,679,134 B2 * | 1/2004 | Shigyo | 74/336 R |
| 6,712,734 B1 | 3/2004 | Loeffler | |
| 7,066,043 B2 * | 6/2006 | Kim et al. | 74/330 |
| 7,121,162 B2 * | 10/2006 | Hatakeyama et al. | 74/360 |
| 7,141,162 B2 * | 11/2006 | Garner et al. | 210/202 |
| 7,357,047 B2 * | 4/2008 | Hori | 74/329 |
| 7,610,826 B2 * | 11/2009 | Endo et al. | 74/331 |
| 2001/0035060 A1 * | 11/2001 | Hatakeyama | 74/330 |
| 2002/0033062 A1 * | 3/2002 | Obinata | 74/410 |
| 2003/0056612 A1 | 3/2003 | Katakura | |
| 2003/0183028 A1 * | 10/2003 | Shimaguchi | 74/329 |
| 2003/0187561 A1 * | 10/2003 | Shimaguchi | 701/51 |
| 2007/0028718 A1 * | 2/2007 | Lee et al. | 74/661 |
| 2007/0068294 A1 * | 3/2007 | Buck et al. | 74/325 |
| 2007/0240531 A1 * | 10/2007 | Endo et al. | 74/331 |
| 2008/0098838 A1 * | 5/2008 | Seo | 74/340 |
| 2009/0199666 A1 * | 8/2009 | Yang et al. | 74/331 |

FOREIGN PATENT DOCUMENTS

| | | |
|---|---|---|
| JP | 61-274148 A | 12/1986 |
| JP | 61-274150 A | 12/1986 |
| JP | 61-274151 A | 12/1986 |
| JP | 9-193676 A | 7/1997 |
| JP | 2001-107827 A | 4/2001 |
| JP | 2002-364718 A | 12/2002 |
| JP | 2003-94963 A | 4/2003 |
| JP | 2004-263708 A | 9/2004 |
| JP | 2005-329813 A | 12/2005 |
| JP | 3733893 B2 | 1/2006 |
| JP | 2007-55591 A | 3/2007 |
| JP | 2007-225040 A | 9/2007 |
| JP | 2007-246057 A | 9/2007 |
| JP | 2008-143443 A | 6/2008 |
| JP | 2009-1077 A | 1/2009 |
| WO | 2004/063596 A1 | 7/2004 |

OTHER PUBLICATIONS

International Search Report of PCT/JP2009/069322, mailing date Dec. 28, 2009.
Japanese Office Action dated Nov. 28, 2012, issued in corresponding Japanese patent application No. 2009-105949.
Japanese Notice of Allowance dated Nov. 7, 2012, issued in corresponding Japanese patent application No. 2008-292232.

* cited by examiner

7TH

WHEN DRIVING AUXILIARY EQUIPMENT BY MEANS OF MOTOR/GENERATOR

FIG.21 — WHEN ESTABLISHING FIRST SPEED GEAR POSITION

WHEN ESTABLISHING SECOND SPEED GEAR POSITION

WHEN ESTABLISHING THIRD SPEED GEAR POSITION

WHEN ESTABLISHING FOURTH SPEED GEAR POSITION

WHEN ESTABLISHING FIFTH SPEED GEAR POSITION

WHEN ESTABLISHING SIXTH SPEED GEAR POSITION

WHEN ESTABLISHING REVERSE GEAR POSITION

WHEN CARRYING OUT REGENERATIVE BRAKING IN SIXTH SPEED GEAR POSITION

WHEN CHARGING BY MEANS OF DRIVING FORCE OF ENGINE

FIRST SPEED GEAR POSITION (LOW)

SECOND SPEED GEAR POSITION (2ND)

THIRD SPEED GEAR POSITION (3RD)

FOURTH SPEED GEAR POSITION (4TH)

FIFTH SPEED GEAR POSITION (5TH)

SIXTH SPEED GEAR POSITION (6TH)

REVERSE GEAR POSITION (RVS)

FIRST SPEED GEAR POSITION (LOW)

SECOND SPEED GEAR POSITION (2ND)

THIRD SPEED GEAR POSITION (3RD)

FOURTH SPEED GEAR POSITION (4TH)

FIFTH SPEED GEAR POSITION (5TH)

SIXTH SPEED GEAR POSITION (6TH)

SEVENTH SPEED GEAR POSITION (7TH)

REVERSE GEAR POSITION (RVS)

TRANSMISSION

TECHNICAL FIELD

The present invention relates to a so-called twin clutch type transmission in which the driving force of a main input shaft connected to an engine is selectively distributed between first and second auxiliary input shafts via first and second clutches.

BACKGROUND ART

As a twin clutch type transmission with eight forward speeds, one described in Patent Document 1 below is known. This transmission has a small number of components and is compact, but since making the proportions between gear position ratios basically uniform cannot be avoided, there is the problem that there is no degree of freedom in setting ratios that achieve a balance between gear shift performance when starting and fuel economy when traveling at high speed. As another embodiment, one in which two supplementary sets of gears that are thought to be for ratio adjustment are added is disclosed, but because of this the overall length of the transmission increases and, moreover, there is the problem that the ratios of a first speed gear position and an eighth speed gear position cannot be adjusted independently. Moreover, since there are two more gears meshing at the highest speed position for all of those described in Patent Document 1, there is the problem that it is disadvantageous in terms of improving fuel economy, which is the original purpose of having multiple stages.

Furthermore, Patent Document 2 below proposes a transmission in which the number of gears meshing at the highest speed position is decreased, but since this has a large number of components, the overall length increases, and there is the problem that it is difficult to reduce the weight and make it compact.

Moreover, in the other embodiment of Patent Document 1 and one of Patent Document 2, since a universal joint mechanism provided on one of a main shaft and a countershaft and a drive gear provided on the other are disposed adjacently, in order to avoid interference therebetween it is necessary to either increase the distance between the two shafts or increase the axial dimension, and there is the problem that it becomes more difficult to reduce the weight and make the transmission compact.

Patent Document 1: Japanese Patent No. 3733893
Patent Document 2: Japanese Patent Application Laid-open No. 2007-225040

DISCLOSURE OF INVENTION

Problems to be Solved by the Invention

Above all, in the arrangement described in Patent Document 1 above, when carrying out a gear shift between a fourth speed gear position and a fifth speed gear position, since it is necessary to switch one of the two clutches from engage→disengage, switch the other from disengage→engage, switch one of the two synchronizing devices from connection→disconnection, and switch the other from disconnection→connection, if the timing is only slightly displaced, there is the problem that it becomes difficult to carry out a smooth gear shift.

That is, when shifting up from the fourth speed gear position to the fifth speed gear position, if switching of the two synchronizing devices is not completed at the instant that switching of the two clutches is completed, there is a possibility that a third speed gear position might be established momentarily; conversely, if switching of the two synchronizing devices is completed before switching of the two clutches is completed, there is a possibility that a sixth speed gear position might be established momentarily, and there is a possibility of the occurrence of shift shock.

The present invention has been accomplished in light of the above-mentioned circumstances, and it is an object thereof to enable smooth gear shifting for a twin clutch type transmission.

Means for Solving the Problems

In order to attain the above object, according to a first aspect of the present invention, there is provided a transmission comprising a main input shaft into which driving force of an engine is inputted, a first auxiliary input shaft disposed coaxially with the main input shaft and selectively connected to the main input shaft via a first clutch, a second auxiliary input shaft disposed in parallel to the main input shaft and selectively connected to the main input shaft via a second clutch, an output shaft disposed in parallel to the main input shaft and transmitting the driving force to a driven wheel, an idle shaft disposed in parallel to the main input shaft and supporting a reverse idle gear, a first gear group comprising a plurality of gears disposed on the first auxiliary input shaft and selectively connected to the first auxiliary input shaft via a synchronizing device, a second gear group comprising a plurality of gears disposed on the second auxiliary input shaft and selectively connected to the second auxiliary input shaft via a synchronizing device, and a third gear group comprising a plurality of gears connected to the output shaft and meshing with the gears of the first gear group and the gears of the second gear group, the gears of the third gear group being used in common by the gears of the first gear group and the gears of the second gear group, and an idle gear for transmitting the driving force from the main input shaft to the second auxiliary input shaft being supported on the idle shaft.

Further, according to a second aspect of the present invention, in addition to the first aspect, the first clutch is disposed on the first auxiliary input shaft, the second clutch is disposed on the second auxiliary input shaft, and the second clutch transmits the driving force of the main input shaft to the second auxiliary input shaft via the idle gear.

Furthermore, according to a third aspect of the present invention, in addition to the second aspect, the first and second clutches are disposed on end parts, on the opposite side to the engine, of the first and second auxiliary input shafts.

Moreover, according to a fourth aspect of the present invention, in addition to any one of the first to third aspects, either one of the first reverse idle gear supported on the idle shaft and meshing with any gear of the third gear group or the second reverse idle gear supported on the idle shaft and meshing with a gear fixedly provided on the first auxiliary input shaft freely engages with and disengages from the idle shaft.

Further, according to a fifth aspect of the present invention, in addition to the fourth aspect, the first reverse idle gear meshes, among the gears of the third gear group, with a gear at the lowest gear position.

Furthermore, according to a sixth aspect of the present invention, in addition to any one of the first to fifth aspects, a main clutch is disposed between the main input shaft and the first and second clutches, and a motor/generator is connected in a power transmission path from the main clutch to the first and second clutches.

A first synchronizing device 35, a second synchronizing device 36, a third synchronizing device 41, and a fourth synchronizing device 42 of the embodiment correspond to the synchronizing device of the present invention, and a first speed-second speed-reverse driven gear 43 of the embodiment corresponds to the gear at the lowest gear position of the present invention.

Effects of the Invention

In accordance with the first aspect of the present invention, since the gears of the first gear group provided on the first auxiliary input shaft to which the driving force of the main input shaft is transmitted via the first clutch and the gears of the second gear group provided on the second auxiliary input shaft to which the driving force of the main input shaft is transmitted via the second clutch use in common the gears of the third gear group provided on the output shaft, due to the gears being used in common it becomes possible to cut the number of components and reduce the dimensions of the transmission. Moreover, since the idle shaft is used in common for supporting the reverse gear and supporting the idle gear, it becomes possible to further cut the number of components and further reduce the dimensions of the transmission. Furthermore, since the advance/retard relationship between the timing with which the first and second clutches are switched over and the timing with which the synchronizing devices are switched over can be freely chosen when establishing any of the gear positions, it is possible to prevent the occurrence of shift shock due to timing lag, thus enabling gear shifting to be carried out smoothly.

Furthermore, in accordance with the second aspect of the present invention, since the first clutch is disposed on the first auxiliary input shaft, the second clutch is disposed on the second auxiliary input shaft, and the second clutch transmits the driving force of the main input shaft to the second auxiliary input shaft via the idle gear, selectively engaging the first and second clutches enables the first and second auxiliary input shafts to be selectively driven at different rotational speeds. Moreover, since the first and second clutches are separated, not only is it possible to reduce the axial dimension of the transmission by disposing them in the same plane, but it is also possible to use a clutch having a general structure without any modification, thus contributing to a reduction in cost.

Moreover, in accordance with the third aspect of the present invention, since the first and second clutches are disposed on end parts of the first and second auxiliary input shafts on the opposite side to the engine, it is possible to carry out maintenance of the first and second clutches easily without interference from the engine or the main input shaft.

Furthermore, in accordance with the fourth aspect of the present invention, a reverse gear position can be established by connecting to the idle shaft either one of the first reverse idle gear supported on the idle shaft and meshing with any gear of the third gear group and the second reverse idle gear supported on the idle shaft and meshing with the gear fixedly provided on the first auxiliary input shaft. In this way, since the reverse gear position is established via the gear fixedly provided on the first auxiliary input shaft without going through the gear of the first gear group supported on the first auxiliary input shaft and meshing with the gear of the third gear group, it is possible to reduce the axial dimension of the transmission by eliminating the synchronizing device on the output shaft.

Moreover, in accordance with the fifth aspect of the present invention, since the first reverse idle gear meshes, among the gears of the third gear group, with the gear at the lowest gear position it is possible to easily ensure a reduction ratio for the reverse gear position.

Furthermore, in accordance with the sixth aspect of the present invention, since the main clutch is disposed between the main input shaft and the first and second clutches, and the motor/generator is connected in the power transmission path from the main clutch to the first and second clutches, it becomes possible to carry out traveling by means of the driving force of the engine, traveling by means of the driving force of the motor/generator, traveling by the driving force of both the engine and the motor/generator, power generation by the motor/generator during traveling by means of the driving force of the engine, and power generation by regenerative braking of the motor/generator, and all of the functions of a hybrid vehicle can be exhibited for all gear positions without increasing the axial dimension of the transmission.

Figure 1:
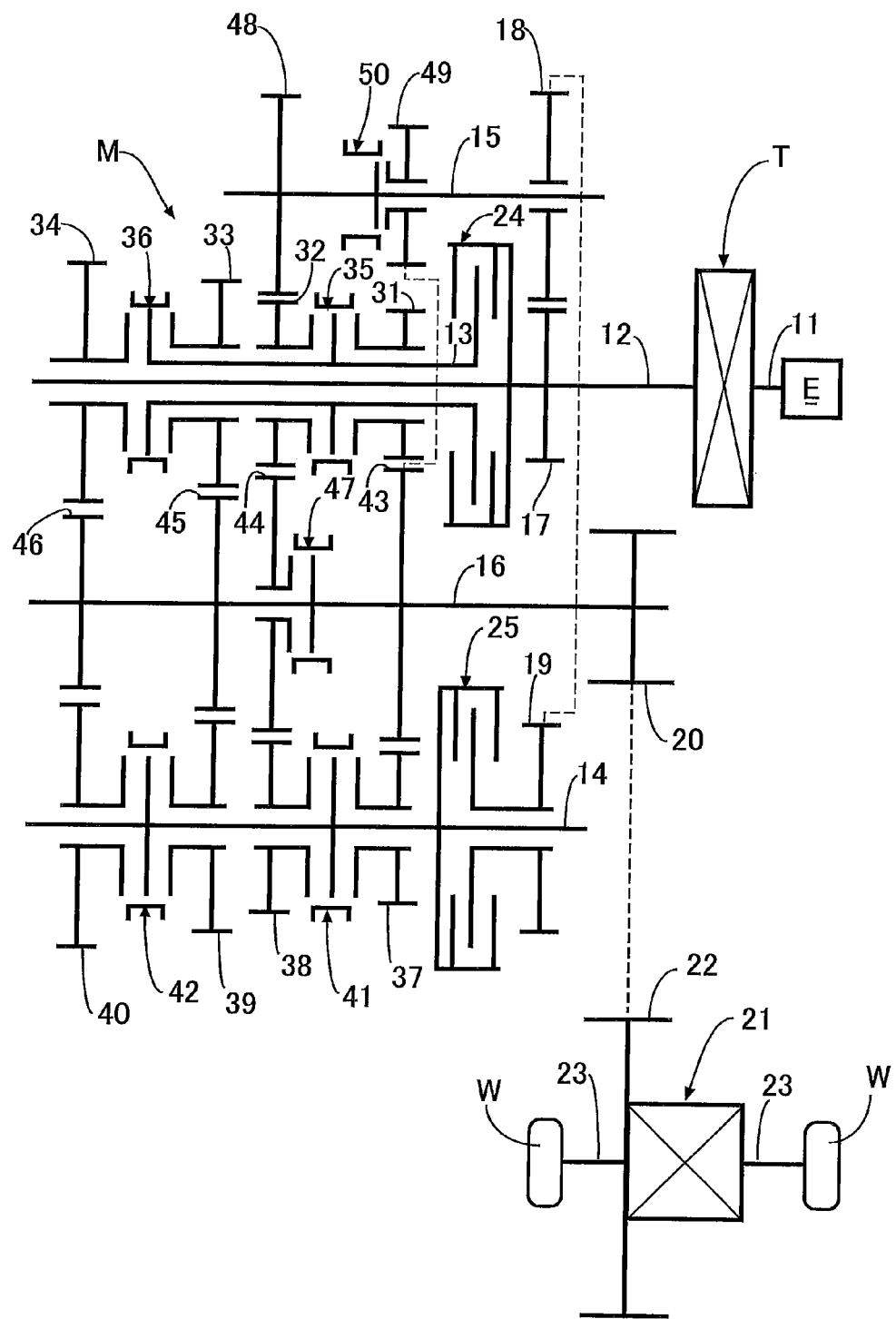
FIG. 1 is a skeleton diagram of a transmission. (first embodiment)

EXPLANATION OF REFERENCE NUMERALS
AND SYMBOLS

12 Main input shaft
13 First auxiliary input shaft

14 Second auxiliary input shaft
15 Idle shaft
16 Output shaft
18 Idle gear
24 First clutch
25 Second clutch
31 Second speed drive gear (gear)
32 Fourth speed-reverse drive gear (gear)
33 Sixth speed drive gear (gear)
34 Eighth speed drive gear (gear)
35 First synchronizing device (synchronizing device)
36 Second synchronizing device (synchronizing device)
37 First speed drive gear (gear)
38 Third speed drive gear (gear)
39 Fifth speed drive gear (gear)
40 Seventh speed drive gear (gear)
41 Third synchronizing device (synchronizing device)
42 Fourth synchronizing device (synchronizing device)
43 First speed-second speed-reverse driven gear (gear, lowest gear position gear)
44 Third speed-fourth speed driven gear (gear)
45 Fifth speed-sixth speed driven gear (gear)
46 Seventh speed-eighth speed driven gear (gear)
48 First reverse idle gear (reverse idle gear)
49 Second reverse idle gear (reverse idle gear)
52 Reverse idle gear
Cm Main clutch
E engine
MG Motor/generator
W Driven wheel

BEST MODE FOR CARRYING OUT THE INVENTION

Modes for carrying out the present invention are explained below by reference to the attached drawings.
[Embodiment 1]
FIG. 1 to FIG. 10 show a first embodiment of the present invention.

As shown in FIG. 1, an automatic transmission M having eight forward speeds and one reverse speed includes a main input shaft 12 coaxially connected to a crankshaft 11 of an engine E via a torque converter T, a first auxiliary input shaft 13 relatively rotatably fitted around the outer periphery of the main input shaft 12, a second auxiliary input shaft 14 disposed in parallel to the main input shaft 12, an idle shaft 15 disposed in parallel to the main input shaft 12, and an output shaft 16 disposed in parallel to the main input shaft 12.

An idle drive gear 17 fixedly provided on the main input shaft 12 meshes with an idle gear 18 relatively rotatably supported on the idle shaft 15, and the idle gear 18 meshes with an idle driven gear 19 relatively rotatably supported on the second auxiliary input shaft 14. Therefore, when the main input shaft 12 is rotating, the idle driven gear 19 on the second auxiliary input shaft 14 is always rotating. Furthermore, a final drive gear 20 fixedly provided on the output shaft 16 meshes with a final driven gear 22 of a differential gear 21, and the differential gear 21 is connected to left and right driven wheels W and W via left and right drive shafts 23 and 23.

The main input shaft 12 can be connected to the first auxiliary input shaft 13 via a first clutch 24, which is a multiple plate wet clutch, and the main input shaft 12 can be connected to the second auxiliary input shaft 14 via the idle drive gear 17, the idle gear 18, the idle driven gear 19, and a second clutch 25, which is a multiple plate wet clutch. That is, selectively engaging the first and second clutches 24 and 25 enables the driving force of the main input shaft 12 to be transmitted to the first and second auxiliary input shafts 13 and 14 selectively in the same direction. In this process, setting the number of teeth of the idle drive gear 17, the idle gear 18, and the idle driven gear 19 enables the ratio of the rotational speed of the first auxiliary input shaft 13 and the rotational speed of the second auxiliary input shaft 14 to be set freely.

A second speed drive gear 31, a fourth speed-reverse drive gear 32, a sixth speed drive gear 33, and an eighth speed drive gear 34 are each independently and relatively rotatably supported on the first auxiliary input shaft 13; the second speed drive gear 31 and the fourth speed-reverse drive gear 32 can be selectively connected to the first auxiliary input shaft 13 by means of a first synchronizing device 35, and the sixth speed drive gear 33 and the eighth speed drive gear 34 can be selectively connected to the first auxiliary input shaft 13 by means of a second synchronizing device 36.

On the other hand, a first speed drive gear 37, a third speed drive gear 38, a fifth speed drive gear 39, and a seventh speed drive gear 40 are each independently and relatively rotatably supported on the second auxiliary input shaft 14; the first speed drive gear 37 and the third speed drive gear 38 can be connected to the second auxiliary input shaft 14 by means of a third synchronizing device 41, and the fifth speed drive gear 39 and the seventh speed drive gear 40 can be selectively connected to the second auxiliary input shaft 14 by means of a fourth synchronizing device 42.

A first speed-second speed-reverse driven gear 43, a fifth speed-sixth speed driven gear 45, and a seventh speed-eighth speed driven gear 46 are fixedly provided on the output shaft 16, a third speed-fourth speed driven gear 44 is relatively rotatably supported thereon, and the third speed-fourth speed driven gear 44 can be connected to the output shaft 16 by means of a fifth synchronizing device 47.

A first reverse idle gear 48 is fixedly provided on the idle shaft 15, a second reverse idle gear 49 is relatively rotatably supported thereon, and the second reverse idle gear 49 can be connected to the idle shaft 15 by means of a sixth synchronizing device 50.

The first speed-second speed-reverse driven gear 43 meshes with the first speed drive gear 37 and the second speed drive gear 31, the third speed-fourth speed driven gear 44 meshes with the third speed drive gear 38 and the fourth speed-reverse drive gear 32, the fifth speed-sixth speed driven gear 45 meshes with the fifth speed drive gear 39 and the sixth speed drive gear 33, and the seventh speed-eighth speed driven gear 46 meshes with the seventh speed drive gear 40 and the eighth speed drive gear 34. Furthermore, the first reverse idle gear 48 meshes with the fourth speed-reverse drive gear 32, and the second reverse idle gear 49 meshes with the first speed-second speed-reverse driven gear 43.

Since the transmission of the present embodiment is an automatic transmission M, the first to sixth synchronizing devices 35, 36, 41, 42, 47, and 50 are operated by an electronically controlled actuator, which is not illustrated.

Establishment of first speed to eighth speed gear positions and a reverse gear position of the automatic transmission M having the above-mentioned arrangement is now explained.

Figure 2:
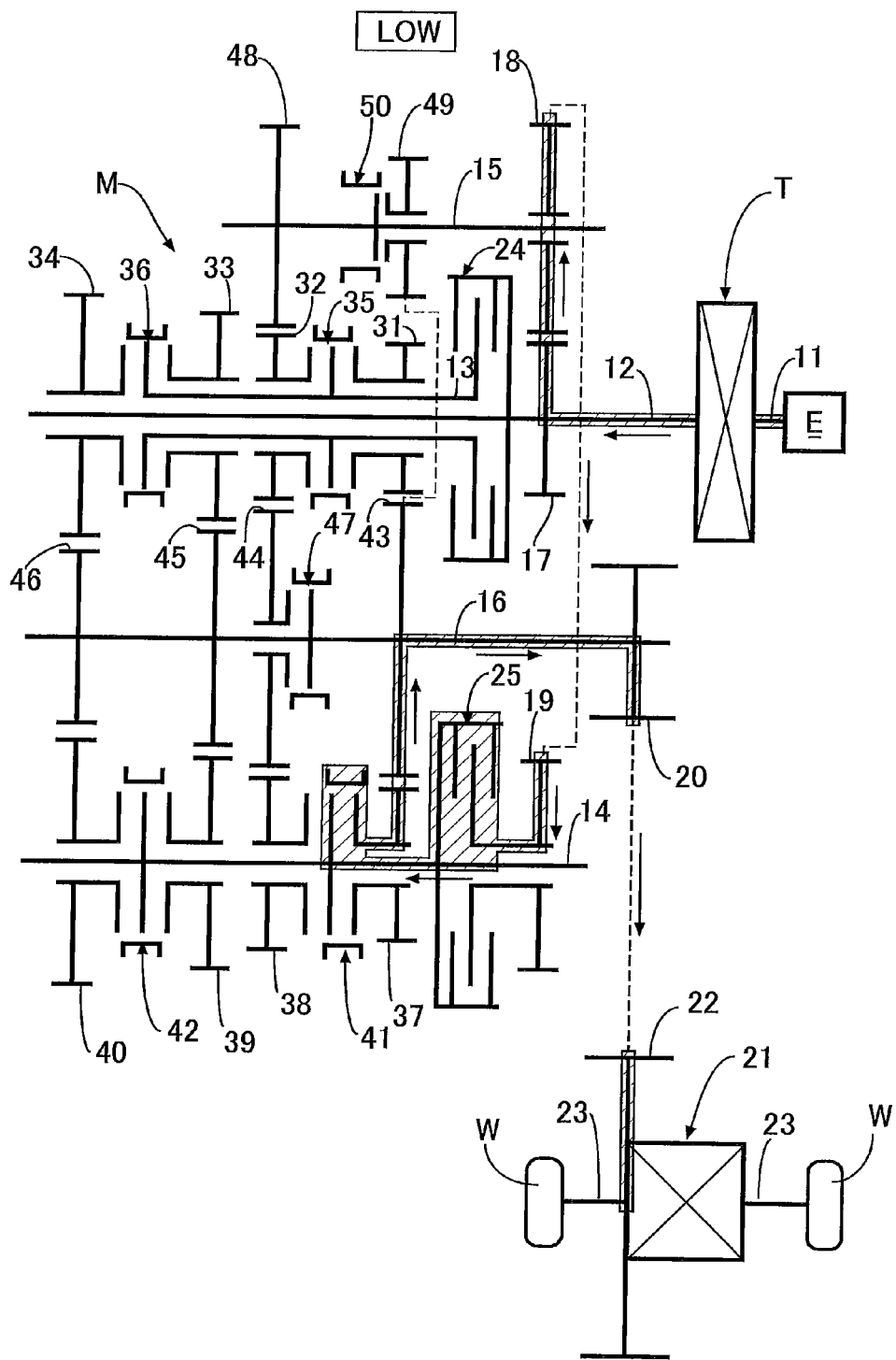
FIG. 2 is a diagram showing a state in which a first speed gear position is established. (first embodiment)

As shown in FIG. 2, when establishing the first speed gear position, in a state in which the first speed drive gear 37 is connected to the second auxiliary input shaft 14 by means of the third synchronizing device 41, the second clutch 25 is engaged so as to connect the idle driven gear 19 to the second auxiliary input shaft 14. In this state, the driving force of the engine E is transmitted to the driven wheels W and W via the path: torque converter T→main input shaft 12→idle drive gear 17→idle gear 18→idle driven gear 19→second clutch 25→second auxiliary input shaft 14→third synchronizing device 41→first speed drive gear 37→first speed-second speed-reverse driven gear 43→output shaft 16→final drive gear 20→final driven gear 22→differential gear 21→drive shafts 23 and 23.

Figure 3:
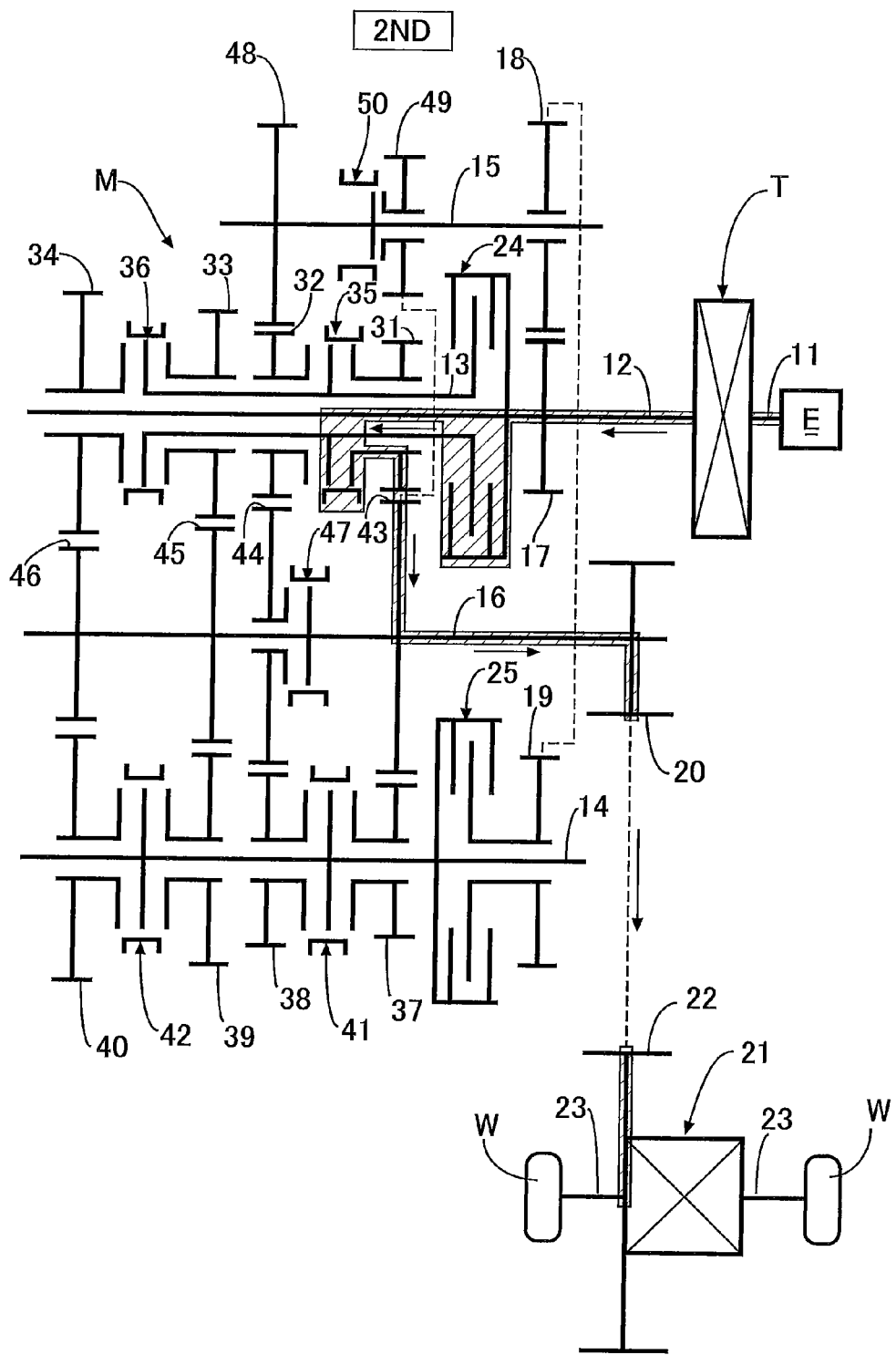
FIG. 3 is a diagram showing a state in which a second speed gear position is established. (first embodiment)

As shown in FIG. 3, when establishing the second speed gear position, in a state in which the second speed drive gear 31 is connected to the first auxiliary input shaft 13 by means of the first synchronizing device 35, the first clutch 24 is engaged so as to connect the main input shaft 12 to the first auxiliary input shaft 13. In this state, the driving force of the engine E is transmitted to the driven wheels W and W via the path: torque converter T→main input shaft 12→first clutch 24→first auxiliary input shaft 13→first synchronizing device 35→second speed drive gear 31→first speed-second speed-reverse driven gear 43→output shaft 16→final drive gear 20→final driven gear 22→differential gear 21→drive shafts 23 and 23.

Figure 4:
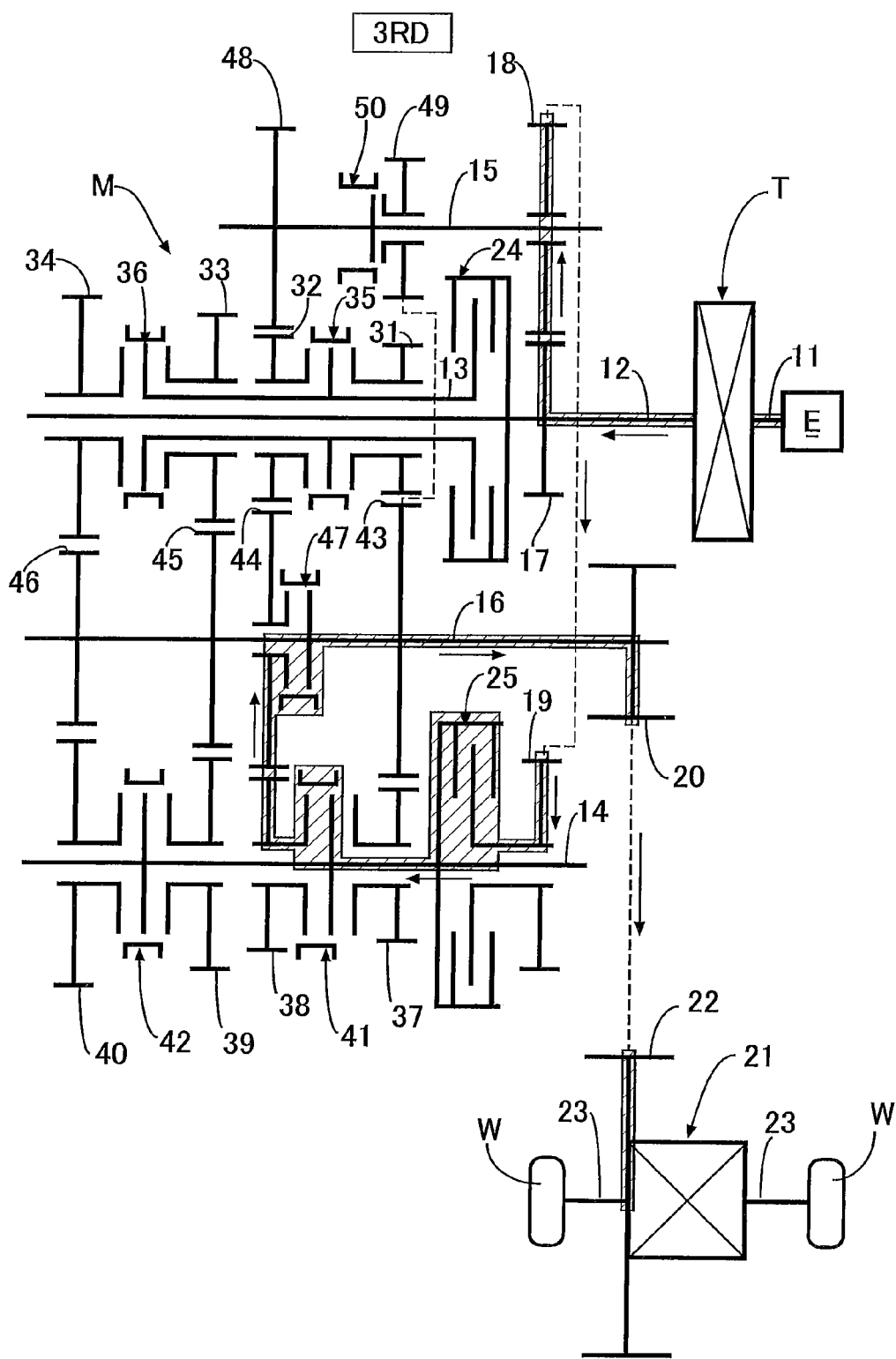
FIG. 4 is a diagram showing a state in which a third speed gear position is established. (first embodiment)

As shown in FIG. 4, when establishing the third speed gear position, in a state in which the third speed drive gear 38 is connected to the second auxiliary input shaft 14 by means of the third synchronizing device 41 and, furthermore, the third speed-fourth speed driven gear 44 is connected to the output shaft 16 by means of the fifth synchronizing device 47, the second clutch 25 is engaged so as to connect the idle driven gear 19 to the second auxiliary input shaft 14. In this state, the driving force of the engine E is transmitted to the driven wheels W and W via the path: torque converter T→main input shaft 12→idle drive gear 17→idle gear 18→idle driven gear 19→second clutch 25→second auxiliary input shaft 14→third synchronizing device 41→third speed drive gear 38→third speed-fourth speed driven gear 44→fifth synchronizing device 47→output shaft 16→final drive gear 20→final driven gear 22→differential gear 21→drive shafts 23 and 23.

Figure 5:
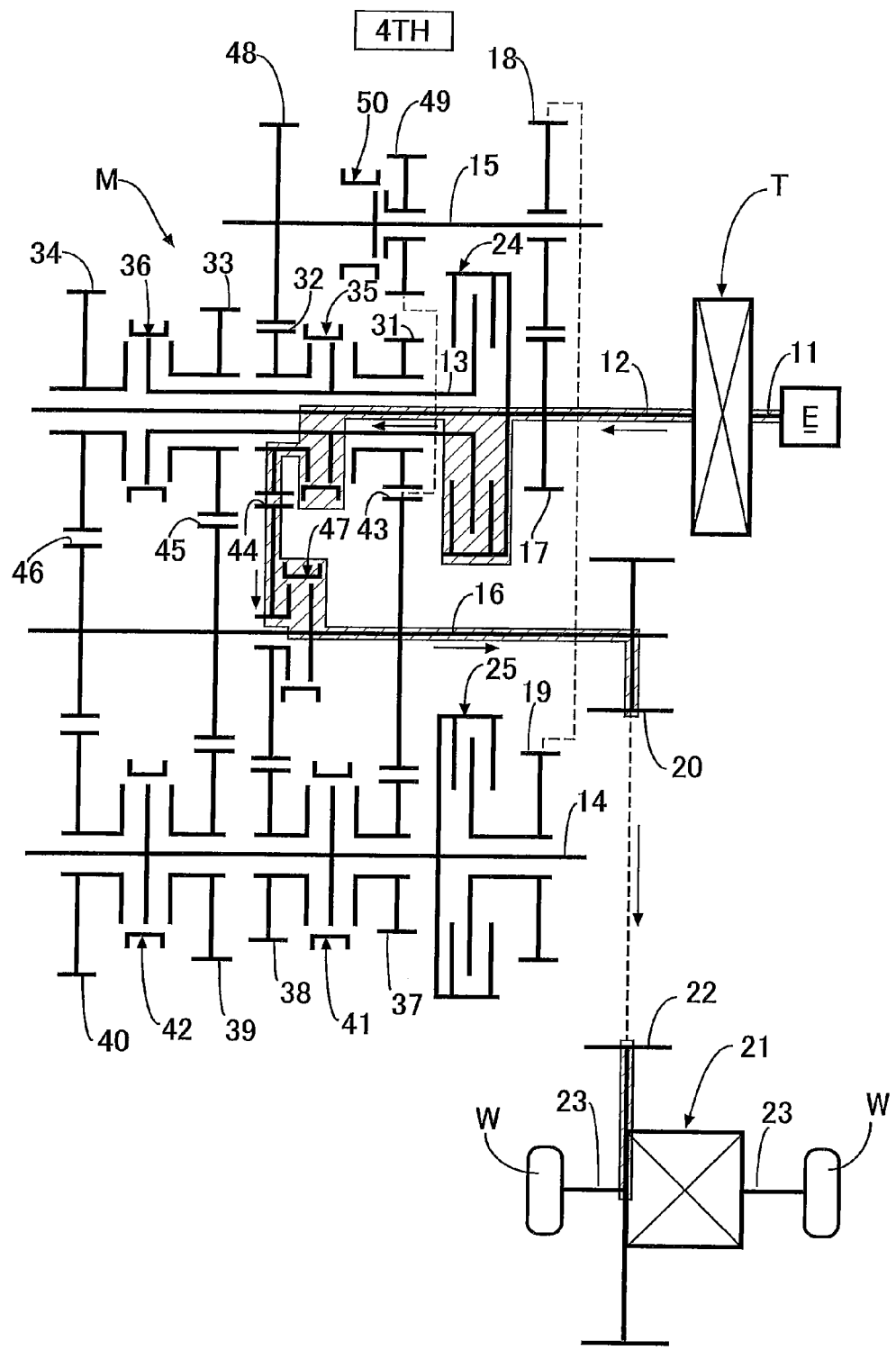
FIG. 5 is a diagram showing a state in which a fourth speed gear position is established. (first embodiment)

As shown in FIG. 5, when establishing the fourth speed gear position, in a state in which the fourth speed-reverse drive gear 32 is connected to the first auxiliary input shaft 13 by means of the first synchronizing device 35 and, furthermore, the third speed-fourth speed driven gear 44 is connected to the output shaft 16 by means of the fifth synchronizing device 47, the first clutch 24 is engaged so as to connect the main input shaft 12 to the first auxiliary input shaft 13. In this state, the driving force of the engine E is transmitted to the driven wheels W and W via the path: torque converter T→main input shaft 12→first clutch 24→first auxiliary input shaft 13→first synchronizing device 35→fourth speed-reverse drive gear 32→third speed-fourth speed driven gear 44→fifth synchronizing device 47→output shaft 16→final drive gear 20→final driven gear 22→differential gear 21→drive shafts 23 and 23.

Figure 6:
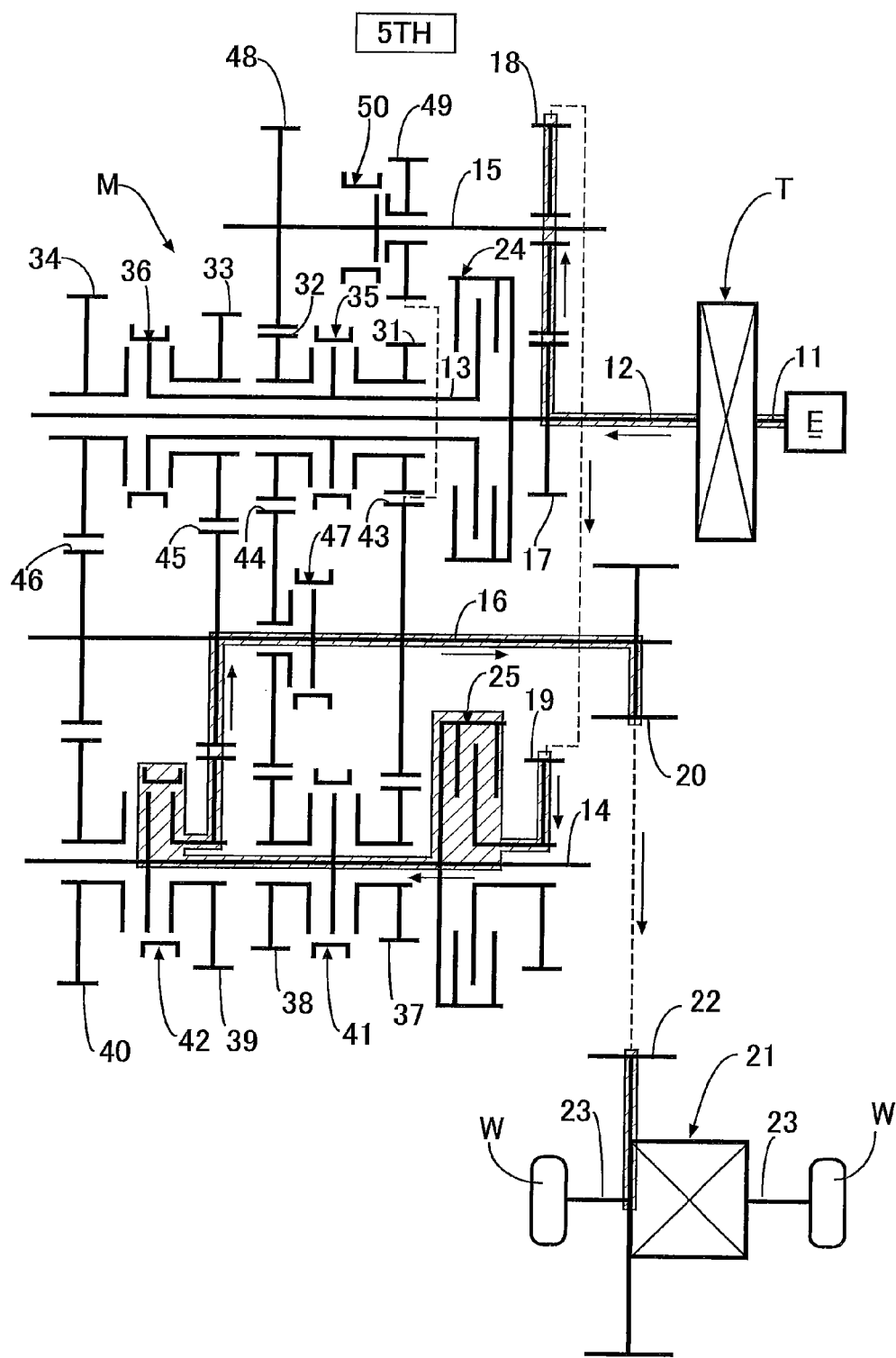
FIG. 6 is a diagram showing a state in which a fifth speed gear position is established. (first embodiment)

As shown in FIG. 6, when establishing the fifth speed gear position, in a state in which the fifth speed drive gear 39 is connected to the second auxiliary input shaft 14 by means of the fourth synchronizing device 42, the second clutch 25 is engaged so as to connect the idle driven gear 19 to the second auxiliary input shaft 14. In this state, the driving force of the engine E is transmitted to the driven wheels W and W via the path: torque converter T→main input shaft 12→idle drive gear 17→idle gear 18→idle driven gear 19→second clutch 25→second auxiliary input shaft 14→fourth synchronizing device 42→fifth speed drive gear 39→fifth speed-sixth speed driven gear 45→output shaft 16→final drive gear 20→final driven gear 22→differential gear 21→drive shafts 23 and 23.

Figure 7:
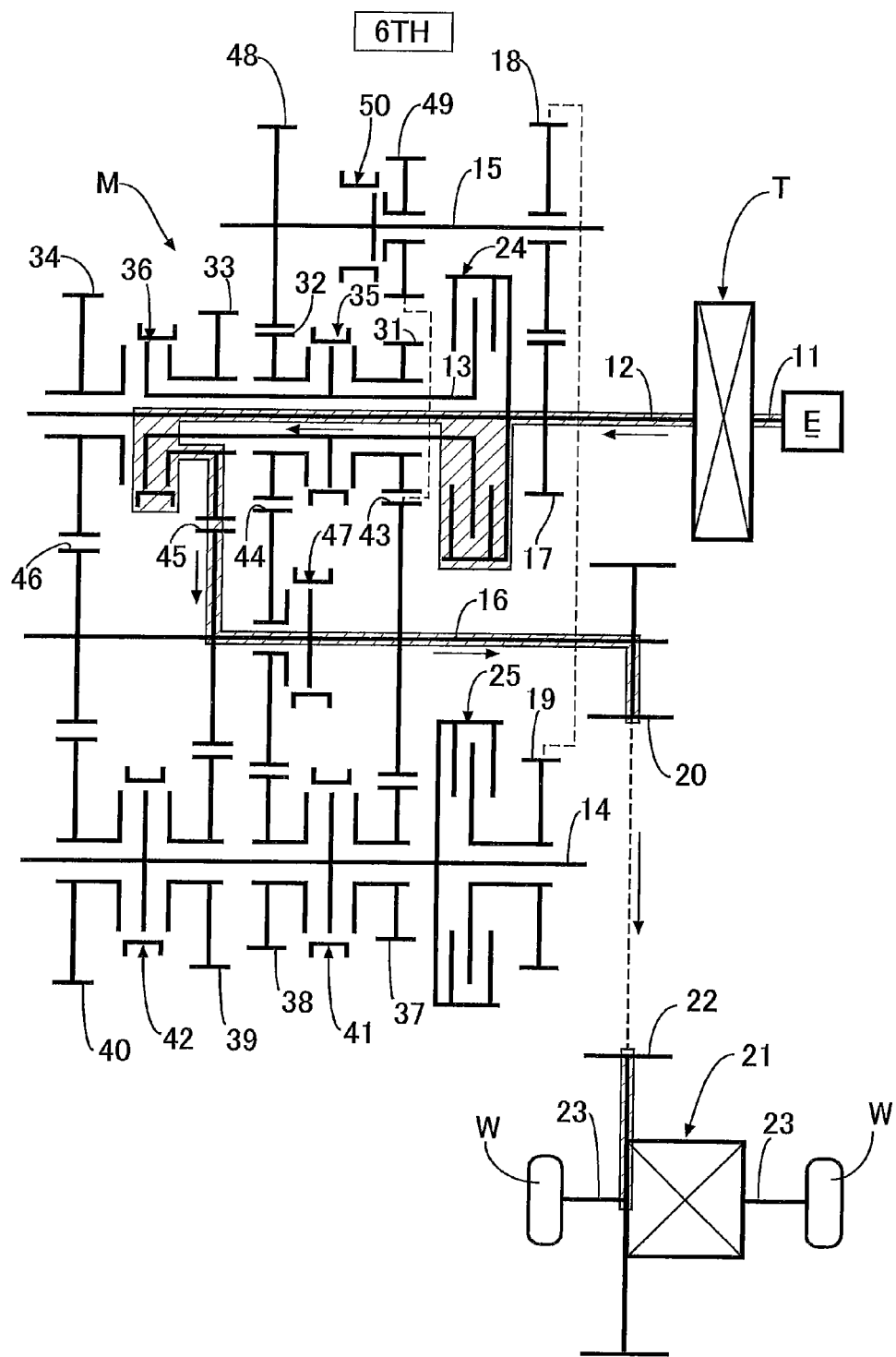
FIG. 7 is a diagram showing a state in which a sixth speed gear position is established. (first embodiment)

As shown in FIG. 7, when establishing the sixth speed gear position, in a state in which the sixth speed drive gear 33 is connected to the first auxiliary input shaft 13 by means of the second synchronizing device 36, the first clutch 24 is engaged so as to connect the main input shaft 12 to the first auxiliary input shaft 13. In this state, the driving force of the engine E is transmitted to the driven wheels W and W via the path: torque converter T→main input shaft 12→first clutch 24→first auxiliary input shaft 13→second synchronizing device 36→sixth speed drive gear 33→fifth speed-sixth speed driven gear 45→output shaft 16→final drive gear 20→final driven gear 22→differential gear 21→drive shafts 23 and 23.

Figure 8:
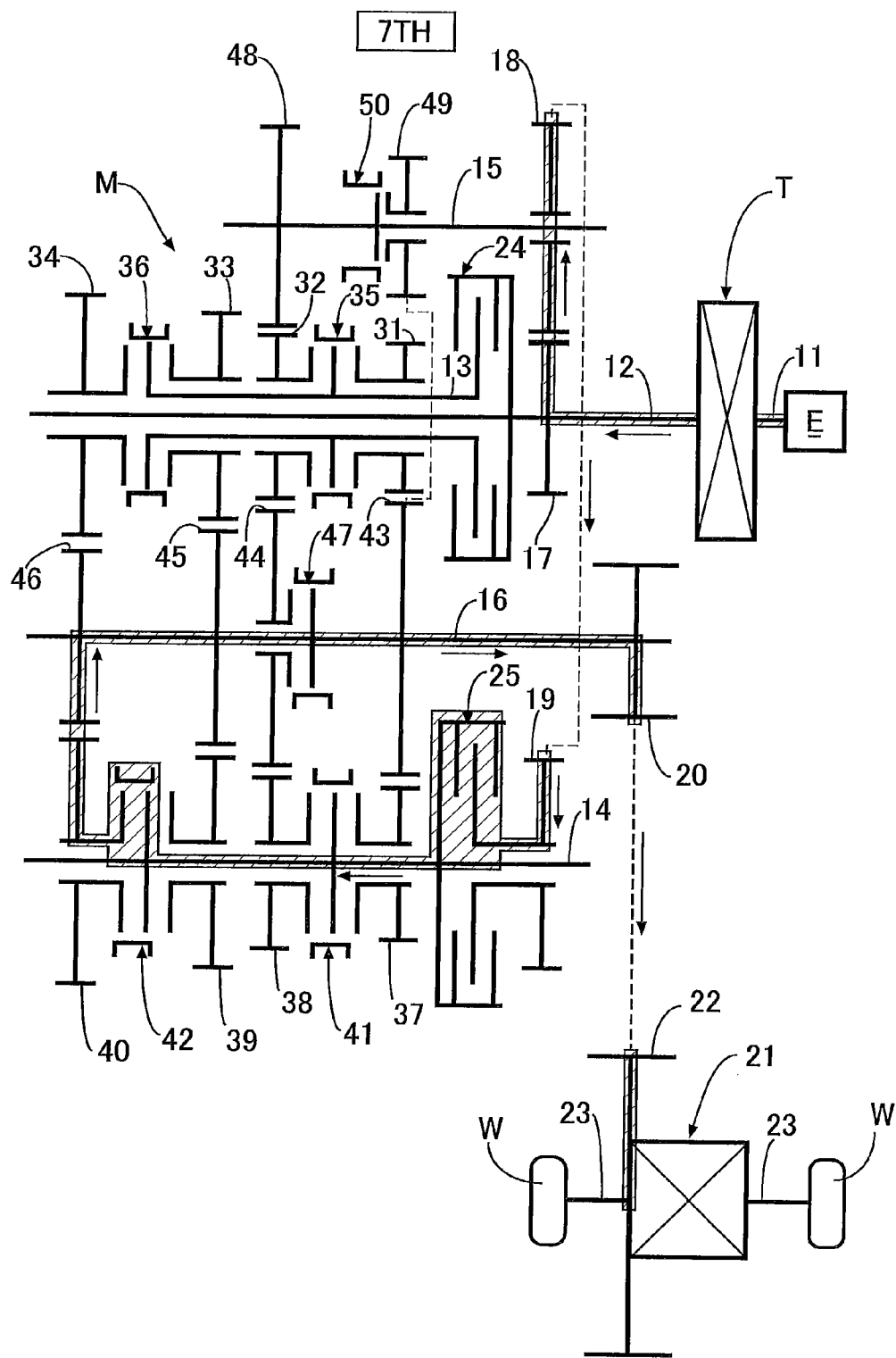
FIG. 8 is a diagram showing a state in which a seventh speed gear position is established. (first embodiment)

As shown in FIG. 8, when establishing the seventh speed gear position, in a state in which the seventh speed drive gear 40 is connected to the second auxiliary input shaft 14 by means of the fourth synchronizing device 42, the second clutch 25 is engaged so as to connect the idle driven gear 19 to the second auxiliary input shaft 14. In this state, the driving force of the engine E is transmitted to the driven wheels W and W via the path: torque converter T→main input shaft 12→idle drive gear 17→idle gear 18→idle driven gear 19→second clutch 25→second auxiliary input shaft 14→fourth synchronizing device 42→seventh speed drive gear 40→seventh speed-eighth speed driven gear 46→output shaft 16→final drive gear 20→final driven gear 22→differential gear 21→drive shafts 23 and 23.

Figure 9:
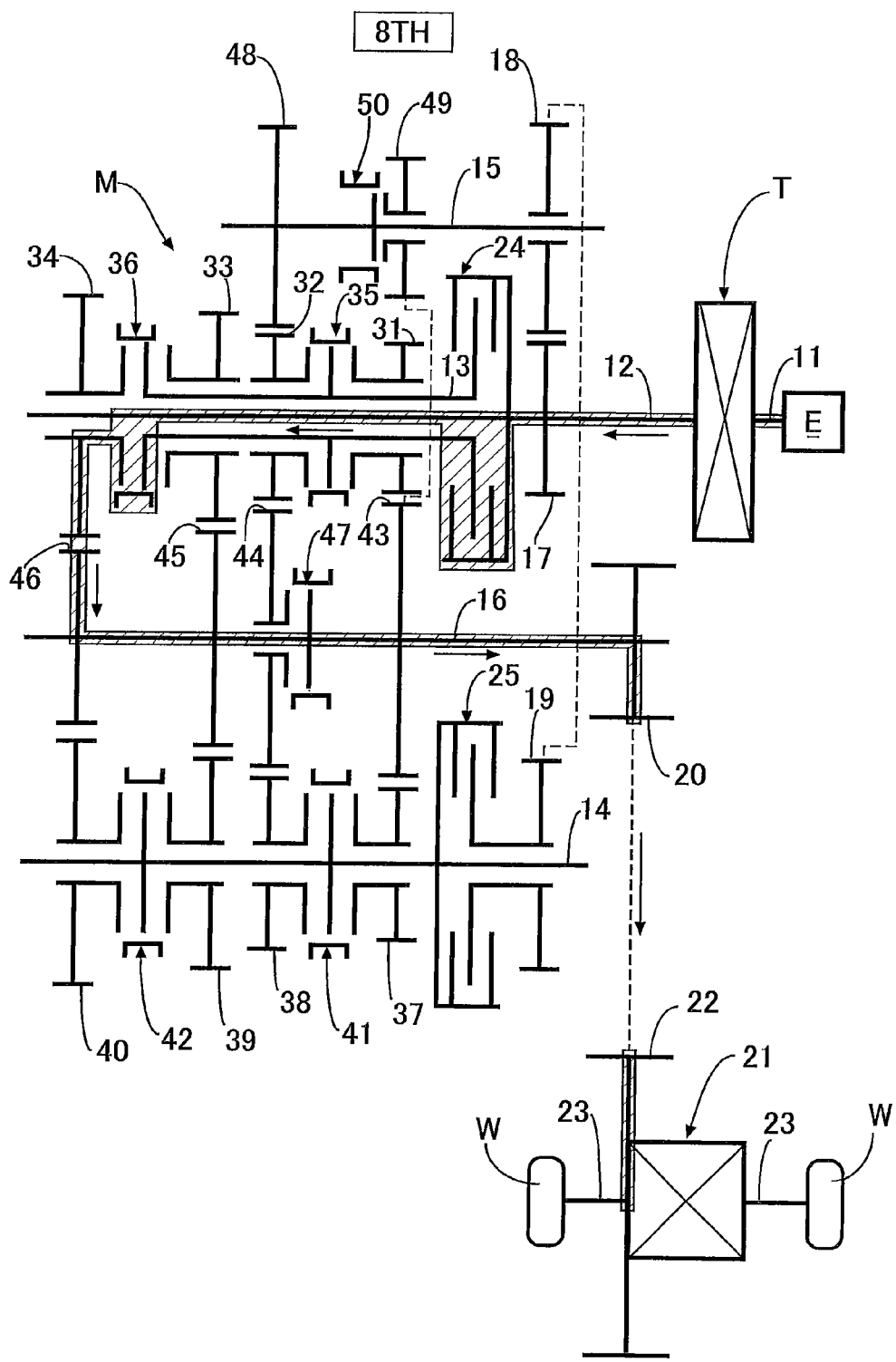
FIG. 9 is a diagram showing a state in which an eighth speed gear position is established. (first embodiment)

As shown in FIG. 9, when establishing the eighth speed gear position, in a state in which the eighth speed drive gear 34 is connected to the first auxiliary input shaft 13 by means of the second synchronizing device 36, the first clutch 24 is engaged so as to connect the main input shaft 12 to the first auxiliary input shaft 13. In this state, the driving force of the engine E is transmitted to the driven wheels W and W via the path: torque converter T→main input shaft 12→first clutch 24→first auxiliary input shaft 13→second synchronizing device 36→eighth speed drive gear 34→seventh speed-eighth speed driven gear 46→output shaft 16→final drive gear 20→final driven gear 22→differential gear 21→drive shafts 23 and 23.

Figure 10:
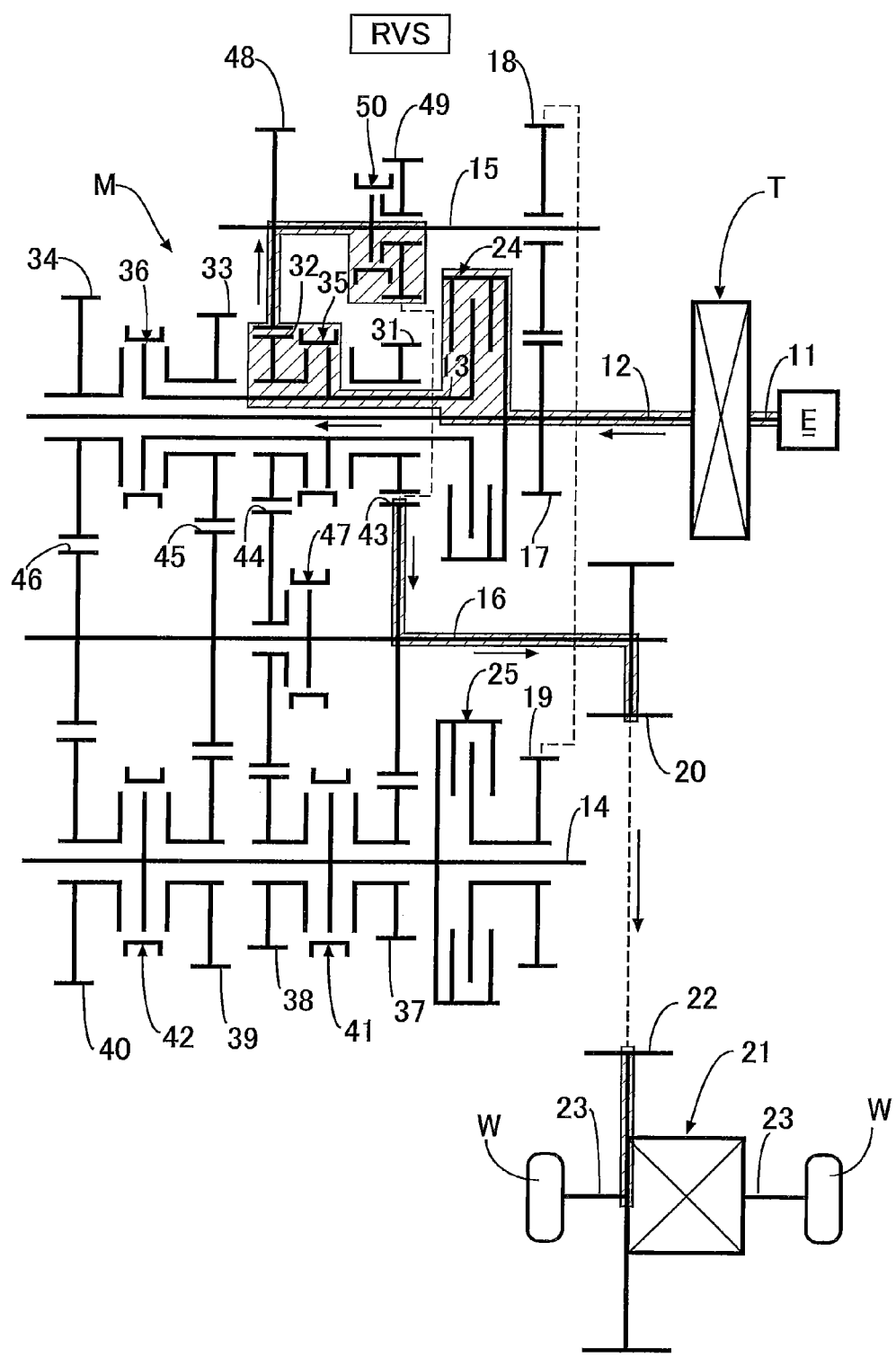
FIG. 10 is a diagram showing a state in which a reverse gear position is established. (first embodiment)

As shown in FIG. 10, when establishing the reverse gear position, in a state in which the fourth speed-reverse drive gear 32 is connected to the first auxiliary input shaft 13 by means of the first synchronizing device 35 and, furthermore, the second reverse idle gear 49 is connected to the idle shaft 15 by means of the sixth synchronizing device 50, the first clutch 24 is engaged so as to connect the main input shaft 12 to the first auxiliary input shaft 13. In this state, the driving force of the engine E is transmitted to the driven wheels W and W via the path: torque converter T→main input shaft 12→first clutch 24→first auxiliary input shaft 13→first synchronizing device 35→fourth speed-reverse drive gear 32→first reverse idle gear 48→idle shaft 15→sixth synchronizing device 50→second reverse idle gear 49→first speed-second speed-reverse driven gear 43→output shaft 16→final drive gear 20→final driven gear 22→differential gear 21→drive shafts 23 and 23. In this process, since the first and second reverse idle gears 48 and 49, which are the lowest gear positions and have a large diameter, are present in the transmission path for the driving force, the rotational direction of the output shaft 16 becomes reversed from that when establishing the forward gear position, and the driven wheels W and W reversely rotate in the reverse direction with a sufficiently large gear ratio.

The third speed-fourth speed driven gear 44 meshing with the fourth speed-reverse drive gear 32, which is rotating, rotates at a rotational speed that is different from that of the first speed-second speed-reverse driven gear 43, but since the third speed-fourth speed driven gear 44 is detached from the output shaft 16 by means of the fifth synchronizing device 47, the reverse gear position can be established without problems.

As hereinbefore described, in accordance with the present embodiment, since the first clutch 24, which transmits the driving force of the main input shaft 12 to the first auxiliary input shaft 13, and the second clutch 25, which transmits the driving force of the main input shaft 12 to the second auxiliary input shaft 14, are dividedly disposed on the first and second auxiliary input shafts 13 and 14 respectively, compared with a case in which integrated first and second clutches are disposed on a main input shaft 12, it is possible to simplify the structure of the first and second clutches 24 and 25, reduce the dimensions thereof, and cut the production cost therefor.

Furthermore, since the idle gear 18 for transmitting the driving force of the main input shaft 12 to the second auxiliary input shaft 14 and the first and second reverse idle gears 48 and 49 for establishing the reverse gear position are supported by utilizing the common idle shaft 15, compared with a case in which an idle gear 18 and first and second reverse idle gears 48 and 49 are each supported on separate shafts, it is possible to reduce the dimensions of the automatic transmission M.

Moreover, since the first speed-second speed-reverse driven gear 43 provided on the output shaft 16 is used in common for establishing the first speed gear position, the second speed gear position and the reverse gear position, the third speed-fourth speed driven gear 44 provided on the output shaft 16 is used in common for establishing the third speed gear position and the fourth speed gear position, the fifth speed-sixth speed driven gear 45 provided on the output shaft 16 is used in common for establishing the fifth speed gear position and the sixth speed gear position, and the seventh speed-eighth speed driven gear 46 provided on the output shaft 16 is used in common for establishing the seventh speed gear position and the eighth speed gear position, a total of four gears, that is, 43, 44, 45, and 46, are each used in common for establishing two or three gear positions, and it is possible to cut the number of components and reduce the dimensions of the automatic transmission M.

Furthermore, since the advance/retard relationship between the timing with which the first and second clutches 24 and 25 are switched over and the timing with which the first to sixth synchronizing devices 35, 36, 41, 42, 47, and 50 are switched over can be freely chosen when establishing any of the gear positions, it is possible to prevent the occurrence of shift shock due to timing lag, thus enabling gear shifting to be carried out smoothly.

[Embodiment 2]

Figure 11:
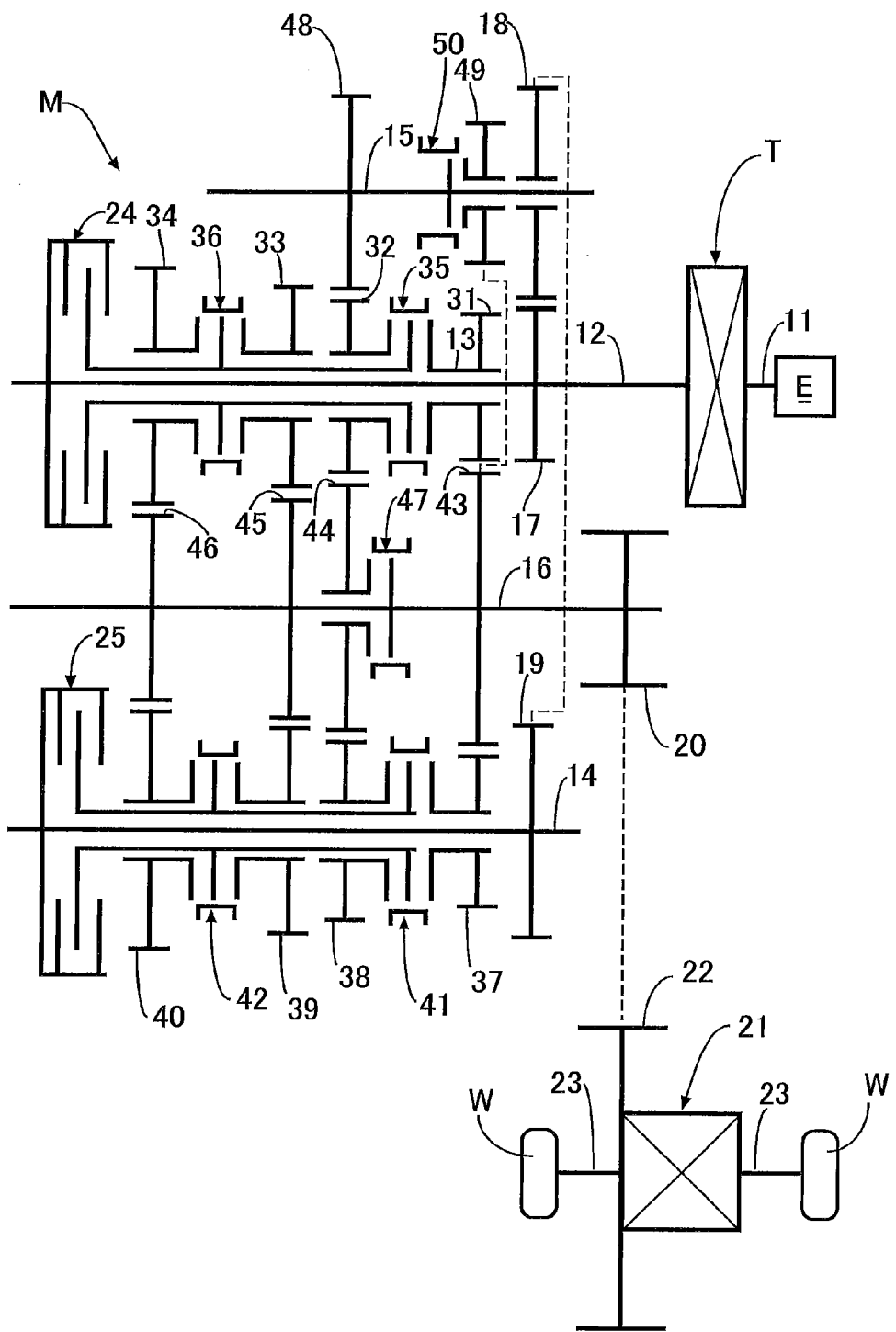
FIG. 11 is a skeleton diagram of a transmission. (second embodiment)

A second embodiment of the present invention is now explained by reference to FIG. 11. In the second to sixth embodiments, components corresponding to the components of the first embodiment are denoted by the same reference numerals and symbols as those for the components of the first embodiment, and duplication of the explanation is therefore omitted. Reference numerals and symbols used in the first to sixth embodiments are only used for the first to sixth embodiments, and are not related to reference numerals and symbols of other embodiments.

The second embodiment is a modification of the first embodiment, and differs in that in the first embodiment the first clutch 24 and the second clutch 25 are disposed at positions close to the end parts, on the engine E side, of the first auxiliary input shaft 13 and the second auxiliary input shaft 14, whereas in the second embodiment a first clutch 24 and a second clutch 25 are disposed in end parts of a first auxiliary input shaft 13 and a second auxiliary input shaft 14 on the opposite side to an engine E.

In accordance with the second embodiment, in addition to the operational effects of the first embodiment, since the first and second clutches 24 and 25 do not interfere with an output shaft 16, by increasing the radial dimension and maintaining the volume the axial dimension of a transmission M can be reduced. Moreover, due to the increase in volume of the first and second clutches 24 and 25, it becomes possible to use them as starting clutches. Furthermore, it is possible to carry out maintenance of the first and second clutches 24 and 25 easily without interference from the engine E or a torque converter T.

[Embodiment 3]

Figure 12:
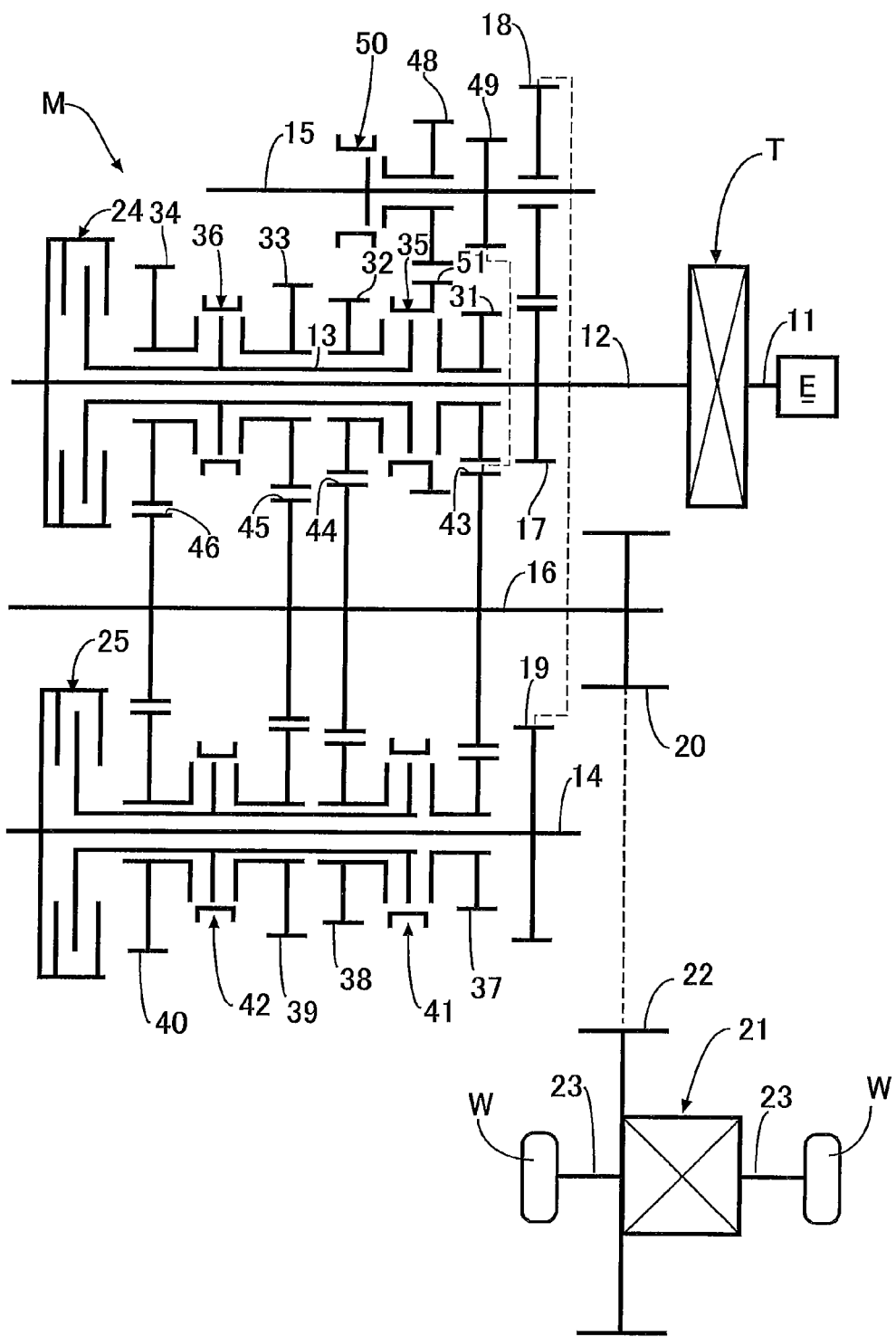
FIG. 12 is a skeleton diagram of a transmission. (third embodiment)

A third embodiment of the present invention is now explained by reference to FIG. 12 and FIG. 13.

The third embodiment is a modification of the second embodiment, and differs in that in the second embodiment a first reverse idle gear 48 is fixedly provided on an idle shaft 15 and a second reverse idle gear 49 is relatively rotatably supported thereon, and the second reverse idle gear 49 is connected to the idle shaft 15 by means of a sixth synchronizing device 50, whereas in the third embodiment a first reverse idle gear 48 is relatively rotatably supported on an idle shaft 15 and a second reverse idle gear 49 is fixedly provided thereon, the first reverse idle gear 48 is connected to an idle shaft 15 by means of a sixth synchronizing device 50, and the first reverse idle gear 48 is meshed with a gear 51 provided on a sleeve of a first synchronizing device 35.

Figure 13:
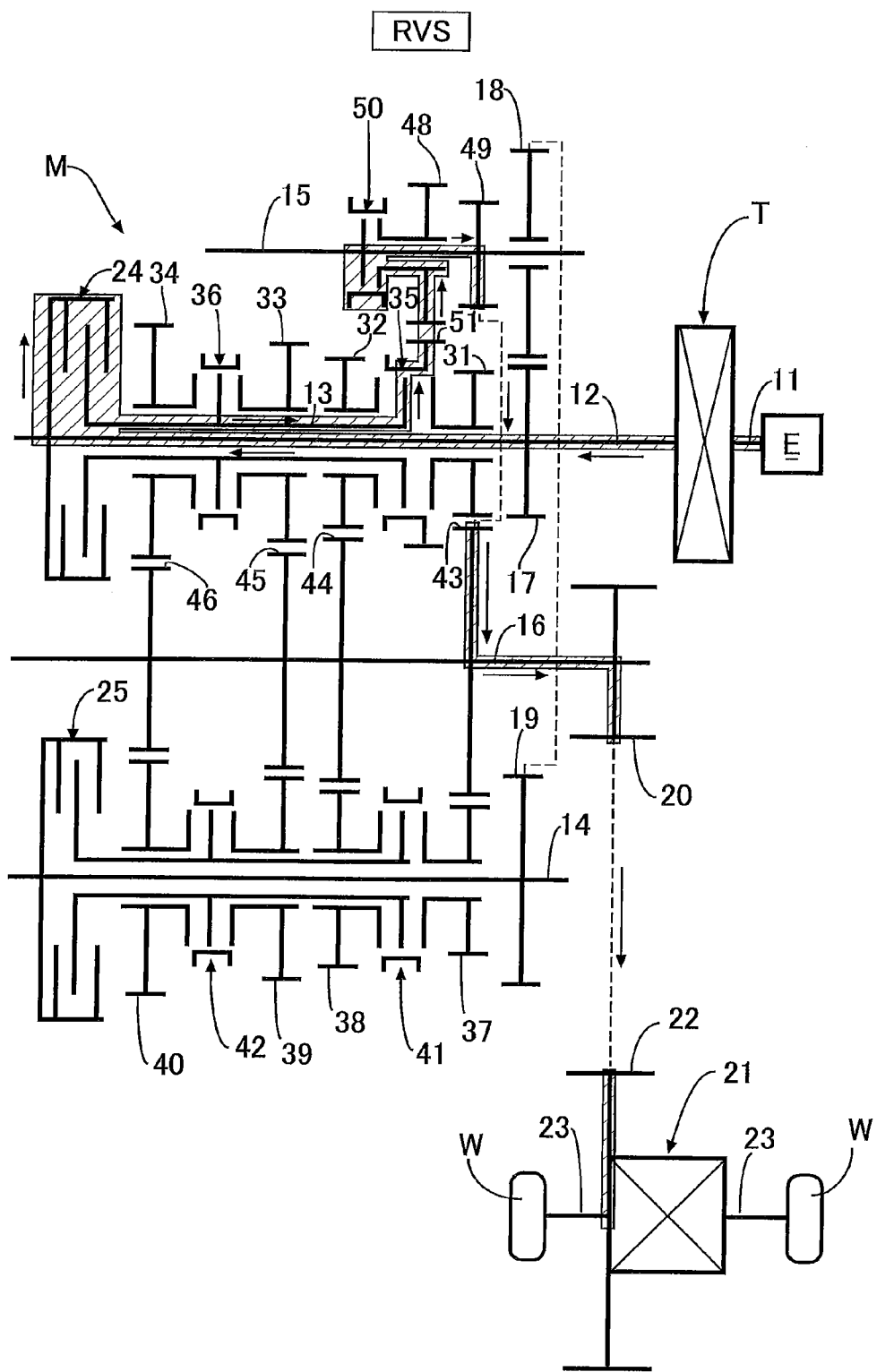
FIG. 13 is a diagram showing a state in which a reverse gear position is established. (third embodiment)

As shown in FIG. 13, when establishing a reverse gear position, in a state in which the first reverse idle gear 48 is connected to the idle shaft 15 by means of the sixth synchronizing device 50, a first clutch 24 is engaged so as to connect a main input shaft 12 to a first auxiliary input shaft 13. In this state, the driving force of an engine E is transmitted to driven wheels W and W via the path: torque converter T→main input shaft 12→first clutch 24→first auxiliary input shaft 13→gear 51 of first synchronizing device 35→first reverse idle gear 48→sixth synchronizing device 50→idle shaft 15→second reverse idle gear 49→first speed-second speed-reverse driven gear 43→output shaft 16→final drive gear 20→final driven gear 22→differential gear 21→drive shafts 23 and 23. In this process, since the first and second reverse idle gears 48 and 49 are present in the transmission path for the driving force, the rotational direction of the output shaft 16 becomes reversed from that when establishing the forward gear position, and the driven wheels W and W reversely rotate in the reverse direction.

In the first and second embodiments, since the fourth speed-reverse drive gear 32 and the third speed-fourth speed driven gear 44 rotate when establishing the reverse gear position, it is necessary to release the connection between the third speed-fourth speed driven gear 44 and the output shaft 16 by means of the fifth synchronizing device 47, but in the third embodiment, since the first reverse idle gear 48 is driven by the gear 51 provided on the sleeve of the first synchronizing device 35, a third speed-fourth speed driven gear 44 does not rotate, and it is therefore unnecessary to use a fifth synchronizing device 47, thus further cutting the number of components and reducing the axial dimension of a transmission M.

[Embodiment 4]

Figure 14:
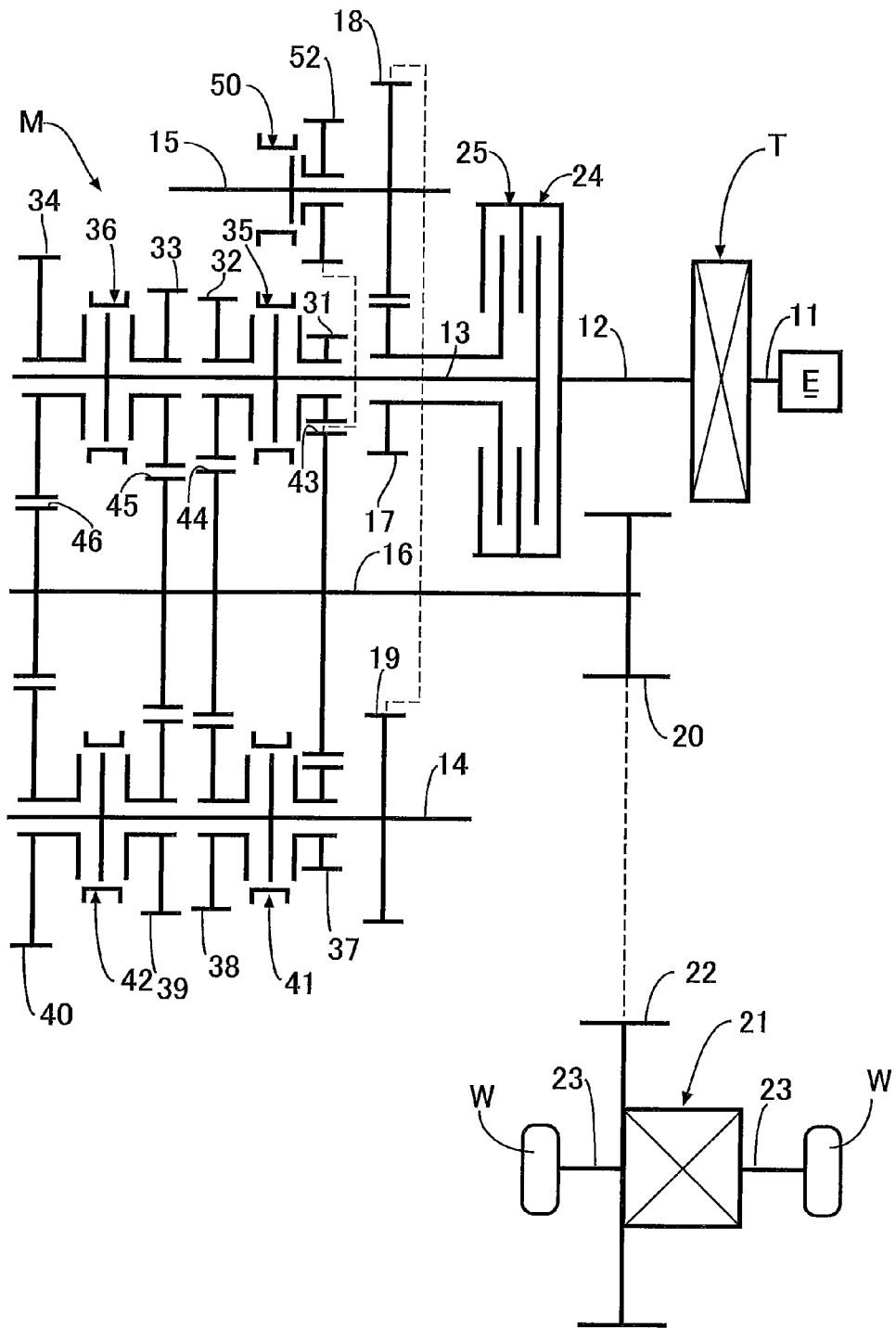
FIG. 14 is a skeleton diagram of a transmission. (fourth embodiment)

A fourth embodiment of the present invention is now explained by reference to FIG. 14 and FIG. 15.

The fourth embodiment is different from the first to third embodiments in terms of the structure in which rotation of a main input shaft 12 is divided between a first auxiliary input shaft 13 and a second auxiliary input shaft 14 at different rotational speeds.

That is, in the first to third embodiment the first clutch 24 is disposed on the first auxiliary input shaft 13 and the second clutch 25 is disposed on the second auxiliary input shaft 14, whereas in the fourth embodiment a first clutch 24 and a second clutch 25 are disposed on the axis of the main input shaft 12 in a superimposed aggregated state.

The main input shaft 12 and a first auxiliary input shaft 13 are disposed coaxially with the first clutch 24 sandwiched therebetween, and engaging the first clutch 24 allows the main input shaft 12 to be directly connected to the first auxiliary input shaft 13. Furthermore, an idle drive gear 17 relatively rotatably supported on the first auxiliary input shaft 13 can be connected to the main input shaft 12 via the second clutch 25. Therefore, in the same way as for the first to third embodiments, selectively engaging the first and second clutches 24 and 25 enables the driving force of the main input shaft 12 to be transmitted selectively and in the same direction to the first and second auxiliary input shafts 13 and 14 and, moreover, setting the number of teeth of the idle drive gear 17, an idle gear 18, and an idle driven gear 19 enables the ratio of the rotational speed of the first auxiliary input shaft 13 and the rotational speed of the second auxiliary input shaft 14 to be set freely.

Furthermore, one reverse idle gear 52 is relatively rotatably supported on an idle shaft 15, and this reverse idle gear 52 can be connected to the idle shaft 15 via a sixth synchronizing device 50.

In accordance with the fourth embodiment, in the same way as for the first to third embodiments, controlling the first and second clutches 24 and 25 and first to fourth synchronizing devices 35, 36, 41, and 42 enables a first speed gear position to an eighth speed gear position to be established.

Figure 15:
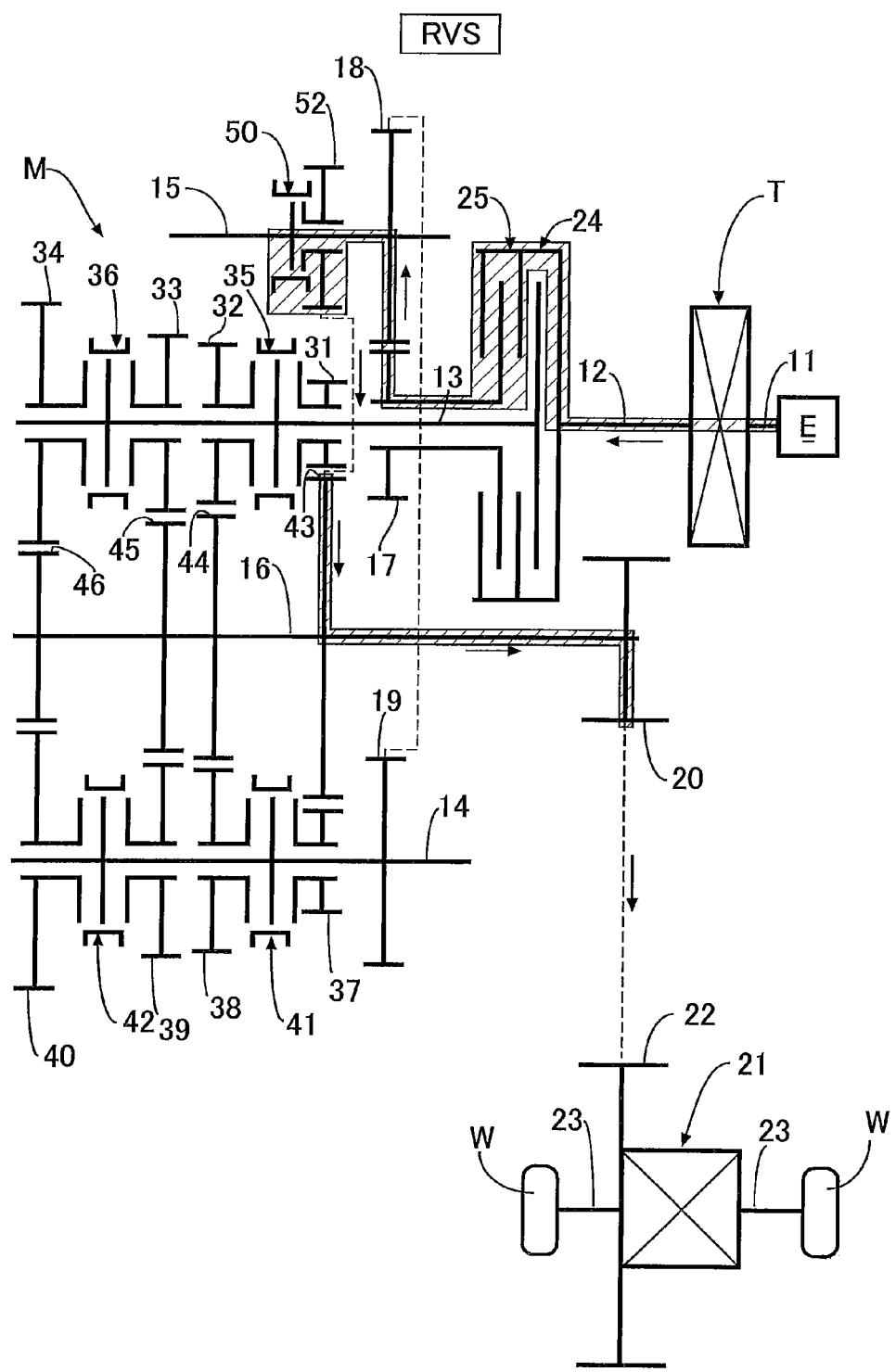
FIG. 15 is a diagram showing a state in which a reverse gear position is established. (fourth embodiment)

Furthermore, as shown in FIG. 15, when establishing a reverse gear position, in a state in which the reverse idle gear 52 is connected to the idle shaft 15 by means of the sixth synchronizing device 50, the second clutch 25 is engaged so as to connect the main input shaft 12 to the idle drive gear 17. In this state, the driving force of an engine E is transmitted to driven wheels W and W via the path: torque converter T→main input shaft 12→second clutch 25→idle drive gear 17→idle gear 18→idle shaft 15→sixth synchronizing device 50→reverse idle gear 52→first speed-second speed-reverse driven gear 43→output shaft 16→final drive gear 20→final driven gear 22→differential gear 21→drive shafts 23 and 23. In this process, since the reverse idle gear 52 is present in the transmission path for the driving force, the rotational direction of the output shaft 16 becomes reversed from that when establishing a forward gear position, and the driven wheels W and W reversely rotate in the reverse direction.

Also in accordance with the fourth embodiment, since a third speed-fourth speed driven gear 44 does not rotate when establishing the reverse gear position, in the same way as for the third embodiment it is unnecessary to use a fifth synchronizing device 47, thus further cutting the number of components and reducing the axial dimension of a transmission M. Moreover, since it is possible to ensure a sufficient radial dimension for the first and second clutches 24 and 25, the total axial dimension of the first and second clutches 24 and 25 can be made smaller than the sum in the axial dimension of each of the first and second clutches 24 and 25, thus ensuring a necessary volume.

[Embodiment 5]

Figure 16:
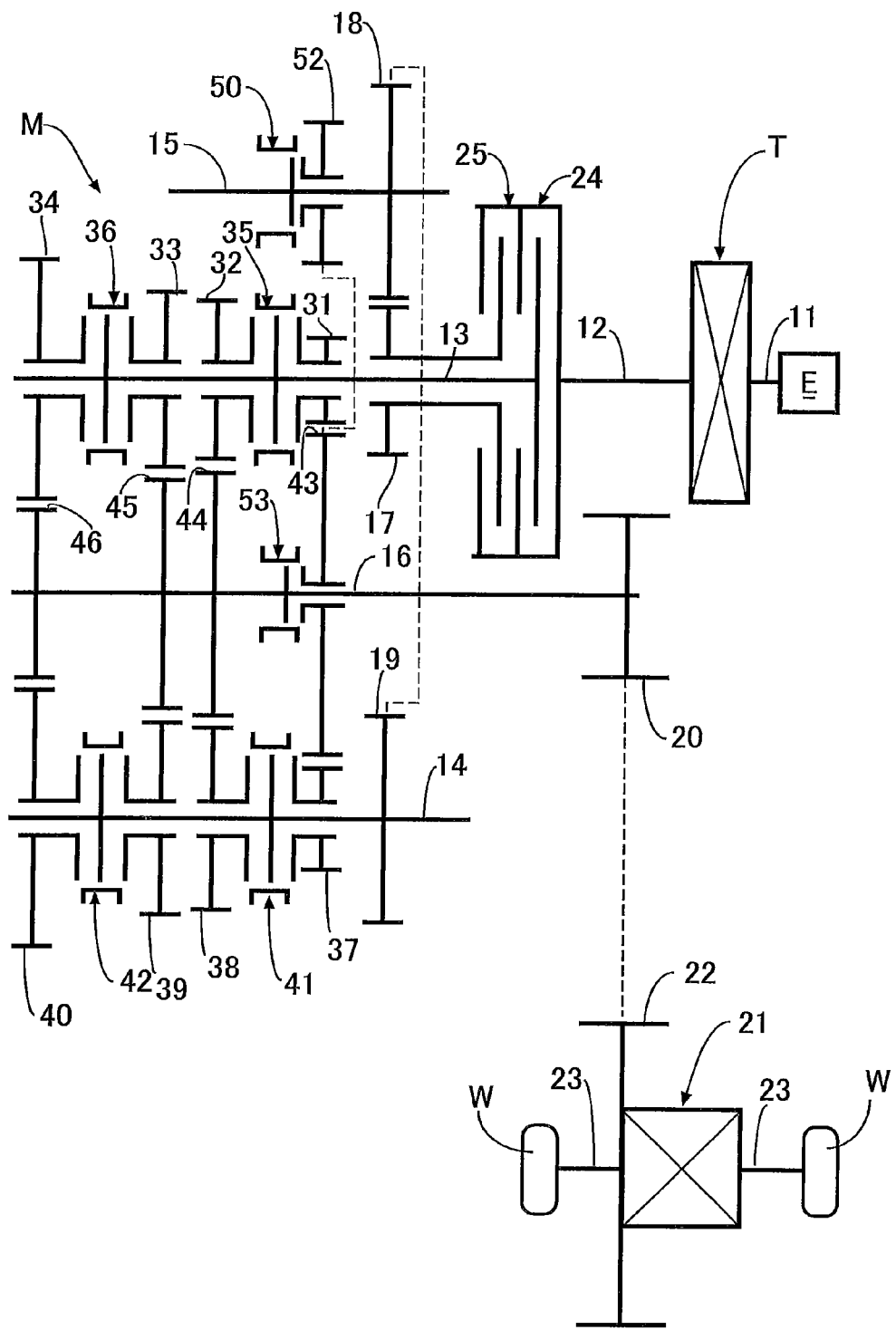
FIG. 16 is a skeleton diagram of a transmission. (fifth embodiment)

A fifth embodiment of the present invention is now explained by reference to FIG. 16.

The fifth embodiment is a modification of the fourth embodiment, and the first speed-second speed-reverse driven gear 43 of the fourth embodiment is relatively rotatably supported on an output shaft 16 and can be connected to the output shaft 16 by means of a seventh synchronizing device 53.

Since the output shaft 16 rotates at high speed in a high speed gear position such as a seventh speed gear position or an eighth speed gear position, a small diameter first speed drive gear 37, a second speed drive gear 31, and a reverse idle gear 52 meshing with the large diameter first speed-second speed-reverse driven gear 43 fixedly provided on the output shaft 16 would rotate idle at high speed, and there is a possibility that the durability of bearings supporting them might be badly affected. In the present embodiment, when establishing a high speed gear position, the first speed-second speed-reverse driven gear 43 is detached from the output shaft 16 by means of the seventh synchronizing device 53, thus solving the above-mentioned problem.

[Embodiment 6]

Figure 17:
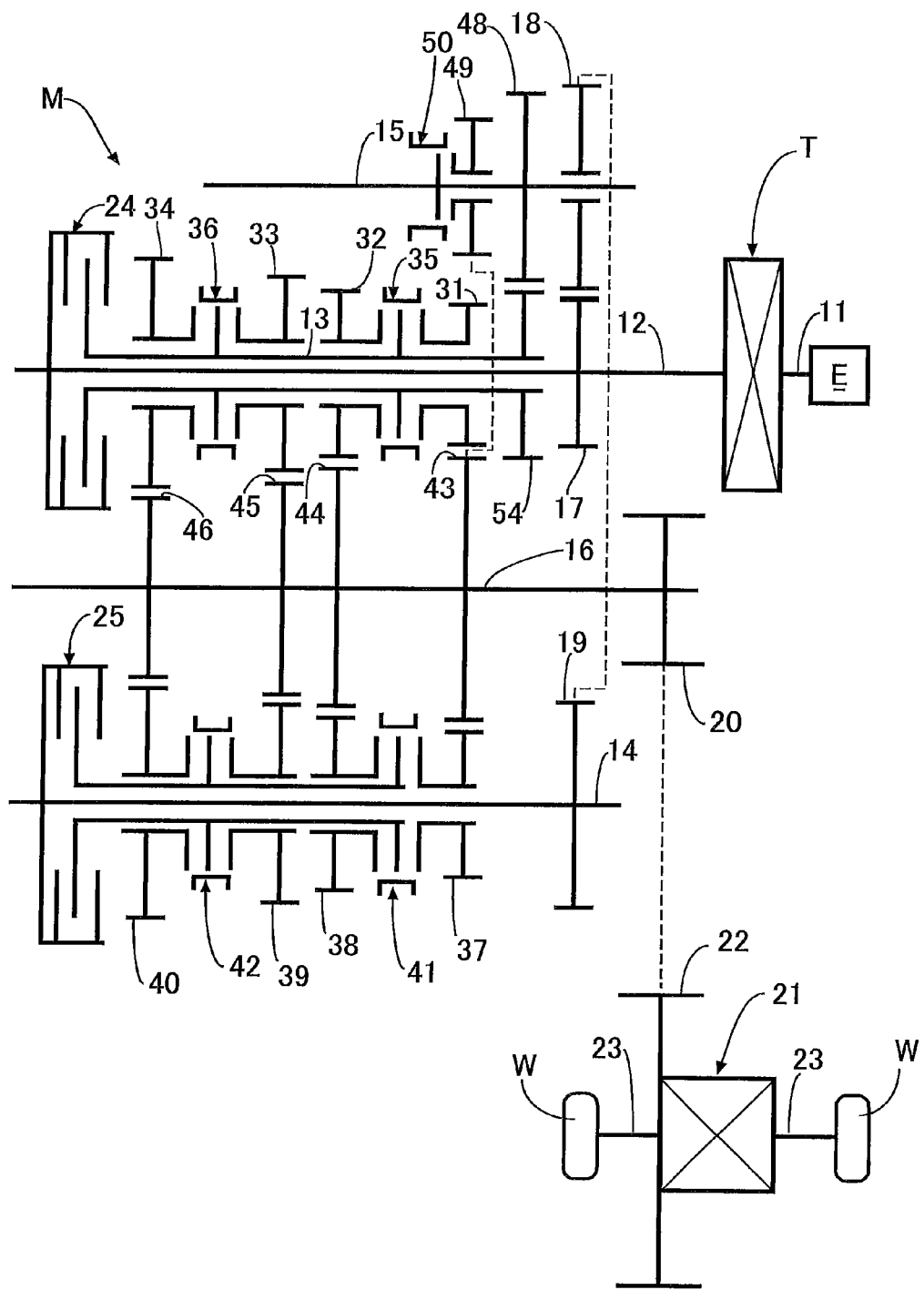
FIG. 17 is a skeleton diagram of a transmission. (sixth embodiment)

A sixth embodiment of the present invention is now explained by reference to FIG. 17 and FIG. 18.

The sixth embodiment is a modification of the third embodiment; in the third embodiment the first reverse idle gear 48 can be connected to the idle shaft 15 by means of the sixth synchronizing device 50, and the second reverse idle gear 49 is fixedly provided on the idle shaft 15, whereas in the sixth embodiment a second reverse idle gear 49 can be connected to an idle shaft 15 by means of a sixth synchronizing device 50, and a first reverse idle gear 48 is fixedly provided on the idle shaft 15.

Furthermore, in the third embodiment a driving force is inputted into the first reverse idle gear 48 from the gear 51 of the first synchronizing device 35 provided on the first auxiliary input shaft 13, whereas in the sixth embodiment a driving force is inputted from a reverse drive gear 54 fixedly provided on the right-hand end of a first auxiliary input shaft 13 to the first reverse idle gear 48. Moreover, in the third embodiment the second speed drive gear 31 is fixedly provided on the first auxiliary input shaft 13, whereas in the sixth embodiment it is relatively rotatably supported on the first auxiliary input shaft 13.

Figure 18:
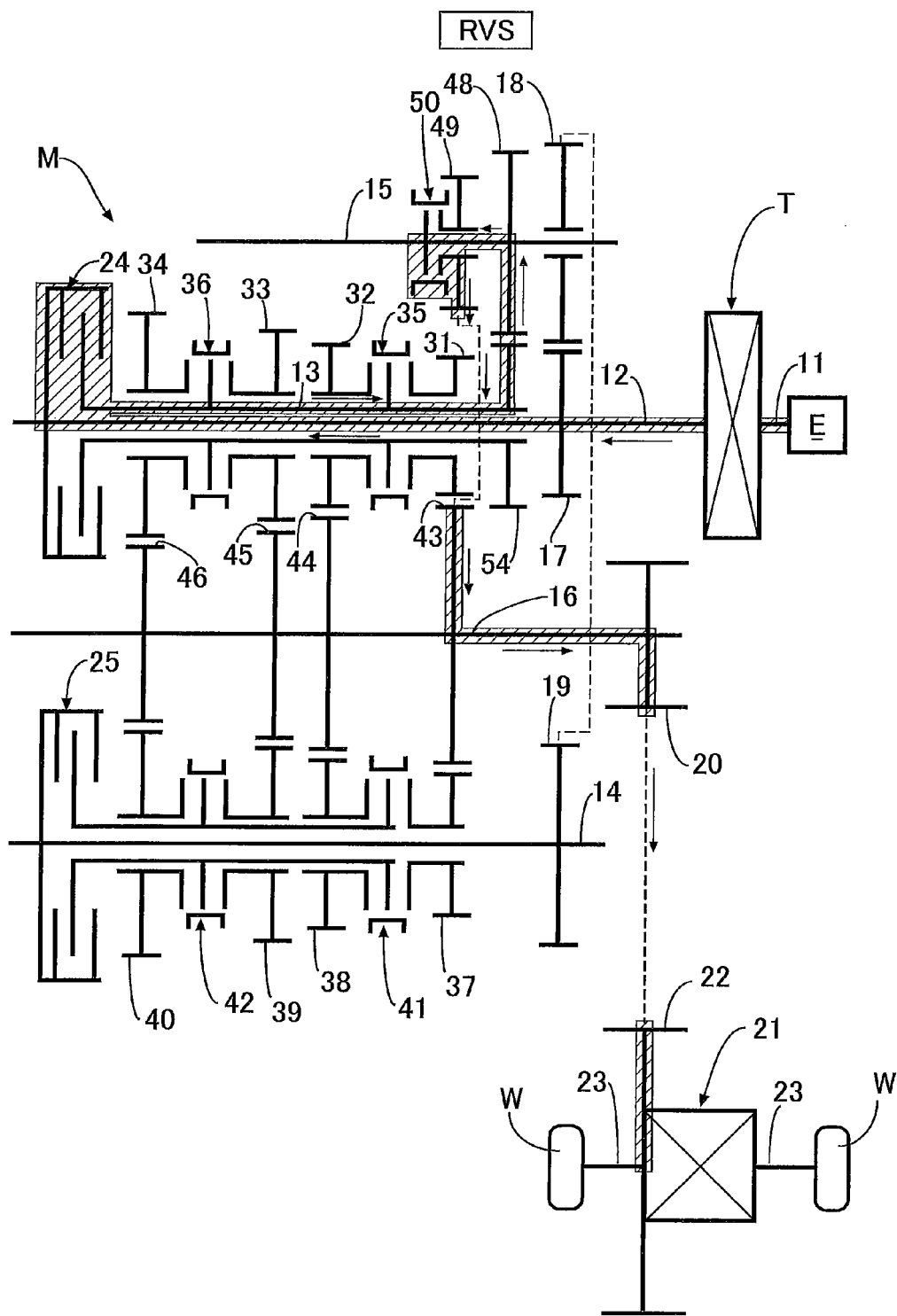
FIG. 18 is a diagram showing a state in which a reverse gear position is established. (sixth embodiment)

As shown in FIG. 18, when establishing a reverse gear position, in a state in which the second reverse idle gear 49 is connected to the idle shaft 15 by means of the sixth synchronizing device 50, a first clutch 24 is engaged so as to connect a main input shaft 12 to the first auxiliary input shaft 13. In this state, the driving force of an engine E is transmitted to driven wheels W and W via the path: torque converter T→main input shaft 12→first clutch 24→first auxiliary input shaft 13→reverse drive gear 54→first reverse idle gear 48→idle shaft 15→sixth synchronizing device 50→second reverse idle gear 49→first speed-second speed-reverse driven gear 43→output shaft 16→final drive gear 20→final driven gear 22→differential gear 21→drive shafts 23 and 23. In this process, since the first and second reverse idle gears 48 and 49 are present in the transmission path for the driving force, the rotational direction of the output shaft 16 becomes reversed from that when establishing a forward gear position, and the driven wheels W and W reversely rotate in the reverse direction.

In the first and second embodiments, since the fourth speed-reverse drive gear 32 and the third speed-fourth speed driven gear 44 rotate when establishing the reverse gear position, it is necessary to release the connection between the third speed-fourth speed driven gear 44 and the output shaft 16 by means of the fifth synchronizing device 47, but in the sixth embodiment, since the first reverse idle gear 48 is driven by the reverse drive gear 54 provided on the first auxiliary input shaft 13, a third speed-fourth speed driven gear 44 does not rotate, and it is therefore unnecessary to use a fifth synchronizing device 47, thus further cutting the number of components and reducing the axial dimension of a transmission M.

The first to sixth embodiments of the present invention are explained above, but the present invention may be modified in a variety of ways as long as the modifications do not depart from the spirit and scope thereof.

For example, the automatic transmission M of the first to sixth embodiments includes the torque converter T, but when a further reduction in the axial dimension is required, the torque converter T can be eliminated.

Furthermore, in the first to sixth embodiments, the automatic transmission M is illustrated, but an automated manual clutch may be provided at the position for the torque converter T.

Moreover, when establishing the reverse gear position, instead of connecting reverse idle gears 48, 49, and 52 to the idle shaft 15 by means of the sixth synchronizing device 50, the first speed-second speed-reverse driven gear 43 (gear at lowest gear position in the present invention), which is on the output shaft 16 and meshes with reverse idle gears 48, 49, and 52, may be connected to the output shaft 16 by means of a synchronizing device.

Furthermore, the first and second clutches 24 and 25 may be used as starting clutches as well as gear clutches.

Moreover, the first and second clutches 24 and 25 are not limited to multiple plate wet clutches and may be dry clutches.

[Embodiment 7]

A seventh embodiment of the present invention is now explained by reference to FIG. 19 to FIG. 29.

Figure 19:
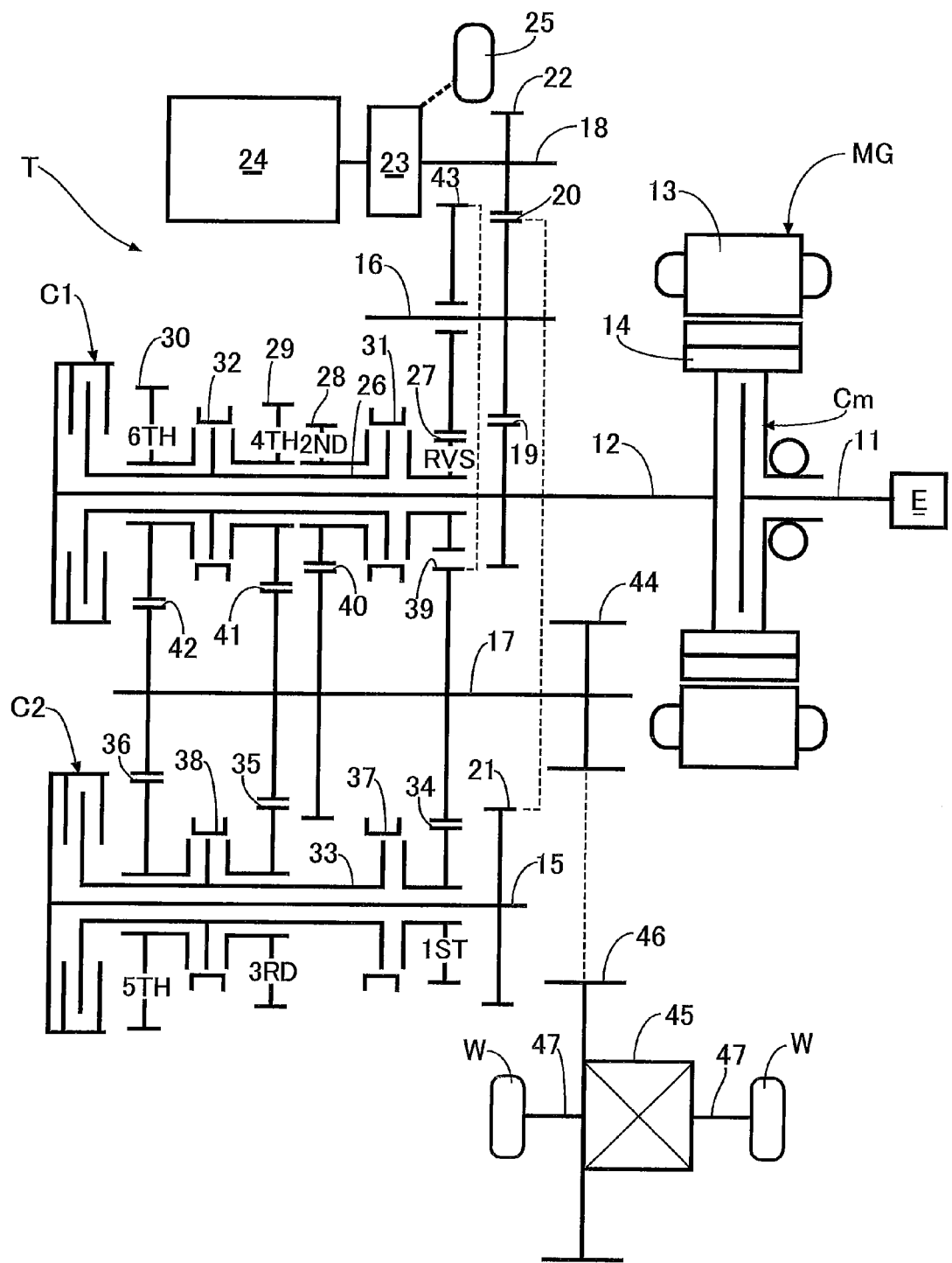
FIG. 19 is a skeleton diagram of a transmission. (seventh embodiment)

As shown in FIG. 19, in a twin clutch type transmission T applied to a hybrid vehicle, a first auxiliary input shaft 12 is disposed coaxially with a main input shaft 11 to which the driving force of an engine E is inputted, and a main clutch Cm and a motor/generator MG are disposed between the main input shaft 11 and the first auxiliary input shaft 12. The motor/generator MG, which is disposed coaxially so as to surround the outer periphery of the main clutch Cm, includes a stator 13 and a rotor 14, and the rotor 14 is connected to the first auxiliary input shaft 12.

A second auxiliary input shaft 15, an idle shaft 16, an output shaft 17, and an auxiliary equipment drive shaft 18 are disposed in parallel to the main input shaft 11 and the first auxiliary input shaft 12, an idle drive gear 19 fixedly provided on the first auxiliary input shaft 12 meshes with an idle gear 20 fixedly provided on the idle shaft 16, and this idle gear 20 meshes with an idle driven gear 21 fixedly provided on the second auxiliary input shaft 15. Therefore, the first auxiliary input shaft 12 and the second auxiliary input shaft 15 are always connected via the idle drive gear 19, the idle gear 20, and the idle driven gear 21, and rotate in the same direction at a constant rotational speed ratio determined by the numbers of teeth of the idle drive gear 19, the idle gear 20, and the idle driven gear 21.

When the auxiliary equipment drive shaft 18 is rotated by an auxiliary drive gear 22 meshing with the idle gear 20 fixedly provided on the idle shaft 16, a hydraulic pump 23 and an air conditioning compressor 24 provided on the auxiliary equipment drive shaft 18 are driven. Connected to the hydraulic pump 23 is an accumulator 25 for storing fluid pressure generated thereby.

A first clutch C1 is disposed on a shaft end of the first auxiliary input shaft 12 in order to provide connection and disconnection between the first auxiliary input shaft 12 and a first sleeve 26 relatively rotatably fitted around the outer periphery thereof. A reverse drive gear 27, a second speed drive gear 28, a fourth speed drive gear 29, and a sixth speed drive gear 30 are relatively rotatably supported on the first sleeve 26; the reverse drive gear 27 and the second speed drive gear 28 can be selectively connected to the first sleeve 26 by means of a reverse-second speed synchronizing device 31, and the fourth speed drive gear 29 and the sixth speed drive gear 30 can be selectively connected to the first sleeve 26 by means of a fourth speed-sixth speed synchronizing device 32.

A second clutch C2 is disposed on a shaft end of the second auxiliary input shaft 15 in order to provide connection and disconnection between the second auxiliary input shaft 15 and a second sleeve 33 relatively rotatably fitted around the outer periphery thereof. A first speed drive gear 34, a third speed drive gear 35, and a fifth speed drive gear 36 are relatively rotatably supported on the second sleeve 33; the first speed drive gear 34 can be connected to the second sleeve 33 by means of a first speed synchronizing device 37, and the third speed drive gear 35 and the fifth speed drive gear 36 can be selectively connected to the second sleeve 33 by means of a third speed-fifth speed synchronizing device 38.

A first speed-reverse driven gear 39, a second speed driven gear 40, a third speed-fourth speed driven gear 41, and a fifth speed-sixth speed driven gear 42 are fixedly provided on the output shaft 17, and a reverse idle gear 43 is relatively rotatably supported on the idle shaft 16. The reverse drive gear 27 of the first sleeve 26 meshes with the first speed-reverse driven gear 39 via the reverse idle gear 43 of the idle shaft 16, and the first speed drive gear 34 of the second sleeve 33 meshes therewith. The second speed drive gear 28 of the first sleeve 26 meshes with the second speed driven gear 40. The fourth speed drive gear 29 of the first sleeve 26 and the third speed drive gear 35 of the second sleeve 33 mesh with the third speed-fourth speed driven gear 41. The sixth speed drive gear 30 of the first sleeve 26 and the fifth speed drive gear 36 of the second sleeve 33 mesh with the fifth speed-sixth speed driven gear 42.

A final drive gear 44 fixedly provided on the output shaft 17 meshes with a final driven gear 46 provided on a differential gear 45, and driven wheels W and W are connected to axles 47 and 47 extending left and right from the differential gear 45.

The operation of the seventh embodiment having the above-mentioned arrangement is now explained.

Figure 20:
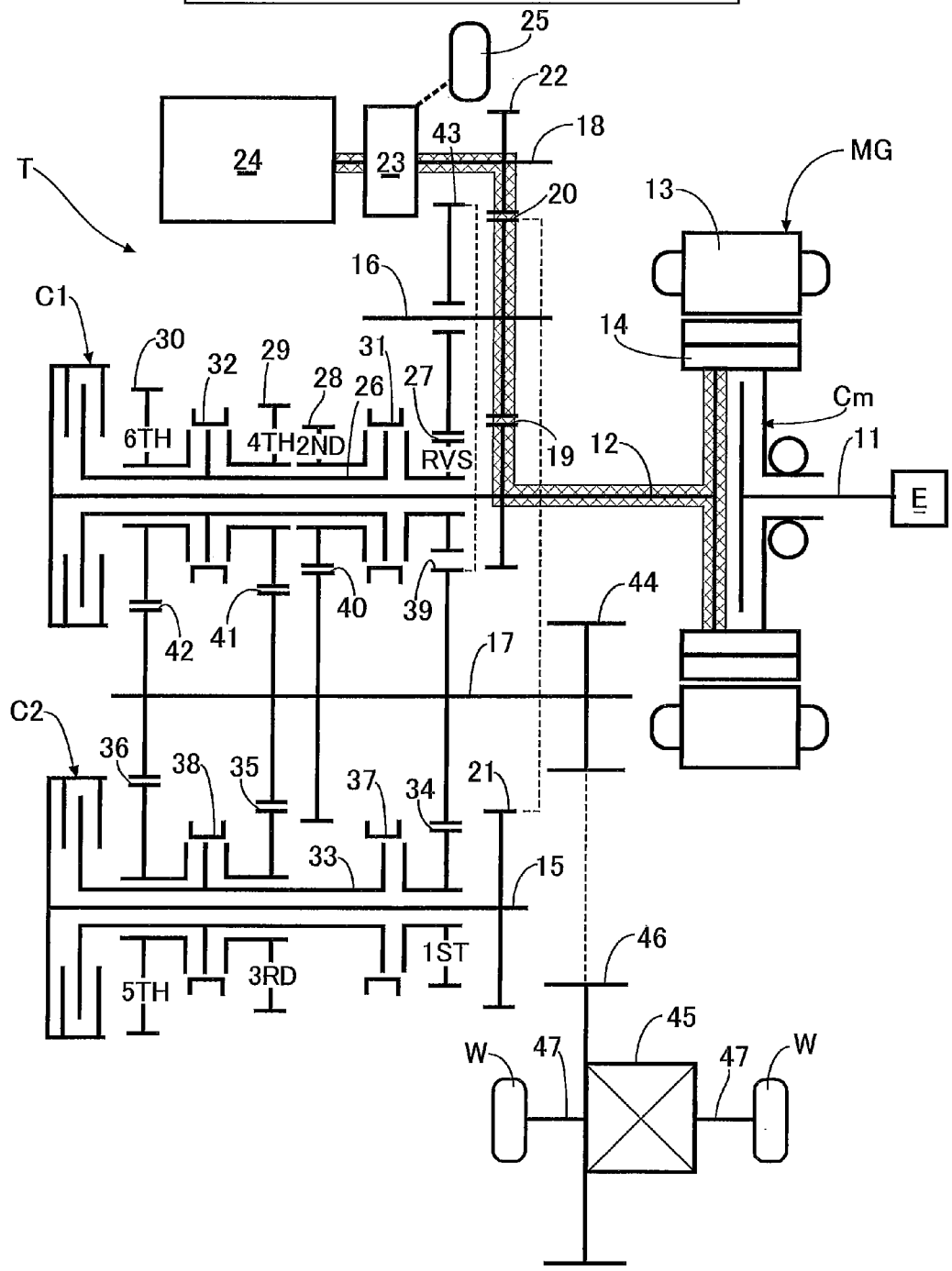
FIG. 20 is a diagram for explaining a driving force transmission path when driving auxiliary equipment by means of a motor/generator. (seventh embodiment)

As shown in FIG. 20, when the motor/generator MG is driven with the transmission T in a neutral state, the driving force of the motor/generator MG is transmitted via the path: first auxiliary input shaft 12→idle drive gear 19→idle gear 20→auxiliary drive gear 22→auxiliary equipment drive shaft 18, thus driving the hydraulic pump 23 and the air conditioning compressor 24. The accumulator 25 is charged with pressure by operation of the hydraulic pump 23, thus enabling engagement of the second clutch C2 that is necessary for starting the vehicle in a first speed gear position. Once the vehicle starts, since the first auxiliary input shaft 12 and the second auxiliary input shaft 15 always rotate during traveling, the hydraulic pump 23 operates in association therewith, thus ensuring the fluid pressure necessary for gear shifting.

Figure 21:
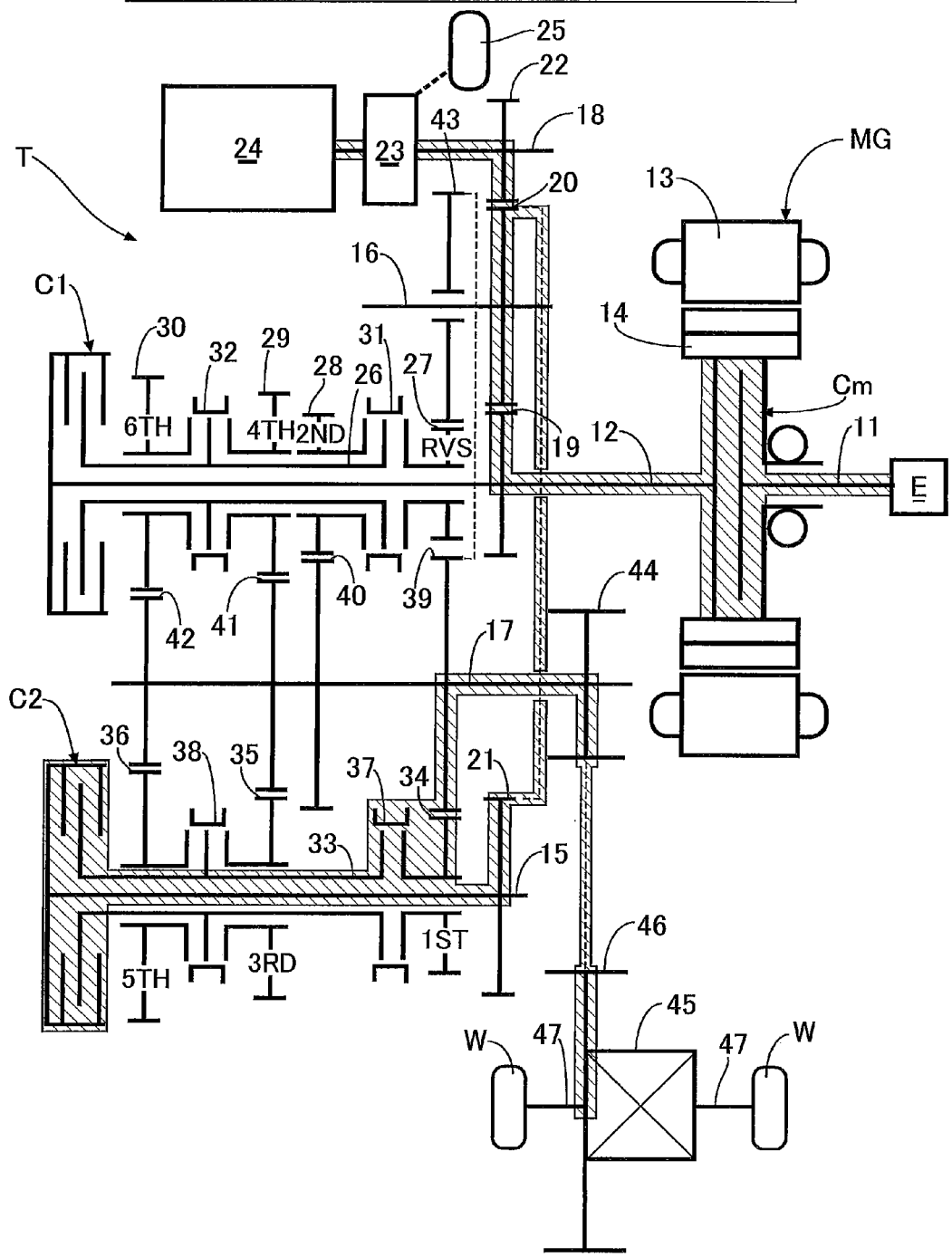
FIG. 21 is a diagram for explaining a driving force transmission path when establishing a first speed gear position. (seventh embodiment)

As shown in FIG. 21, when establishing the first speed gear position, the main clutch Cm is engaged so as to connect the main input shaft 11 to the first auxiliary input shaft 12, the second clutch C2 is engaged so as to connect the second auxiliary input shaft 15 to the second sleeve 33, and the first speed synchronizing device 37 is operated so as to connect the first speed drive gear 34 to the second sleeve 33. As a result, the driving force of the engine E is transmitted to the driven wheels W and W via the path: main input shaft 11→main clutch Cm→first auxiliary input shaft 12→idle drive gear 19→idle gear 20→idle driven gear 21→second auxiliary input shaft 15→second clutch C2→second sleeve 33→first speed synchronizing device 37→first speed drive gear 34→first speed-reverse driven gear 39→output shaft 17→final drive gear 44→final driven gear 46→differential gear 45→axles 47 and 47.

Figure 22:
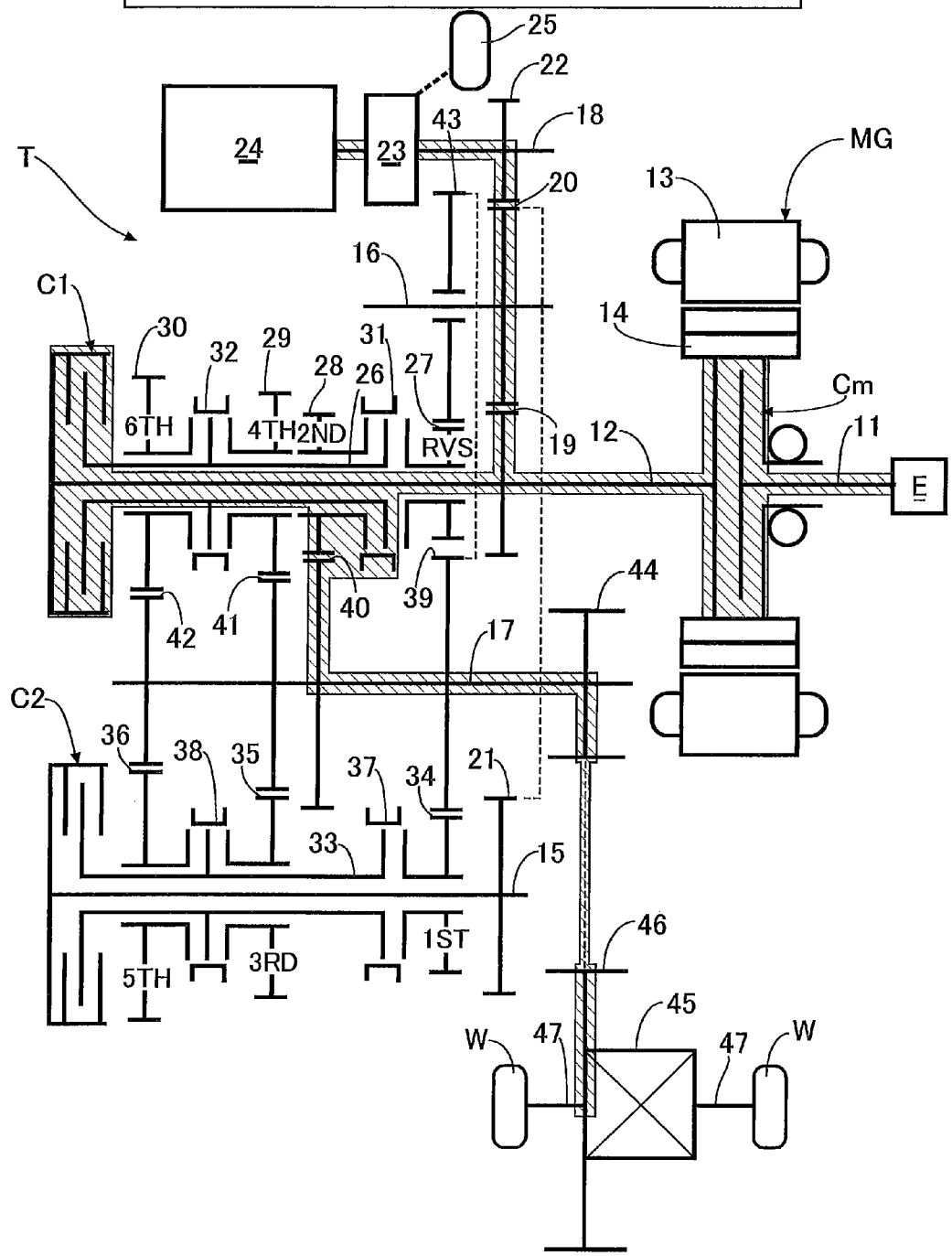
FIG. 22 is a diagram for explaining a driving force transmission path when establishing a second speed gear position. (seventh embodiment)

As shown in FIG. 22, when establishing a second speed gear position, the main clutch Cm is engaged so as to connect the main input shaft 11 to the first auxiliary input shaft 12, the first clutch C1 is engaged so as to connect the first auxiliary input shaft 12 to the first sleeve 26, and the reverse-second speed synchronizing device 31 is operated so as to connect the second speed drive gear 28 to the first sleeve 26. As a result, the driving force of the engine E is transmitted to the driven wheels W and W via the path: main input shaft 11→main clutch Cm→first auxiliary input shaft 12→first clutch C1→first sleeve 26→reverse-second speed synchronizing device 31→second speed drive gear 28→second speed driven gear 40→output shaft 17→final drive gear 44→final driven gear 46→differential gear 45→axles 47 and 47.

Figure 23:
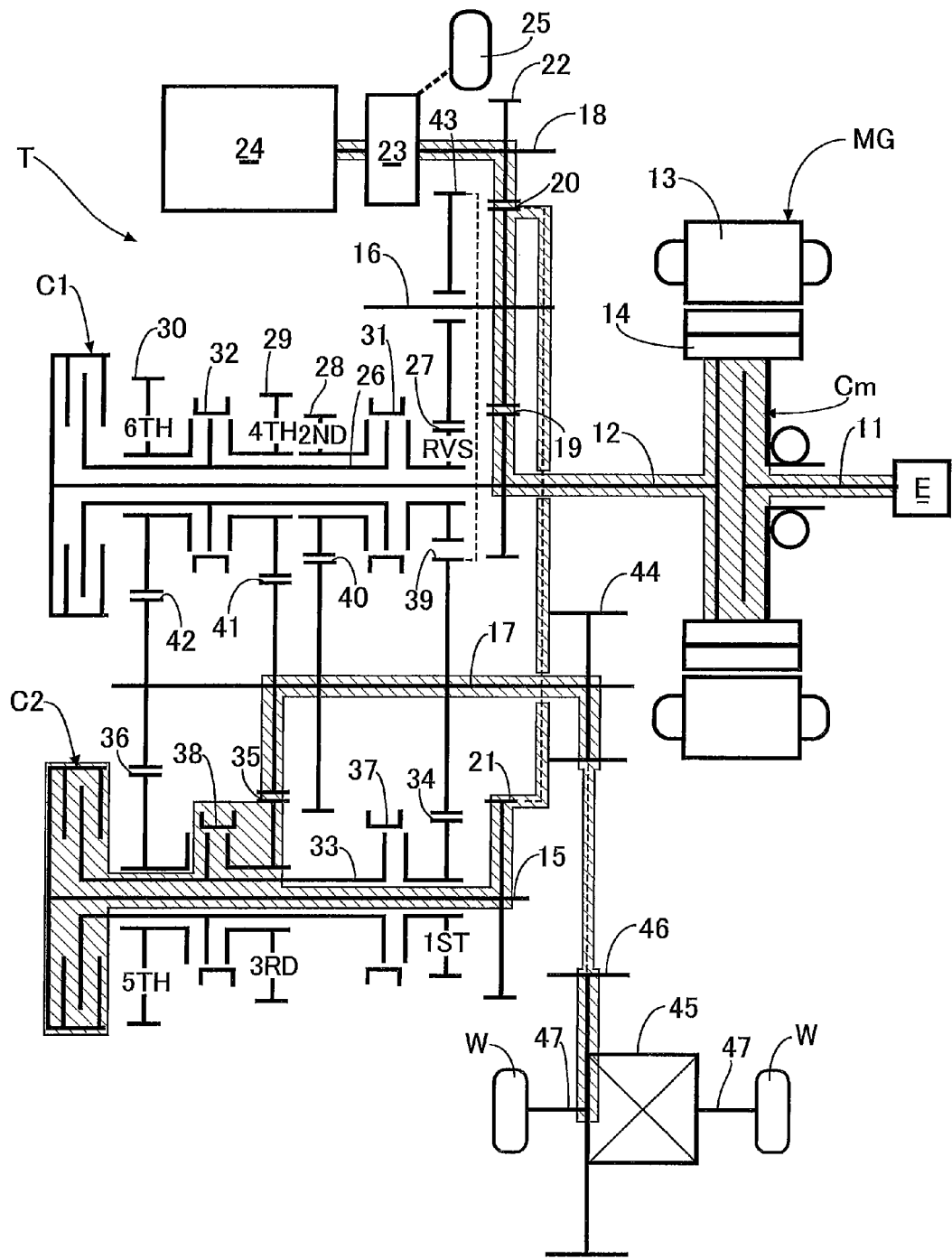
FIG. 23 is a diagram for explaining a driving force transmission path when establishing a third speed gear position. (seventh embodiment)

As shown in FIG. 23, when establishing a third speed gear position, the main clutch Cm is engaged so as to connect the main input shaft 11 to the first auxiliary input shaft 12, the second clutch C2 is engaged so as to connect the second auxiliary input shaft 15 to the second sleeve 33, and the third speed-fifth speed synchronizing device 38 is operated so as to connect the third speed drive gear 35 to the second sleeve 33. As a result, the driving force of the engine E is transmitted to the driven wheels W and W via the path: main input shaft 11→main clutch Cm→first auxiliary input shaft 12→idle drive gear 19→idle gear 20→idle driven gear 21→second auxiliary input shaft 15→second clutch C2→second sleeve 33→third speed-fifth speed synchronizing device 38→third speed drive gear 35→third speed-fourth speed driven gear 41→output shaft 17→final drive gear 44→final driven gear 46→differential gear 45→axles 47 and 47.

Figure 24:
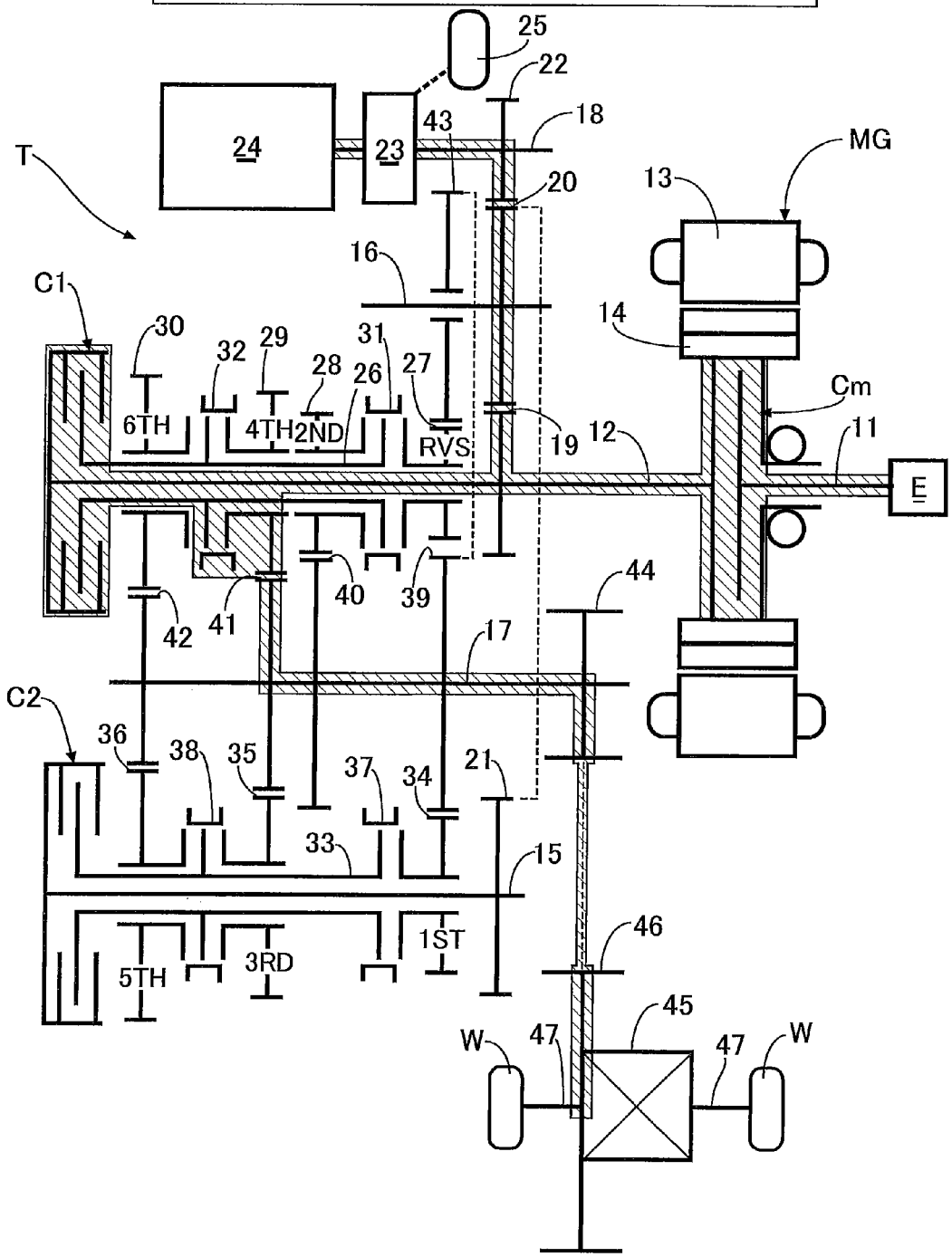
FIG. 24 is a diagram for explaining a driving force transmission path when establishing a fourth speed gear position. (seventh embodiment)

As shown in FIG. 24, when establishing a fourth speed gear position, the main clutch Cm is engaged so as to connect the main input shaft 11 to the first auxiliary input shaft 12, the first clutch C1 is engaged so as to connect the first auxiliary input shaft 12 to the first sleeve 26, and the fourth speed-sixth speed synchronizing device 32 is operated so as to connect the fourth speed drive gear 29 to the first sleeve 26. As a result, the driving force of the engine E is transmitted to the driven wheels W and W via the path: main input shaft 11→main clutch Cm→first auxiliary input shaft 12→first clutch C1→first sleeve 26→fourth speed-sixth speed synchronizing device 32→fourth speed drive gear 29→third speed-fourth speed driven gear 41→output shaft 17→final drive gear 44→final driven gear 46→differential gear 45→axles 47 and 47.

Figure 25:
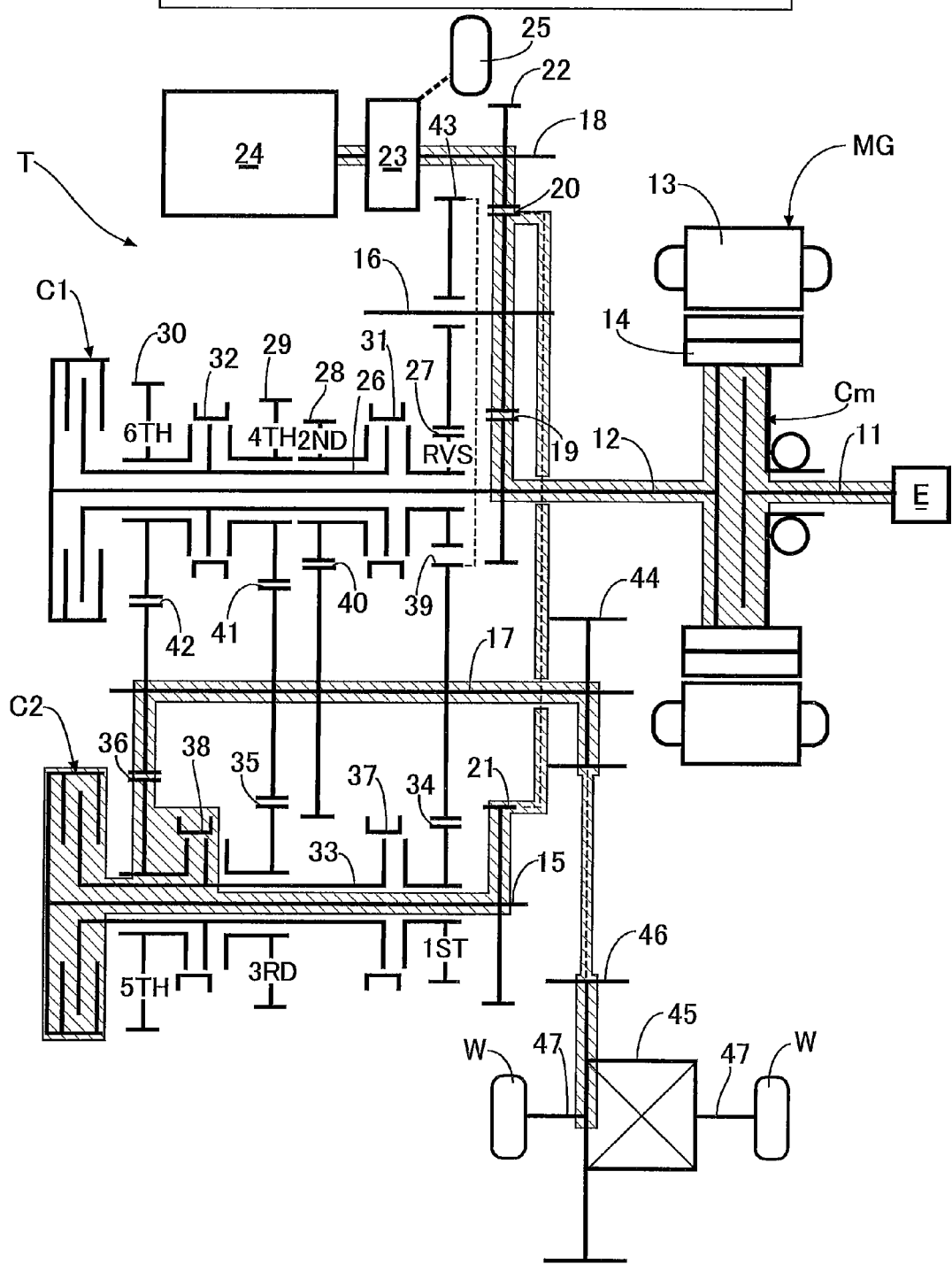
FIG. 25 is a diagram for explaining a driving force transmission path when establishing a fifth speed gear position. (seventh embodiment)

As shown in FIG. 25, when establishing a fifth speed gear position, the main clutch Cm is engaged so as to connect the main input shaft 11 to the first auxiliary input shaft 12, the second clutch C2 is engaged so as to connect the second auxiliary input shaft 15 to the second sleeve 33, and the third speed-fifth speed synchronizing device 38 is operated so as to connect the fifth speed drive gear 36 to the second sleeve 33. As a result, the driving force of the engine E is transmitted to the driven wheels W and W via the path: main input shaft 11→main clutch Cm→first auxiliary input shaft 12→idle drive gear 19→idle gear 20→idle driven gear 21→second auxiliary input shaft 15→second clutch C2→second sleeve 33→third speed-fifth speed synchronizing device 38→fifth speed drive gear 36→fifth speed-sixth speed driven gear 42→output shaft 17→final drive gear 44→final driven gear 46→differential gear 45→axles 47 and 47.

Figure 26:
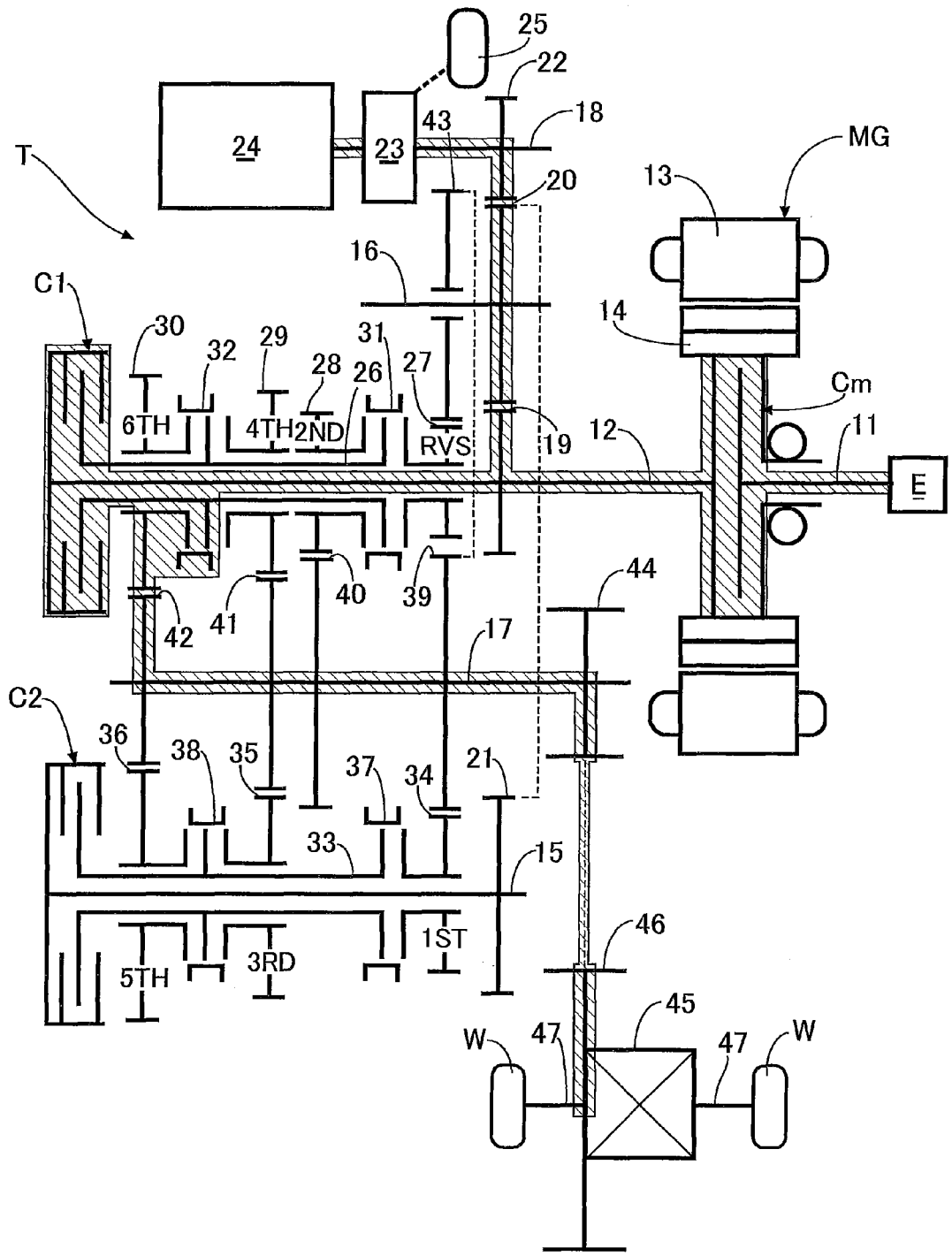
FIG. 26 is a diagram for explaining a driving force transmission path when establishing a sixth speed gear position. (seventh embodiment)

As shown in FIG. 26, when establishing a sixth speed gear position, the main clutch Cm is engaged so as to connect the main input shaft 11 to the first auxiliary input shaft 12, the first clutch C1 is engaged so as to connect the first auxiliary input shaft 12 to the first sleeve 26, and the fourth speed-sixth speed synchronizing device 32 is operated so as to connect the sixth speed drive gear 30 to the first sleeve 26. As a result, the driving force of the engine E is transmitted to the driven wheels W and W via the path: main input shaft 11→main clutch Cm→first auxiliary input shaft 12→first clutch C1→first sleeve 26→fourth speed-sixth speed synchronizing device 32→sixth speed drive gear 30→fifth speed-sixth speed driven gear 42→output shaft 17→final drive gear 44→final driven gear 46→differential gear 45→axles 47 and 47.

Figure 27:
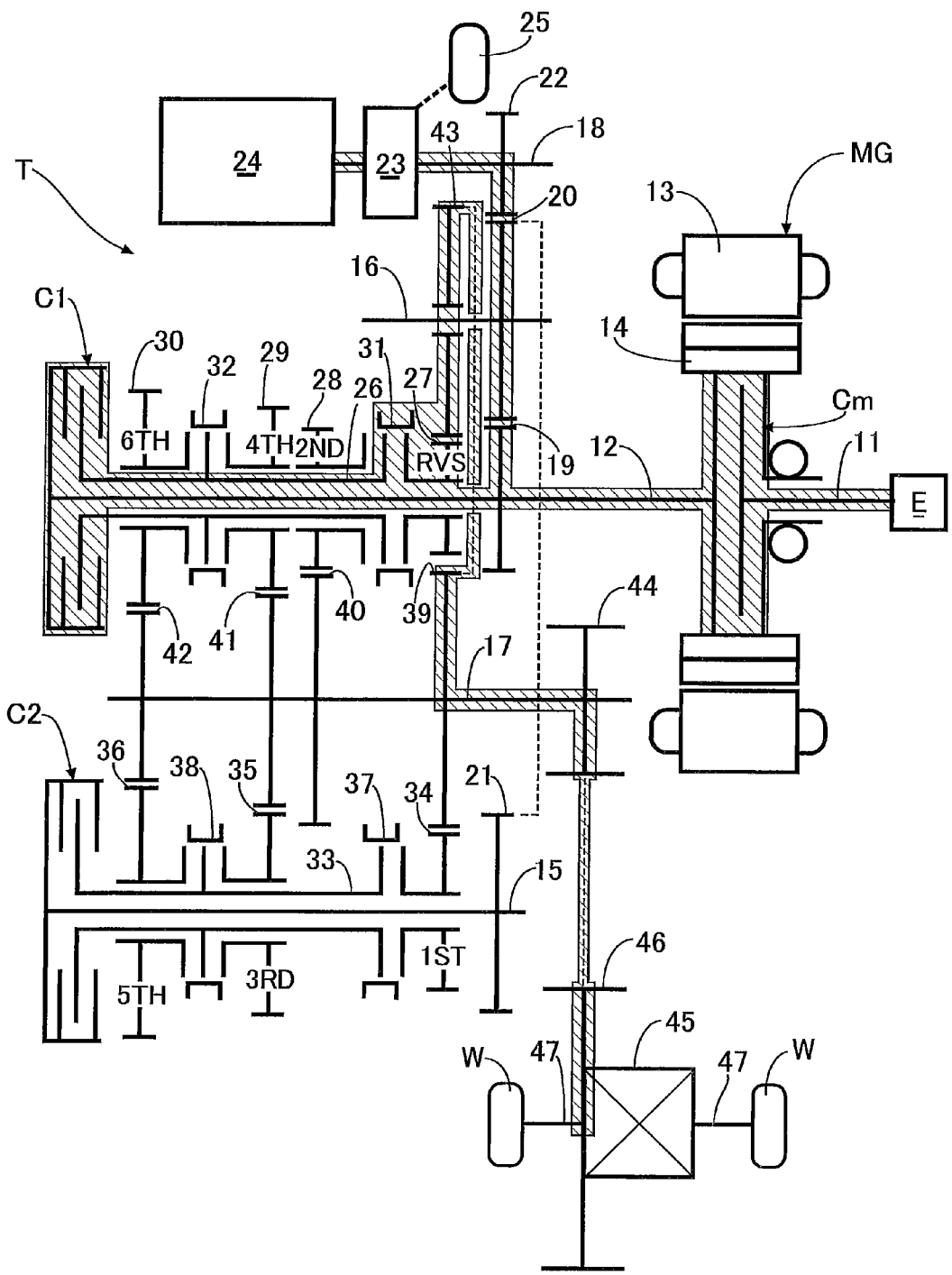
FIG. 27 is a diagram for explaining a driving force transmission path when establishing a reverse gear position. (seventh embodiment)

As shown in FIG. 27, when establishing a reverse gear position, the main clutch Cm is engaged so as to connect the main input shaft 11 to the first auxiliary input shaft 12, the first clutch C1 is engaged so as to connect the first auxiliary input shaft 12 to the first sleeve 26, and the reverse-second speed synchronizing device 31 is operated so as to connect the reverse drive gear 27 to the first sleeve 26. As a result, the driving force of the engine E is reversed in rotation and transmitted to the driven wheels W and W via the path: main input shaft 11→main clutch Cm→first auxiliary input shaft 12→first clutch C1→first sleeve 26→reverse-second speed synchronizing device 31→reverse drive gear 27→reverse idle gear 43→first speed-reverse driven gear 39→output shaft 17→final drive gear 44→final driven gear 46→differential gear 45→axles 47 and 47.

When establishing the above-mentioned first speed gear position to sixth speed gear position and reverse gear position, if the main clutch Cm is disengaged and the motor/generator MG is driven as a motor, the vehicle can be made to travel by the driving force of the motor/generator MG instead of the driving force of the engine E. Furthermore, if both the engine E and the motor/generator MG are driven in a state in which the main clutch Cm is engaged, the vehicle can be made to travel by assisting the driving force of the engine E with the driving force of the motor/generator MG. Furthermore, in all of the gear positions, regardless of whether traveling by the driving force of the engine E or traveling by the driving force of the motor/generator MG, the hydraulic pump 23 and the air conditioning compressor 24 are always driven.

Figure 28:
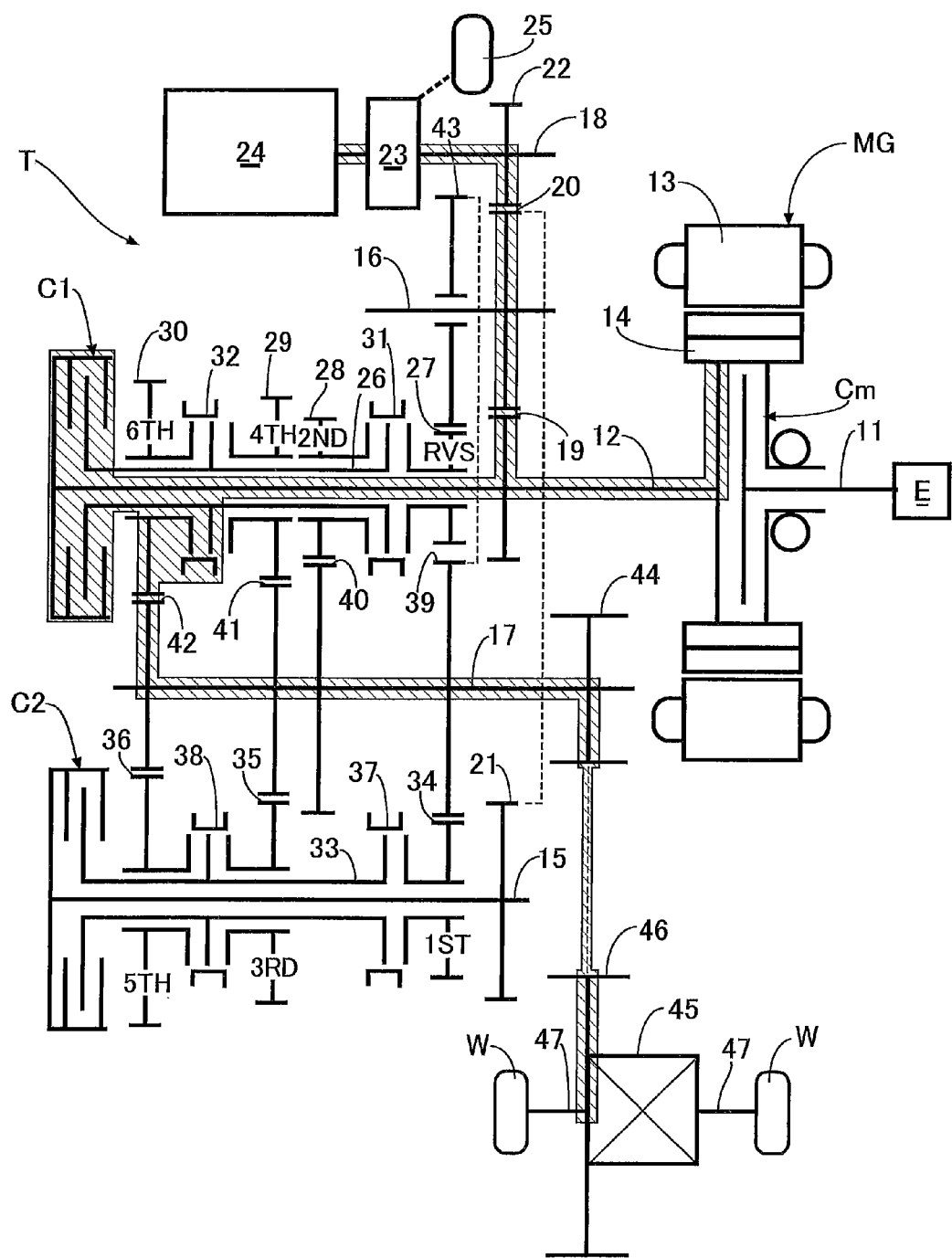
FIG. 28 is a diagram for explaining a driving force transmission path when carrying out regenerative braking in a sixth speed gear position. (seventh embodiment)

As shown in FIG. 28, for example, when the vehicle is decelerated while traveling in the sixth speed gear position, the main clutch Cm is disengaged so as to detach the first auxiliary input shaft 12 from the main input shaft 11 and the engine E, the motor/generator MG is made to function as a generator with the driving force transmitted back from the driven wheels W and W, and vehicle kinetic energy can be recovered as electrical energy by virtue of regenerative braking. This regenerative braking is also possible in all other gear positions as well as the sixth speed gear position.

Figure 29:
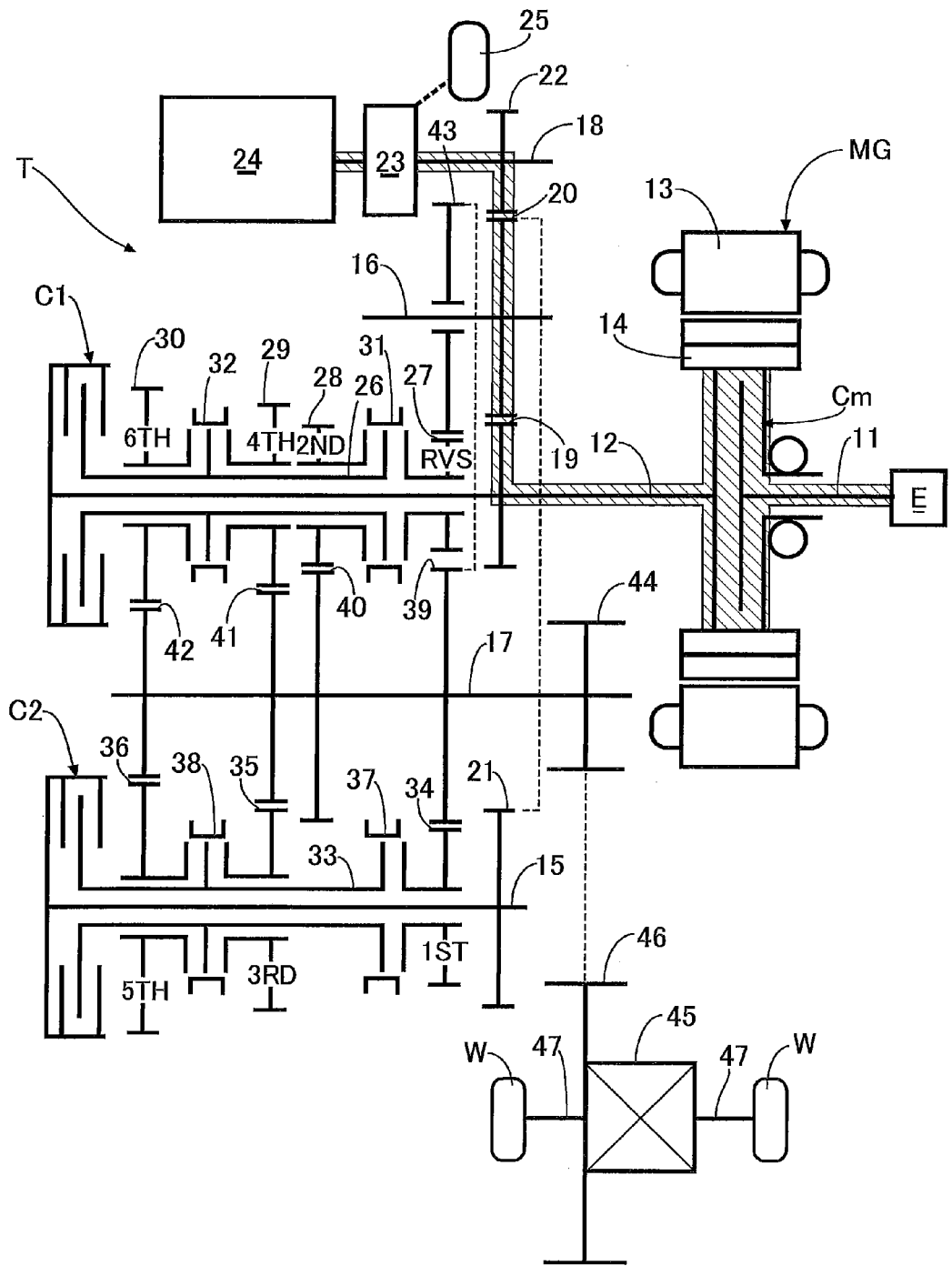
FIG. 29 is a diagram for explaining a driving force transmission path when generating power by means of an engine. (seventh embodiment)

As shown in FIG. 29, when the remaining capacity of a battery, which is not illustrated, falls below a predetermined value while the vehicle is stopped, if the main clutch Cm is engaged, since the driving force of the engine E is transmitted to the motor/generator MG via the path: main input shaft 11→main clutch Cm, the motor/generator MG can be driven as a generator, thus charging the battery. In this process, since the driving force of the engine E is transmitted via the path: main input shaft 11→main clutch Cm→first auxiliary input shaft 12→idle drive gear 19→idle gear 20→auxiliary drive gear 22→auxiliary equipment drive shaft 18, the hydraulic pump 23 and the air conditioning compressor 24 are also driven.

As hereinbefore described, since the motor/generator MG is connected in the power transmission path from the main clutch Cm to the first and second clutches C1 and C2, engaging either one of the first and second clutches C1 and C2 enables the driving force of the motor/generator MG to be selectively transmitted to all of the drive gears of the first auxiliary input shaft 12 and the second auxiliary input shaft 15, thus making all of the above-mentioned functions of the hybrid vehicle be exhibited. Furthermore, since the main clutch Cm disposed between the main input shaft 11 and the first auxiliary input shaft 12 is housed within the rotor 14 of the motor/generator MG, it becomes possible to dispose both the motor/generator MG and the main clutch Cm within the axial width of the motor/generator MG, and the twin clutch type transmission T can be applied to a hybrid vehicle while exploiting the original properties of reducing the axial dimension.

Furthermore, in a hybrid vehicle, fuel consumption is reduced by stopping the engine E idling; if the hydraulic pump 23 is stopped accompanying stopping of the engine E, when the vehicle is started by the motor/generator MG, there is the problem that fluid pressure for gear shifting cannot be supplied to the transmission T, but in the present embodiment since the hydraulic pump 23 can be driven by the driving force of the motor/generator MG (see FIG. 20), it becomes unnecessary to separately add an electric hydraulic pump, thus cutting the number of components and achieving a reduction in cost.

In particular, in the present embodiment, since the accumulator 25 is connected to the hydraulic pump 23, even in a state in which the motor/generator MG is stopped, it is possible to carry out gear shifting of the transmission T by means of fluid pressure stored in the accumulator 25. Therefore, when the vehicle is started by the motor/generator MG, the motor/generator MG that has until then driven the hydraulic pump 23 is temporarily stopped, the second clutch C2 is engaged so as to establish the first speed gear position, and the motor/generator MG is subsequently driven so as to start the vehicle, thus making it possible to improve durability by suppressing undesirable heat generation in the second clutch C2.

Furthermore, since the air conditioning compressor 24 can be driven by the driving force of the motor/generator MG (see FIG. 20) even in a state in which the engine E is stopped, it is possible to make the air conditioning compressor 24 always able to operate, thus preventing degradation of the interior environment.

[Embodiment 8]

An eighth embodiment of the present invention is now explained by reference to FIG. 30. In the eighth embodiment to an eighteenth embodiment, components corresponding to the components of the seventh embodiment are denoted by the same reference numerals and symbols as those for the components of the seventh embodiment, and duplication of the explanation is therefore omitted. Reference numerals and symbols used in the seventh to eighteenth embodiments are only used for the seventh to eighteenth embodiments, and are not related to reference numerals and symbols of other embodiments.

In the seventh embodiment the reverse-second speed synchronizing device 31 is disposed on the first sleeve 26 and the first speed-reverse driven gear 39 and the second speed driven gear 40 are fixedly provided on the output shaft 17, whereas in the eighth embodiment a second speed synchronizing device 51 is disposed on a first sleeve 26, a first speed-second speed-reverse driven gear 52 is fixedly provided on an output shaft 17, and a reverse idle gear 43 can be connected to an idle shaft 16 by means of a reverse synchronizing device 53.

Therefore, when establishing a second speed gear position, a main clutch Cm is engaged so as to connect a main input shaft 11 to a first auxiliary input shaft 12, a first clutch C1 is engaged so as to connect the first auxiliary input shaft 12 to the first sleeve 26, and the second speed synchronizing device 51 is operated so as to connect a second speed drive gear 28 to the first sleeve 26. As a result, the driving force of the engine E is transmitted to driven wheels W and W via the path: main input shaft 11→main clutch Cm→first auxiliary input shaft 12→first clutch C1→first sleeve 26→second speed synchronizing device 51→second speed drive gear 28→first speed-second speed-reverse driven gear 52→output shaft 17→final drive gear 44→final driven gear 46→differential gear 45→axles 47 and 47.

When establishing a reverse gear position, the main clutch Cm is engaged so as to connect the main input shaft 11 to the first auxiliary input shaft 12, the first clutch C1 is engaged so as to connect the first auxiliary input shaft 12 to the first sleeve 26, and the reverse synchronizing device 53 is operated so as to connect the reverse idle gear 43 to the idle shaft 16. As a result, the driving force of the engine E is reversed in rotation and transmitted to the driven wheels W and W via the path: main input shaft 11→main clutch Cm→first auxiliary input shaft 12→idle drive gear 19→idle gear 20→idle shaft 16→reverse synchronizing device 53→reverse idle gear 43→first speed-second speed-reverse driven gear 52→output shaft 17→final drive gear 44→final driven gear 46→differential gear 45→axles 47 and 47.

In accordance with the eighth embodiment, the same operational effects as those of the seventh embodiment can be achieved.

[Embodiment 9]

A ninth embodiment of the present invention is now explained by reference to FIG. 31.

The ninth embodiment is one in which the number of forward gear positions is increased from six speeds as in the seventh embodiment to seven speeds, and in contrast to the seventh embodiment, gears and synchronizing devices for odd-numbered positions, that is, a first speed-reverse drive gear 54, a third speed drive gear 35, a fifth speed drive gear 36, a seventh speed drive gear 55, a first speed-third speed synchronizing device 56, and a fifth speed-seventh speed synchronizing device 57 are supported on a first sleeve 26, and a reverse gear and gears and synchronizing devices for even-numbered positions, that is, a reverse drive gear 27, a second speed drive gear 28, a fourth speed drive gear 29, a sixth speed drive gear 30, a reverse-second speed synchronizing device 31, and a fourth speed-sixth speed synchronizing device 32 are supported on a second sleeve 33. A first speed-reverse driven gear 39, a second speed-third speed driven gear 58, a fourth speed-fifth speed driven gear 59, and a sixth speed-seventh speed driven gear 60 are fixedly provided on an output shaft 17.

[Embodiment 10]

A tenth embodiment of the present invention is now explained by reference to FIG. 32.

The tenth embodiment is one in which the number of forward gear positions is increased from six speeds as in the eighth embodiment to eight speeds; a second speed drive gear 28, a fourth speed drive gear 29, a sixth speed drive gear 30, an eighth speed drive gear 61, a second speed-fourth speed synchronizing device 62, and a sixth speed-eighth speed synchronizing device 63 are supported on a first sleeve 26, and a first speed drive gear 34, a third speed drive gear 35, a fifth speed drive gear 36, a seventh speed drive gear 55, a first speed-third speed synchronizing device 56, and a fifth speed-seventh speed synchronizing device 57 are supported on a second sleeve 33. A first speed-second speed driven gear 64, a second speed-third speed driven gear 41, a fifth speed-sixth speed driven gear 42, and a seventh speed-eighth speed driven gear 65 are fixedly provided on an output shaft 17.

In accordance with the ninth and tenth embodiments, while having an increased number of gear positions, the same operational effects as those of the seventh and eighth embodiments can be achieved.

[Embodiment 11 and Embodiment 12]

Figure 33:
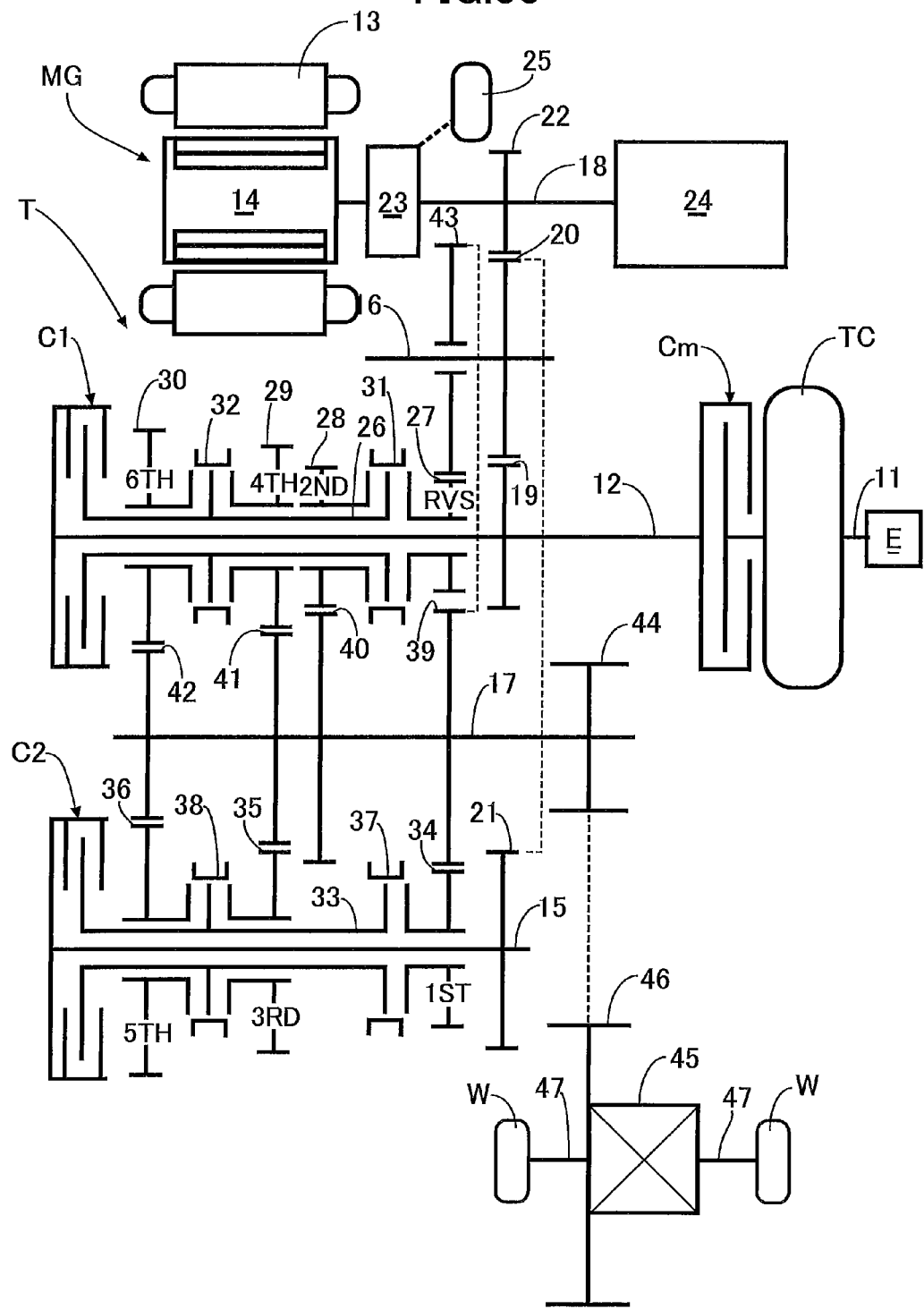
FIG. 33 is a skeleton diagram of a transmission. (eleventh embodiment)
Figure 34:
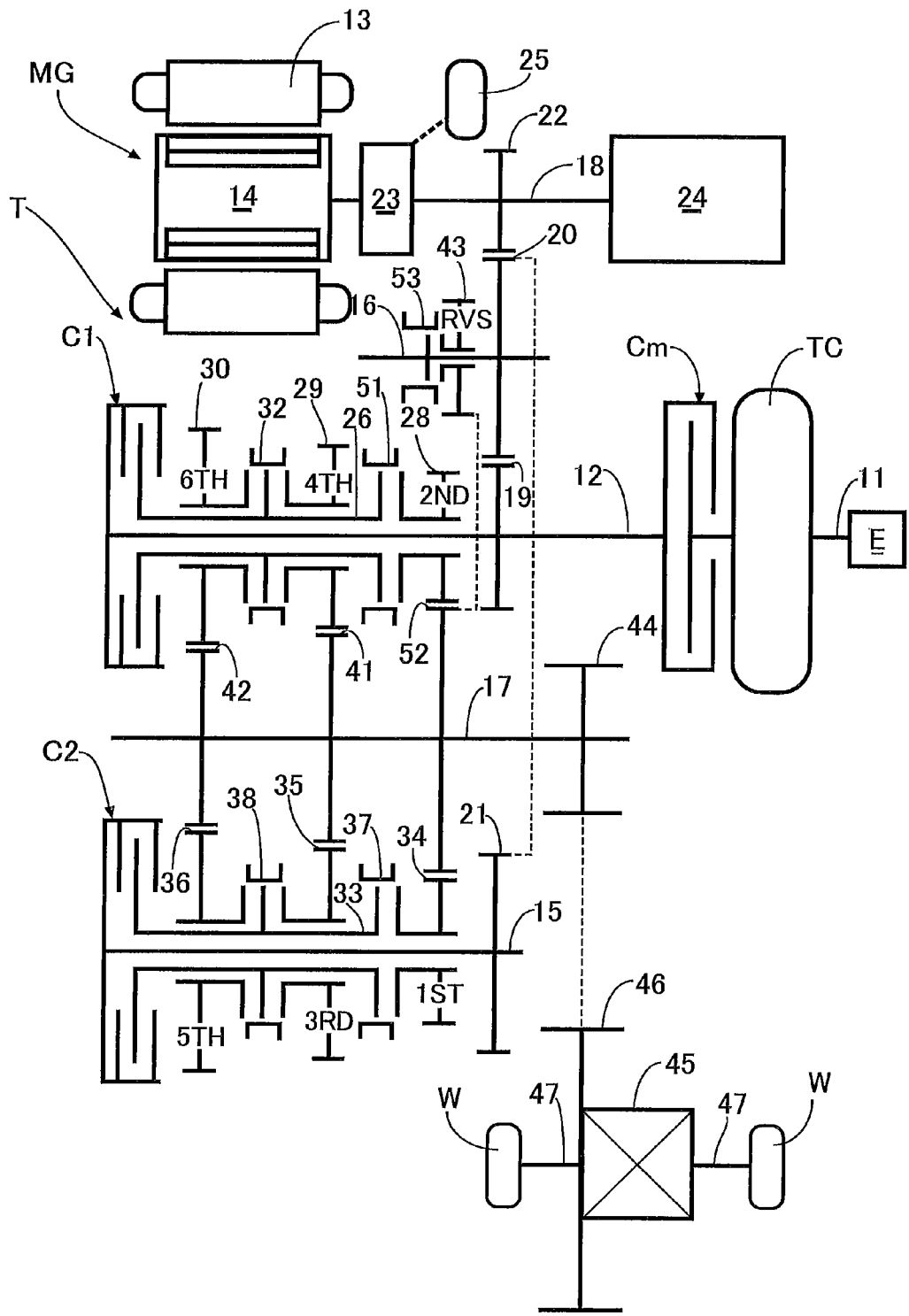
FIG. 34 is a skeleton diagram of a transmission. (twelfth embodiment)

An eleventh embodiment and a twelfth embodiment of the present invention are now explained by reference to FIG. 33 and FIG. 34 respectively.

The eleventh and twelfth embodiments are modifications of the above-mentioned seventh and eighth embodiments respectively; a motor/generator MG, which is provided so as to surround the main clutch Cm providing connection to the main input shaft 11 and the first auxiliary input shaft 12 in the seventh and eighth embodiments, is provided on an axis of an auxiliary equipment drive shaft 18. A torque converter TC is disposed between an engine E and the main clutch Cm. This torque converter TC can be omitted.

In accordance with the present embodiments, driving the motor/generator MG as a motor enables not only a hydraulic pump 23 and an air conditioning compressor 24 to be driven even when the engine E is stopped but also enables the driving force of the motor/generator MG to be transmitted from the auxiliary equipment drive shaft 18 to a first auxiliary input shaft 12 and a second auxiliary input shaft 15, and when the vehicle is decelerated the motor/generator MG can be made to function as a generator, thus carrying out regenerative braking.

Thus, in accordance with the eleventh and twelfth embodiments, while achieving the same operational effects as those of the seventh and eighth embodiments, the motor/generator MG is moved from an end part of the transmission T to a central part, thus contributing to a reduction in the axial dimension of the transmission T.

[Embodiment 13 and Embodiment 14]

Figure 35:
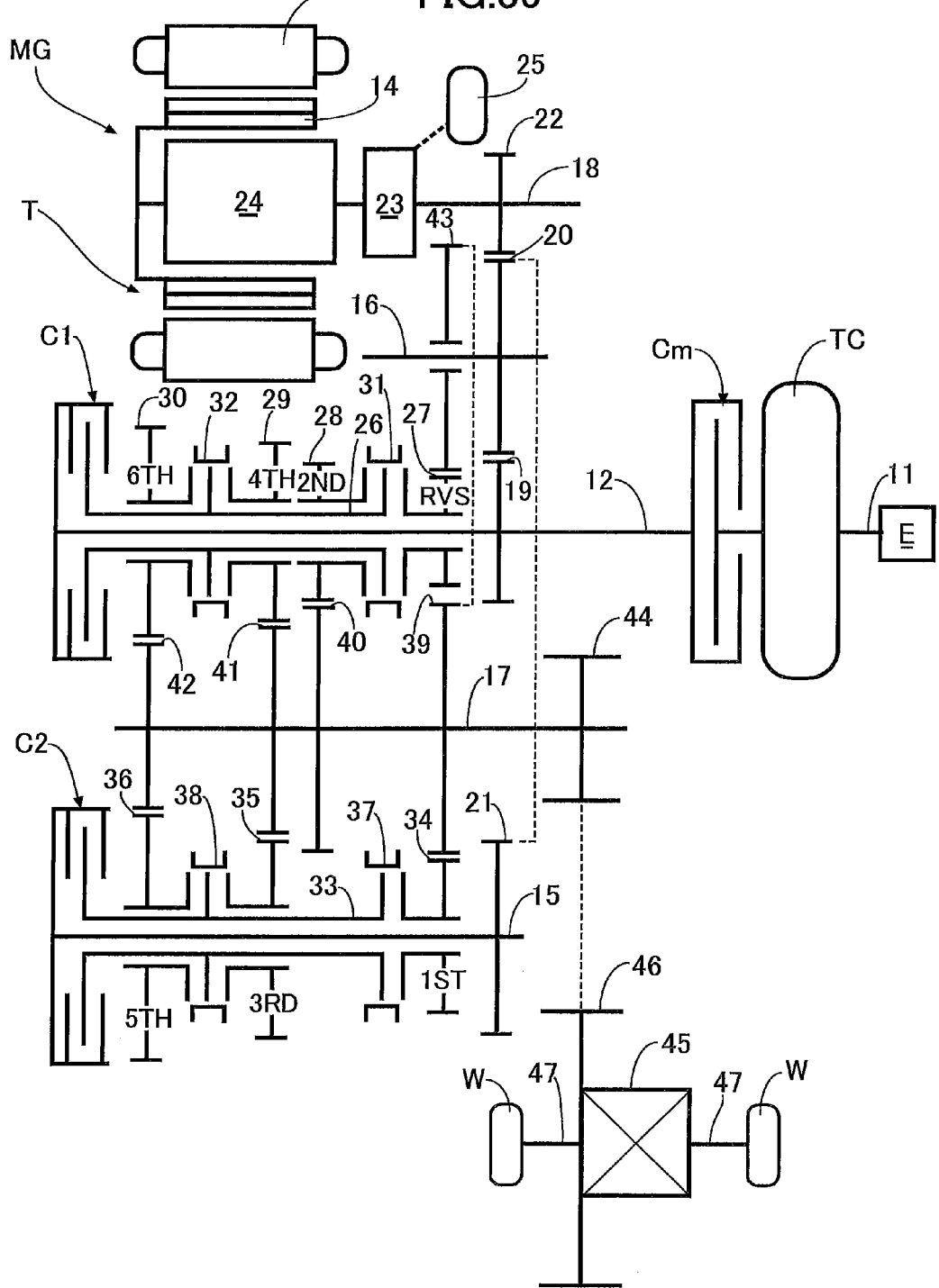
FIG. 35 is a skeleton diagram of a transmission. (thirteenth embodiment)
Figure 36:
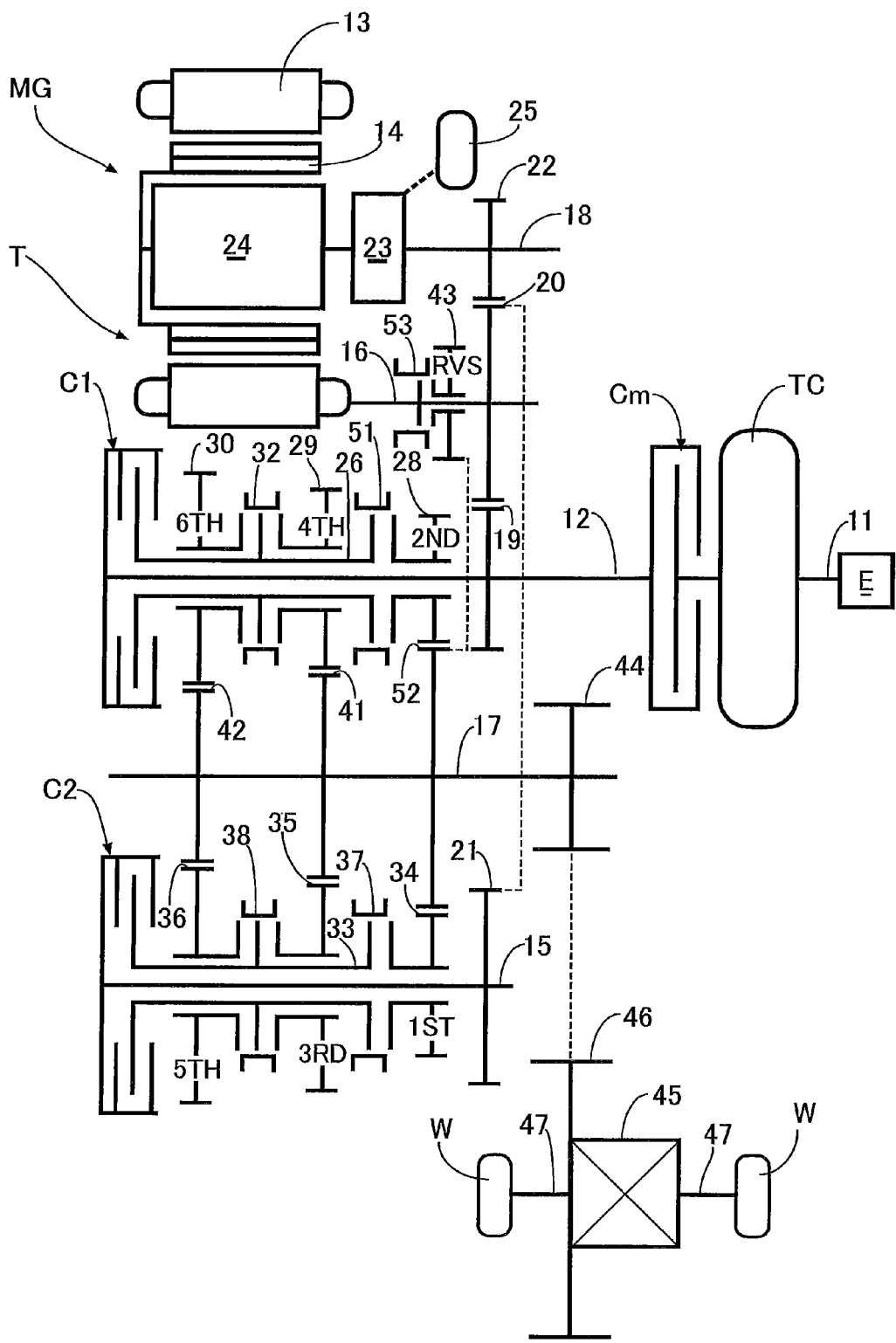
FIG. 36 is a skeleton diagram of a transmission. (fourteenth embodiment)
Figure 37:
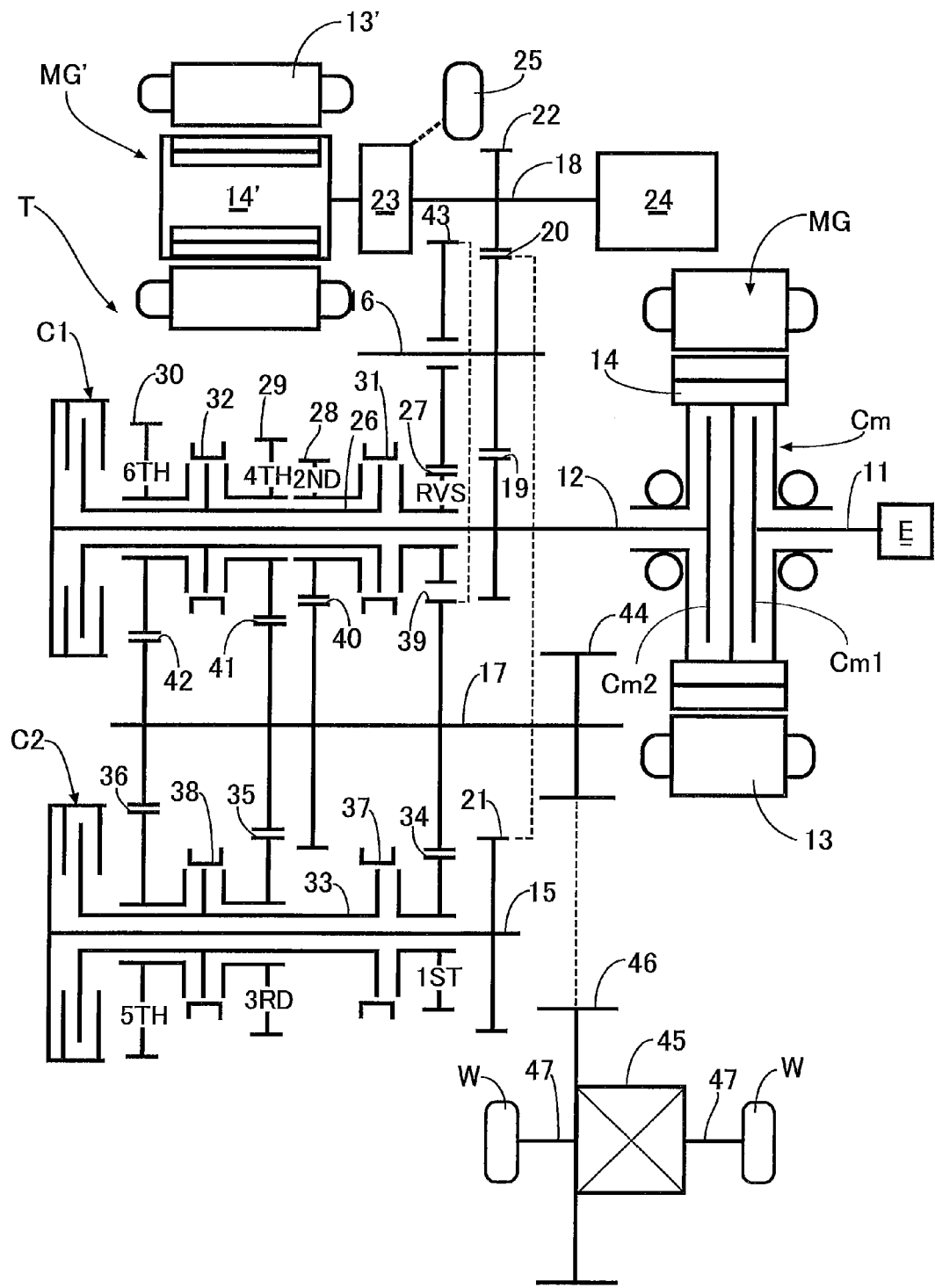
FIG. 37 is a skeleton diagram of a transmission. (fifteenth embodiment)

A thirteenth embodiment and a fourteenth embodiment of the present invention are now explained by reference to FIG. 35 and FIG. 36.

The thirteenth and fourteenth embodiments are modifications of the above-mentioned eleventh and twelfth embodiments respectively; an air conditioning compressor 24, which is disposed outside the motor/generator MG in the eleventh and twelfth embodiments, is housed within a rotor 14 of a motor/generator MG. In accordance with this arrangement, it becomes possible to house the air conditioning compressor 24 within the axial width of the motor/generator MG, thus reducing the axial dimension of the transmission T.

[Embodiment 15]

A fifteenth embodiment of the present invention is now explained by reference to FIG. 37 to FIG. 42.

The fifteenth embodiment is a combination of the seventh embodiment (see FIG. 19) and the eleventh embodiment (see FIG. 33); in addition to the motor/generator MG disposed between the main input shaft 11 and the first auxiliary input shaft 12 of the seventh embodiment, there is provided a second motor/generator MG' disposed coaxially with an auxiliary equipment drive shaft 18. The motor/generator MG and the second motor/generator MG' can be operated at the same time or independently from each other, and it is also possible for one thereof to function as a motor while the other functions as a generator.

Furthermore, the main clutch Cm of the seventh embodiment connects the main input shaft 11 to the rotor 14 of the motor/generator MG and the first auxiliary input shaft 12, but a main clutch Cm of the fifteenth and later embodiments includes a first main clutch Cm1 and a second main clutch Cm2, the first main clutch Cm1 connecting a rotor 14 of the motor/generator MG to a main input shaft 11, and the second main clutch Cm2 connecting the rotor 14 of the motor/generator MG to a first auxiliary input shaft 12.

In accordance with the fifteenth embodiment, compared with the operational mode of the transmission T of the seventh embodiment shown in FIG. 19 to FIG. 29, a greater variety of operational modes become possible.

Figure 38:
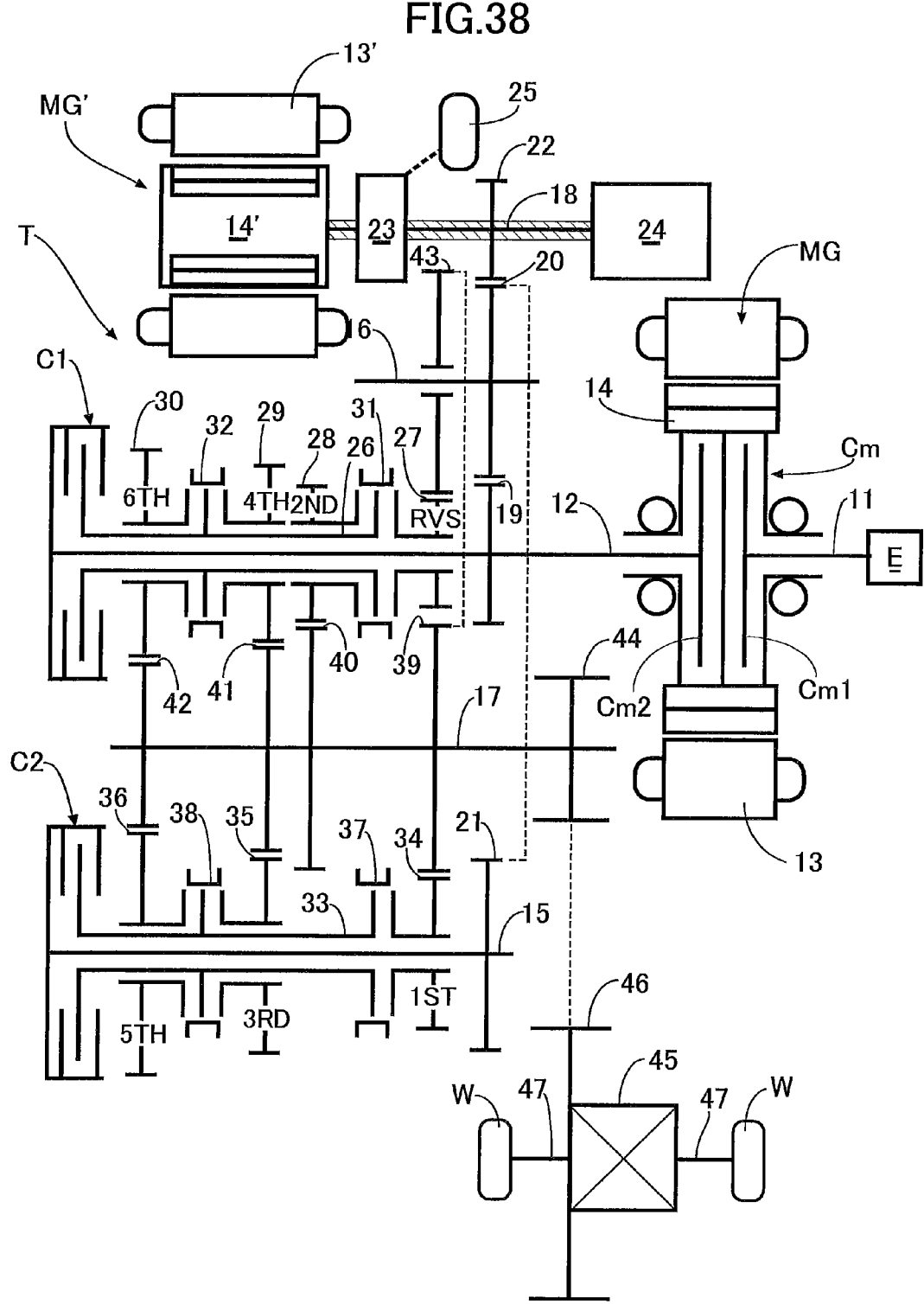
FIG. 38 is a diagram for explaining a driving force transmission path when driving auxiliary equipment by means of a second motor/generator. (fifteenth embodiment)

When driving auxiliary equipment by means of the motor/generator MG of the seventh embodiment (see FIG. 20), the hydraulic pump 23 and the air conditioning compressor 24 are driven by means of the driving force of the motor/generator MG before starting the engine E, and the accumulator 25 is charged by means of the hydraulic pump 23, thus enabling engagement of the second clutch C2 necessary for starting the vehicle in the first speed gear position, but in accordance with the fifteenth embodiment, as shown in FIG. 38, since a hydraulic pump 23 and an air conditioning compressor 24 can be driven by the second motor/generator MG', it is possible to reduce the friction loss of the driving force transmission system from the motor/generator MG to the hydraulic pump 23 and the air conditioning compressor 24.

Furthermore, when establishing the first speed to sixth speed gear positions and reverse speed gear position of the seventh embodiment (see FIG. 21 to FIG. 27), starting or traveling is possible by means of the driving force of one or both of the engine E and the motor/generator MG, but in accordance with the fifteenth embodiment, starting or traveling is possible by any combination (including single use) among the three driving sources, that is, the motor/generator MG, the second motor/generator MG', and the engine E.

Moreover, when carrying out regenerative braking in the sixth speed gear position of the seventh embodiment (see FIG. 28), the motor/generator MG carries out regenerative braking to thus recover the kinetic energy of the vehicle body as electrical energy, but in accordance with the fifteenth embodiment, one or both of the motor/generator MG and the second motor/generator MG' can carry out regenerative braking, thus recovering energy more efficiently.

Figure 39:
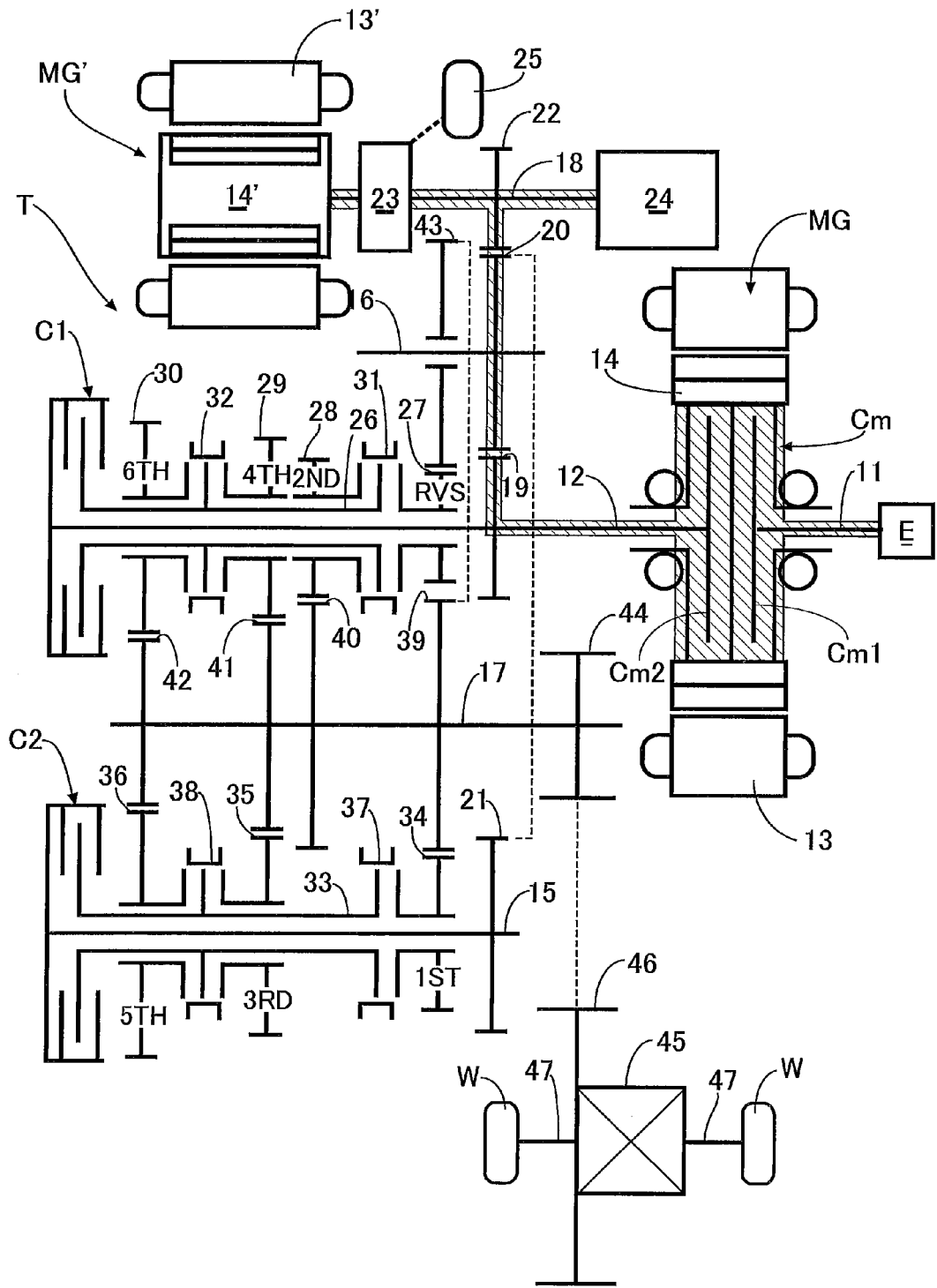
FIG. 39 is a diagram for explaining a driving force transmission path when generating power by means of an engine. (fifteenth embodiment)

Furthermore, when charging is carried out by means of the driving force of the engine E in the seventh embodiment (see FIG. 29), the motor/generator MG is made to function as a generator by means of the driving force of the engine E, and the battery is charged by the power thus generated, but in accordance with the fifteenth embodiment, as shown in FIG. 39, a battery can be charged with power generated by one or both of the motor/generator MG and the second motor/generator MG' by means of the driving force of the engine E.

Figure 40:
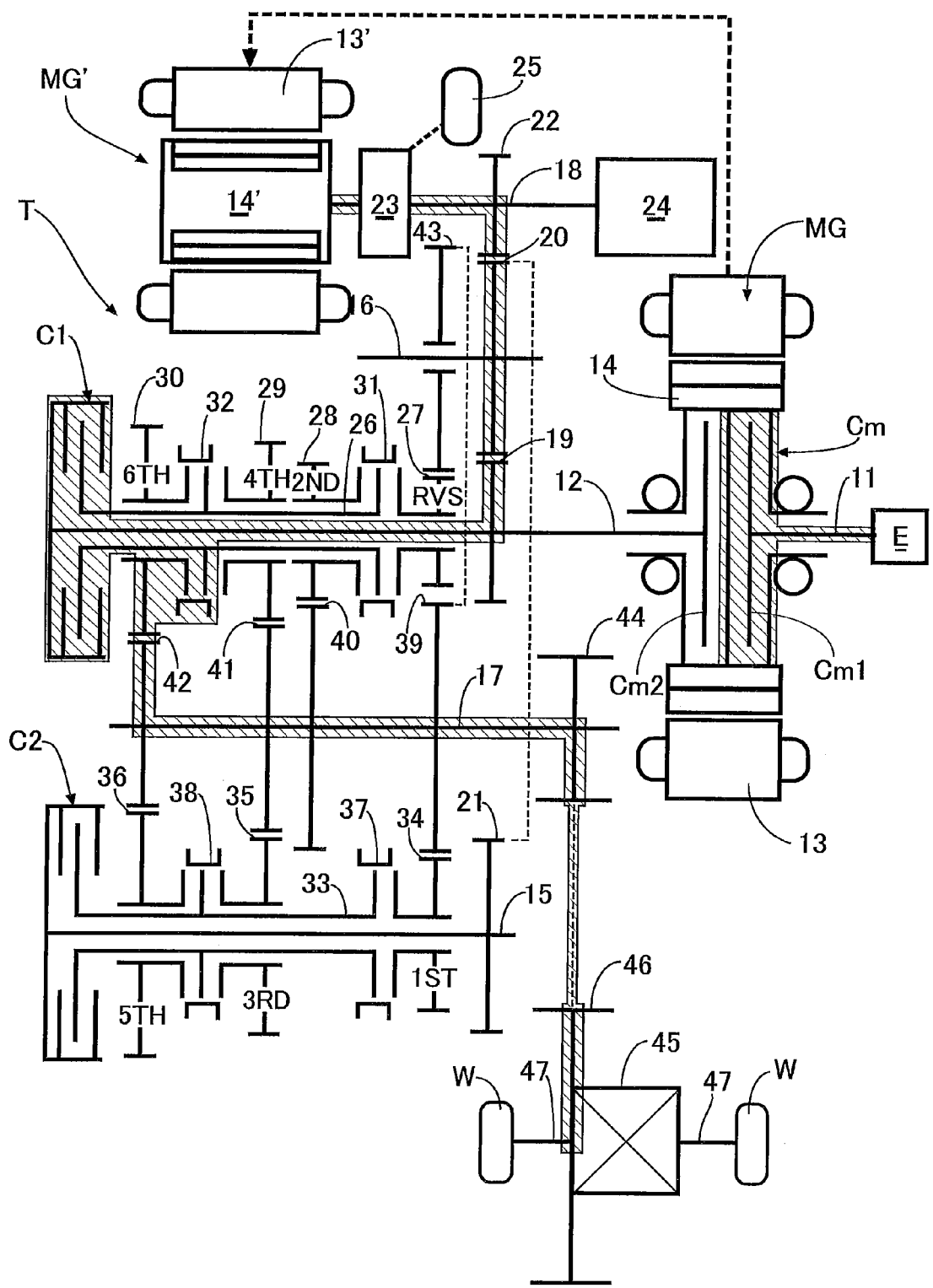
FIG. 40 is a diagram for explaining a case when traveling by driving the second motor/generator with power generated by a motor/generator with an engine driving force. (fifteenth embodiment)

Moreover, as shown in FIG. 40, in a state in which the main input shaft 11 is connected to the rotor 14 of the motor/generator MG by means of the first main clutch Cm1, the motor/generator MG is made to function as a generator by means of the driving force of the engine E to thus generate power, the second motor/generator MG' is driven as a motor with the power thus generated, and the vehicle can thus be traveled.

Figure 41:
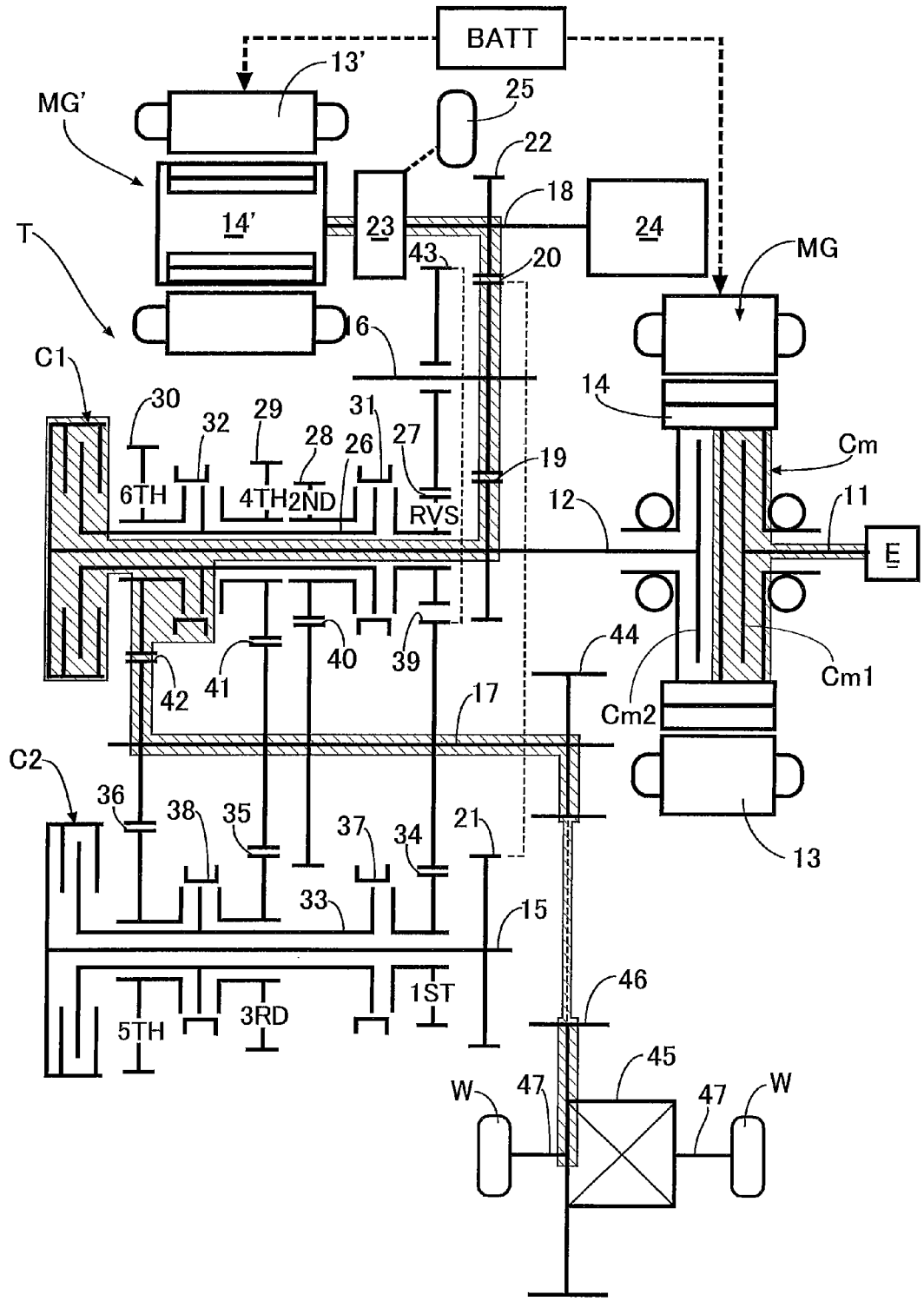
FIG. 41 is a diagram for explaining a case when an engine is started by the motor/generator while traveling by means of the second motor/generator. (fifteenth embodiment)

Furthermore, as shown in FIG. 41, while the vehicle is made to travel by the second motor/generator MG' with the engine E stopped, connecting the main input shaft 11 to the rotor 14 of the motor/generator MG by means of the first main clutch Cm1 enables the motor/generator MG to be made to function as a starter motor to thus start the engine E.

Figure 42:
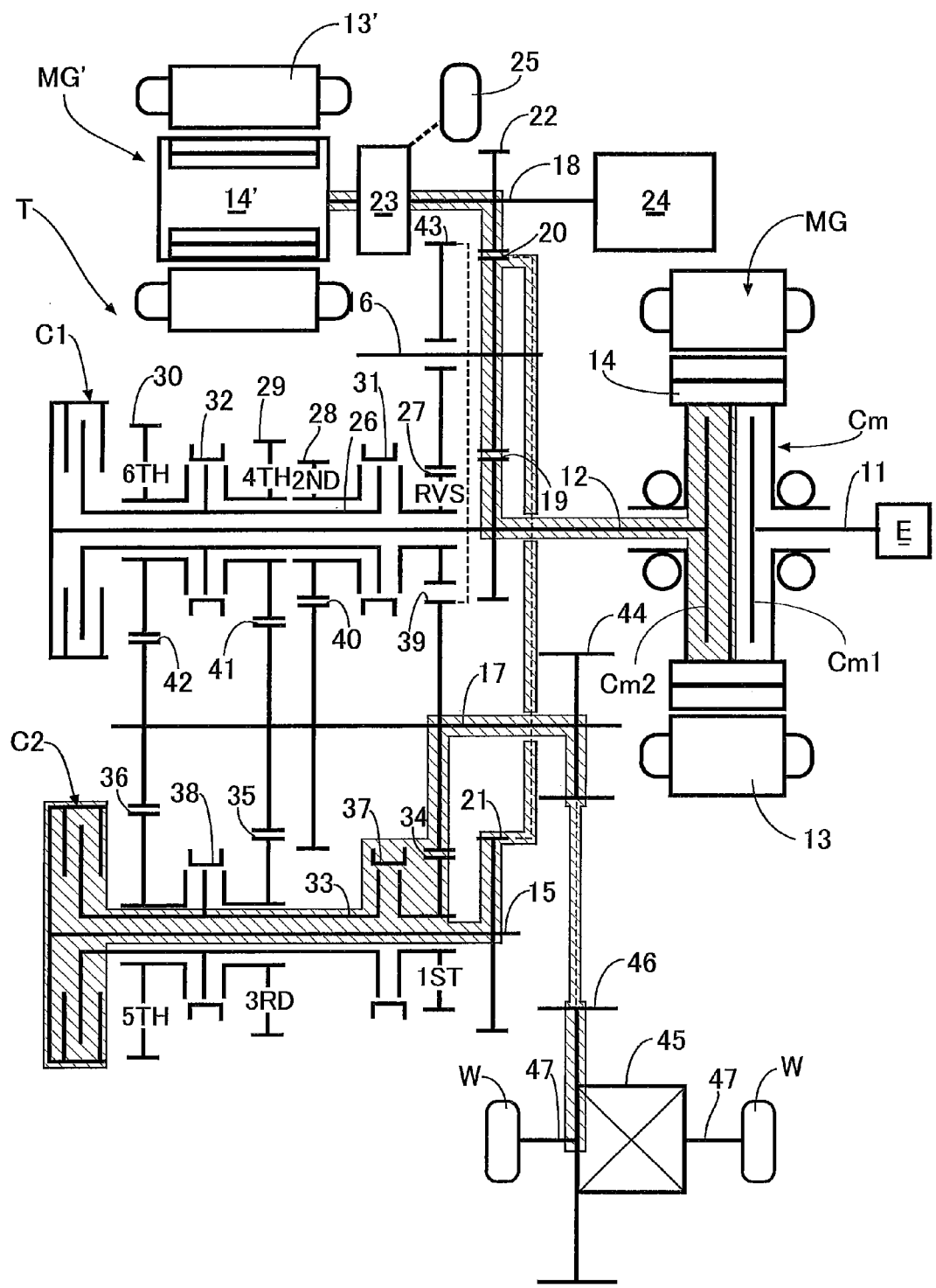
FIG. 42 is a diagram for explaining a driving force transmission path when traveling by means of the motor/generator and the second motor/generator. (fifteenth embodiment)

Moreover, as shown in FIG. 42, connecting the rotor 14 of the motor/generator MG to the first auxiliary input shaft 12 by means of the second main clutch Cm2 enables the vehicle to be started or traveled by both of the motor/generator MG and the second motor/generator MG MG' without dragging the engine E.

In this way, providing the second motor/generator MG' in addition to the motor/generator MG enables one or both of the motor/generator MG and the second motor/generator MG' to be made to function as a motor or a generator or enables one to be made to function as a motor and the other to be made to function as a generator, thus enabling a greater variety of functions of a hybrid vehicle to be exhibited and the merchantability to be enhanced.

[Embodiment 16 to Embodiment 18]

Figure 30:
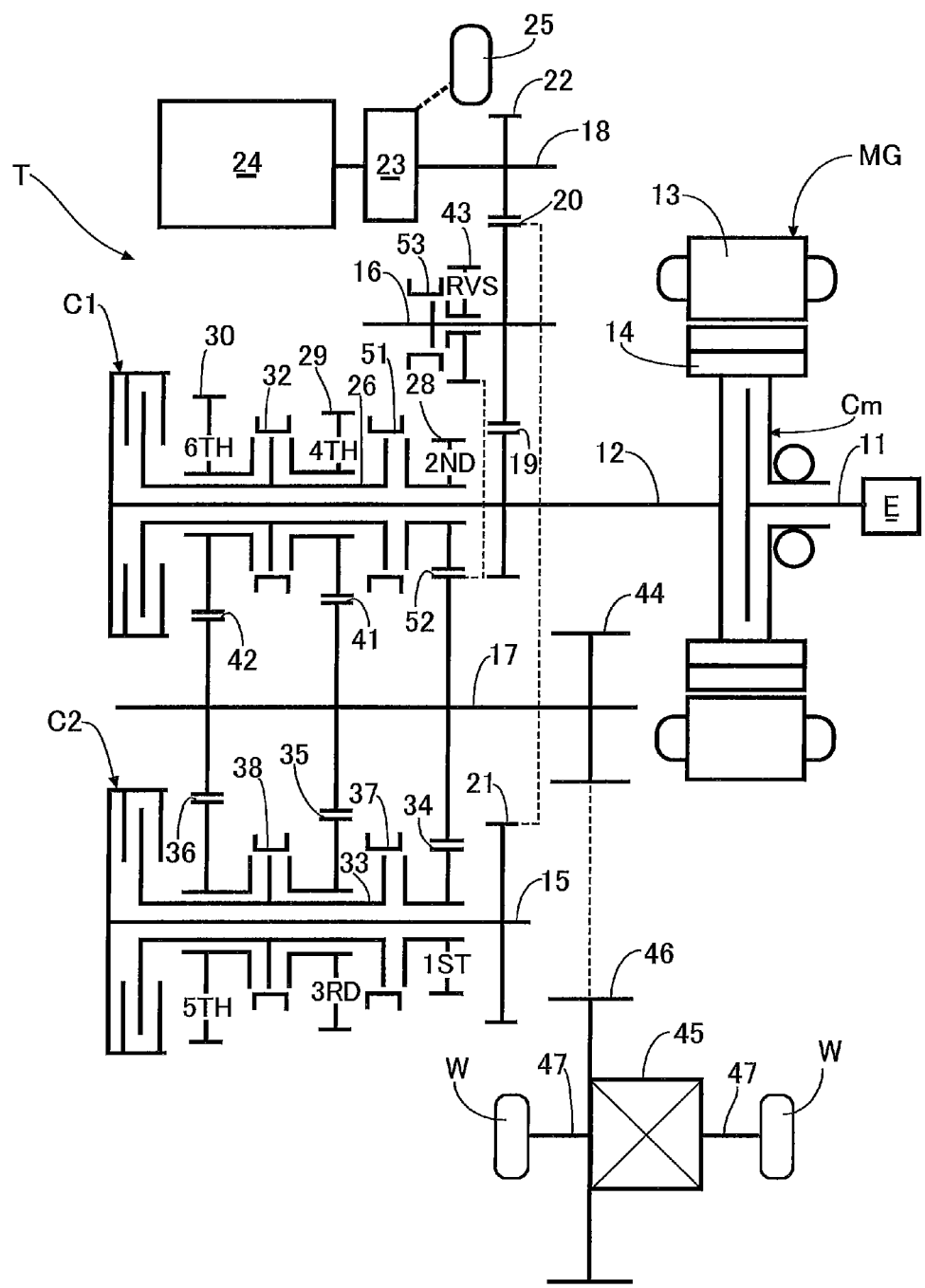
FIG. 30 is a skeleton diagram of a transmission. (eighth embodiment)
Figure 31:
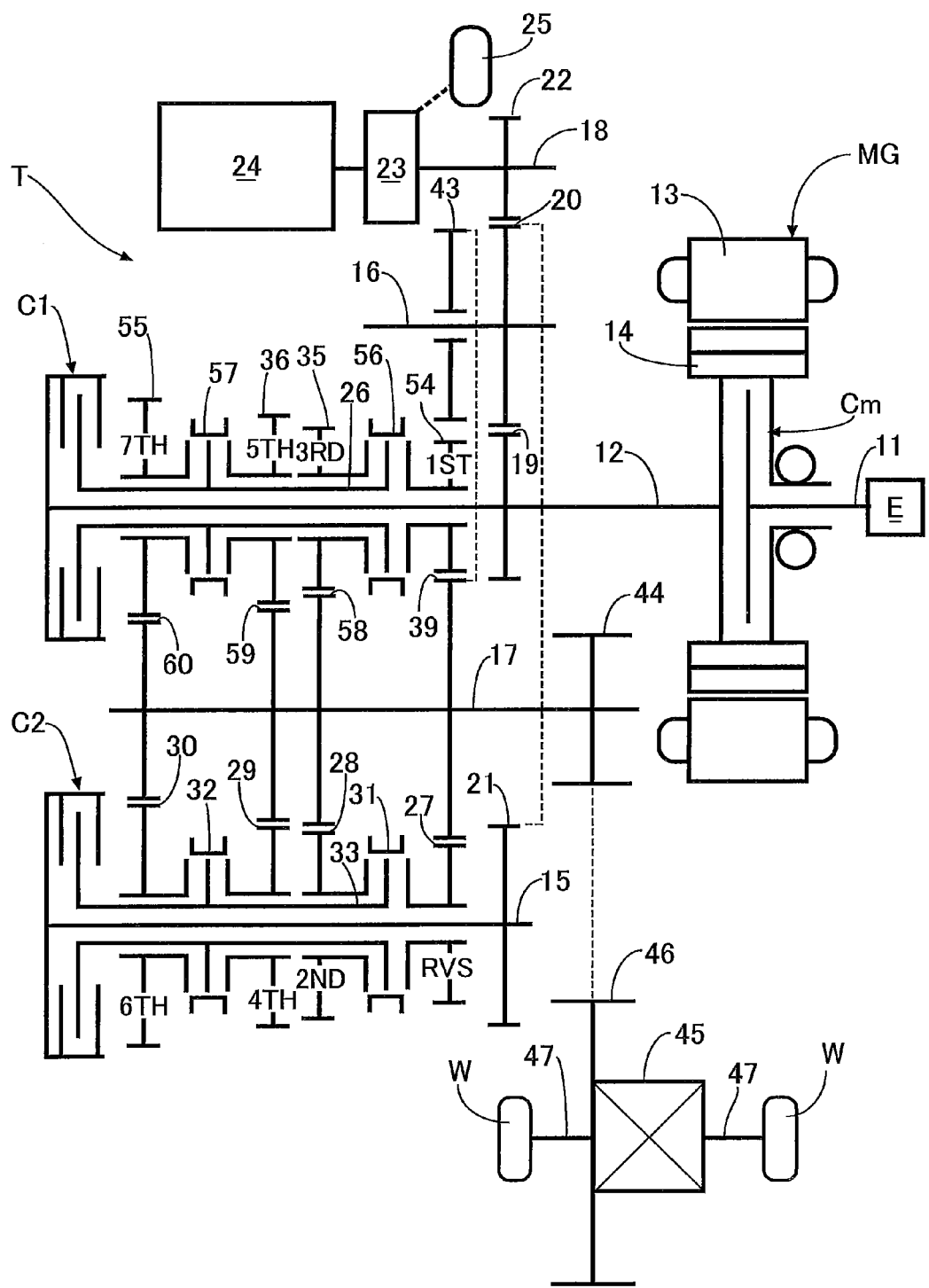
FIG. 31 is a skeleton diagram of a transmission. (ninth embodiment)
Figure 32:
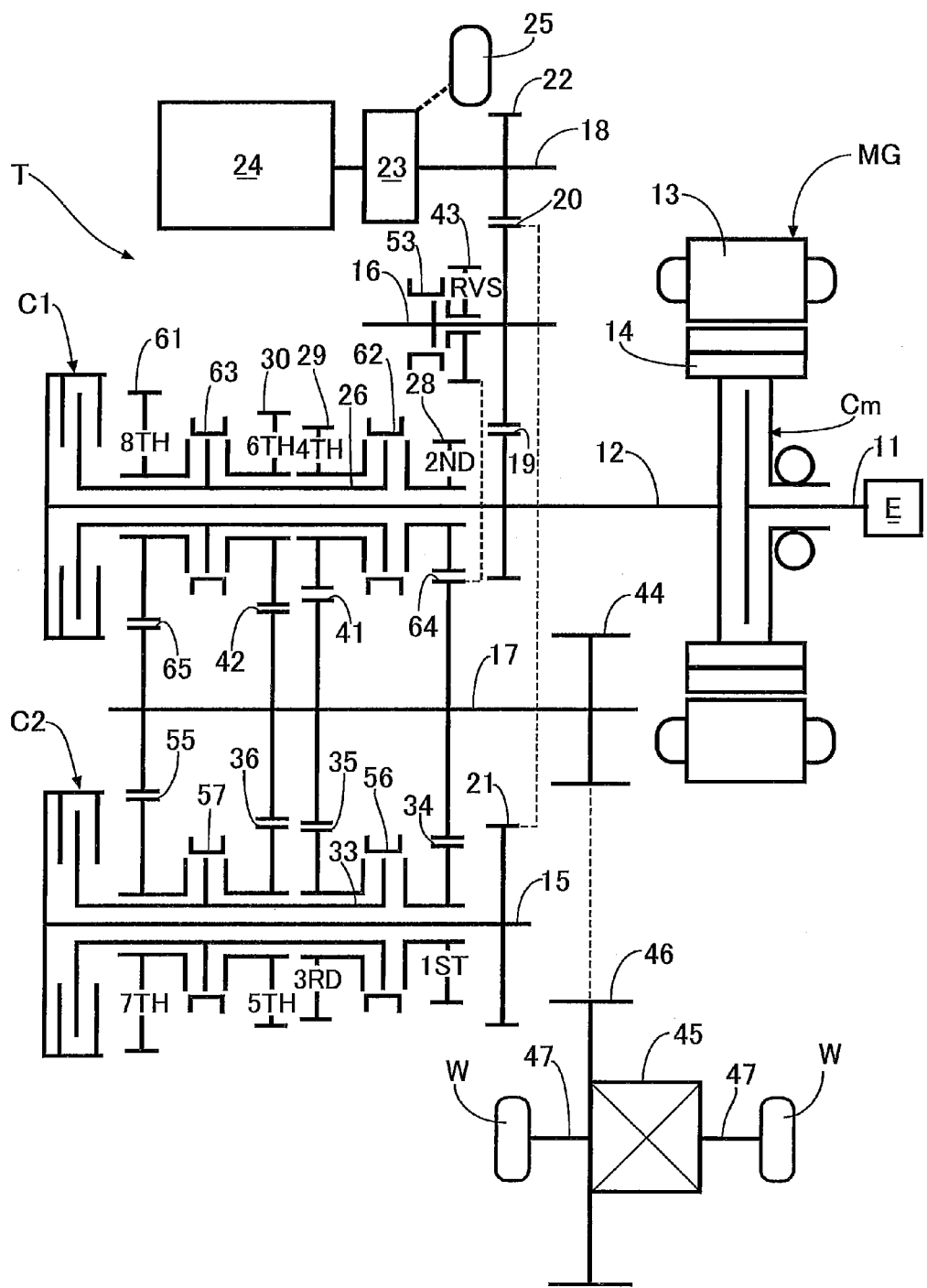
FIG. 32 is a skeleton diagram of a transmission. (tenth embodiment)
Figure 43:
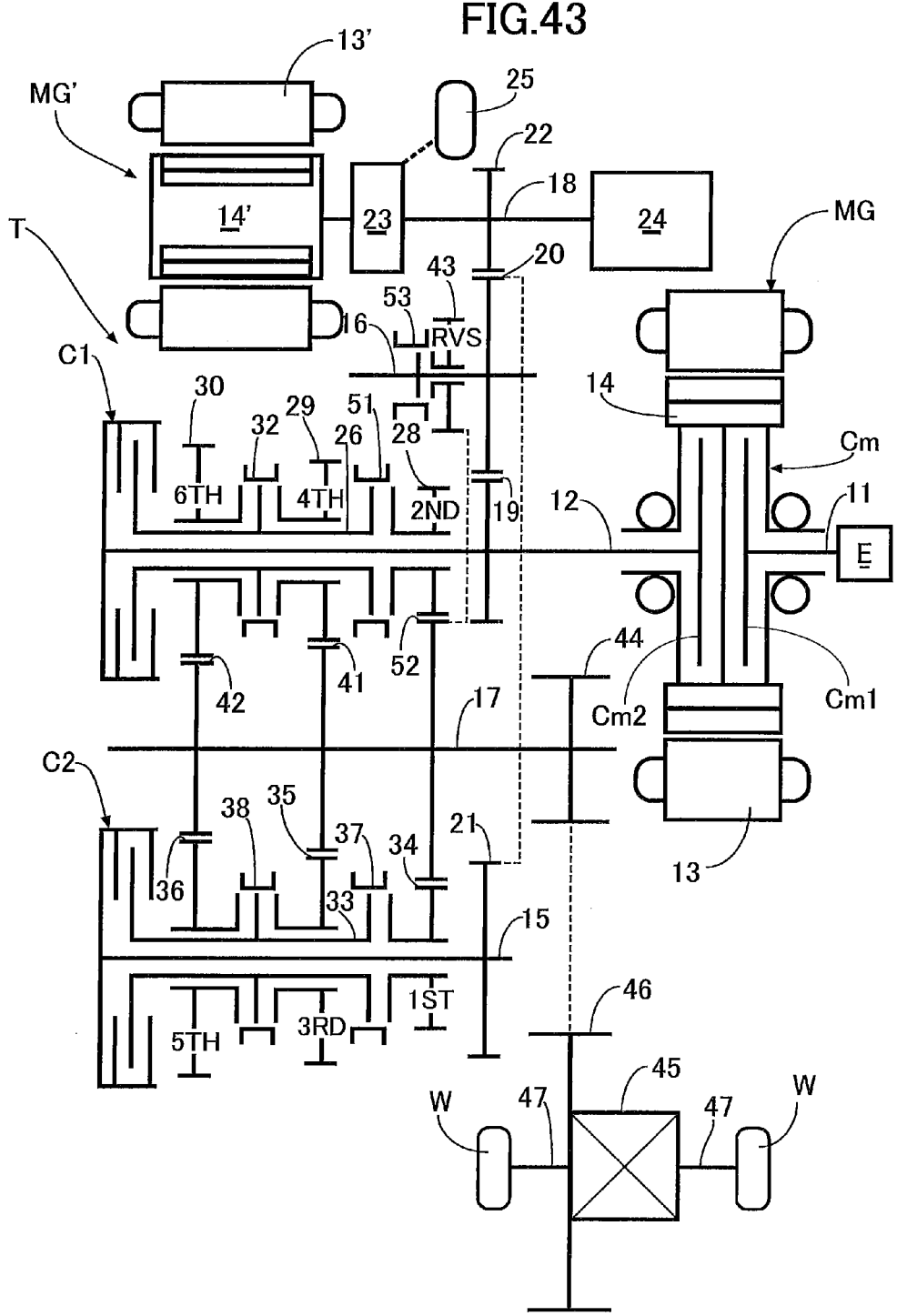
FIG. 43 is a skeleton diagram of a transmission for a hybrid vehicle. (sixteenth embodiment)
Figure 44:
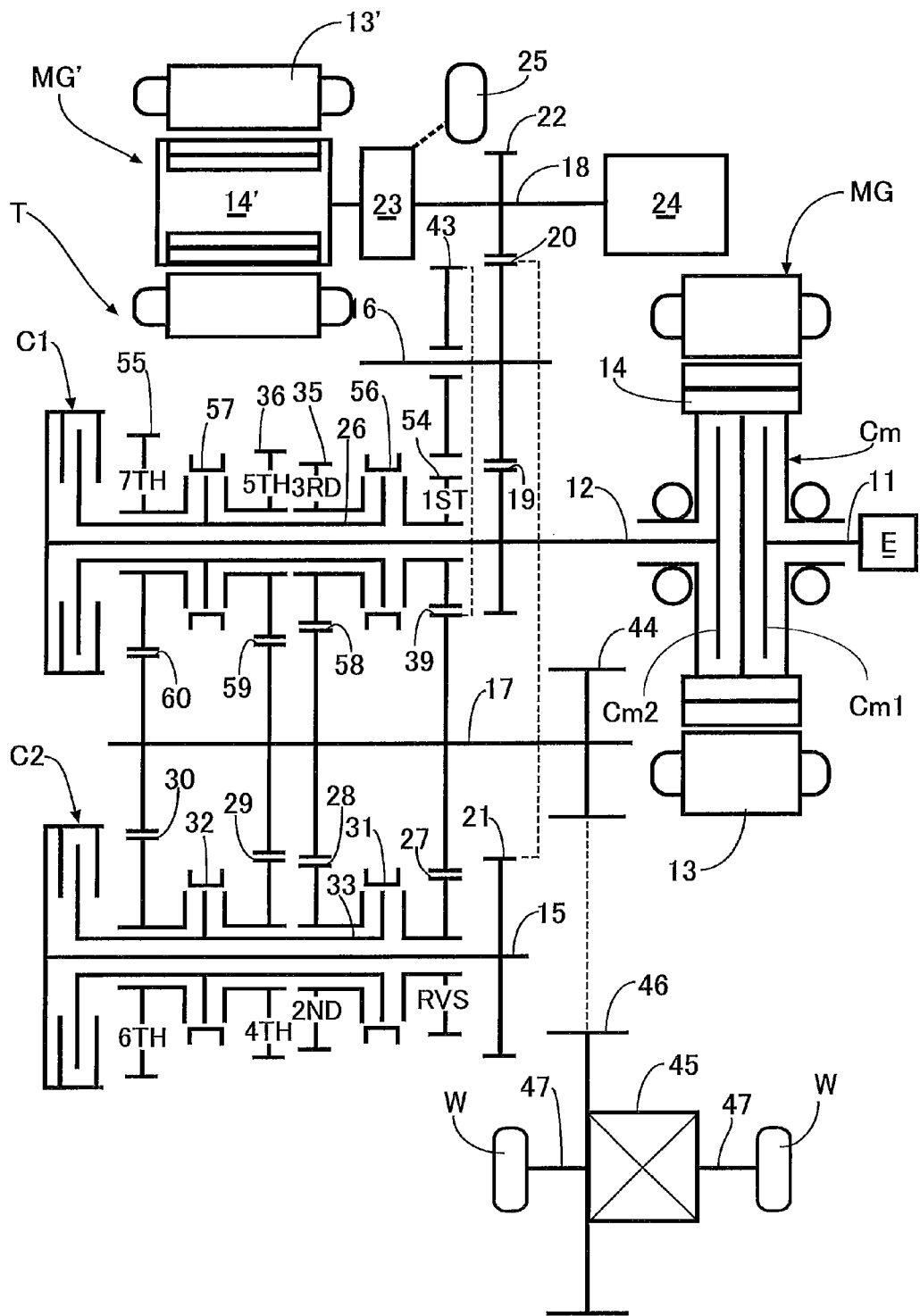
FIG. 44 is a skeleton diagram of a transmission for a hybrid vehicle. (seventeenth embodiment)
Figure 45:
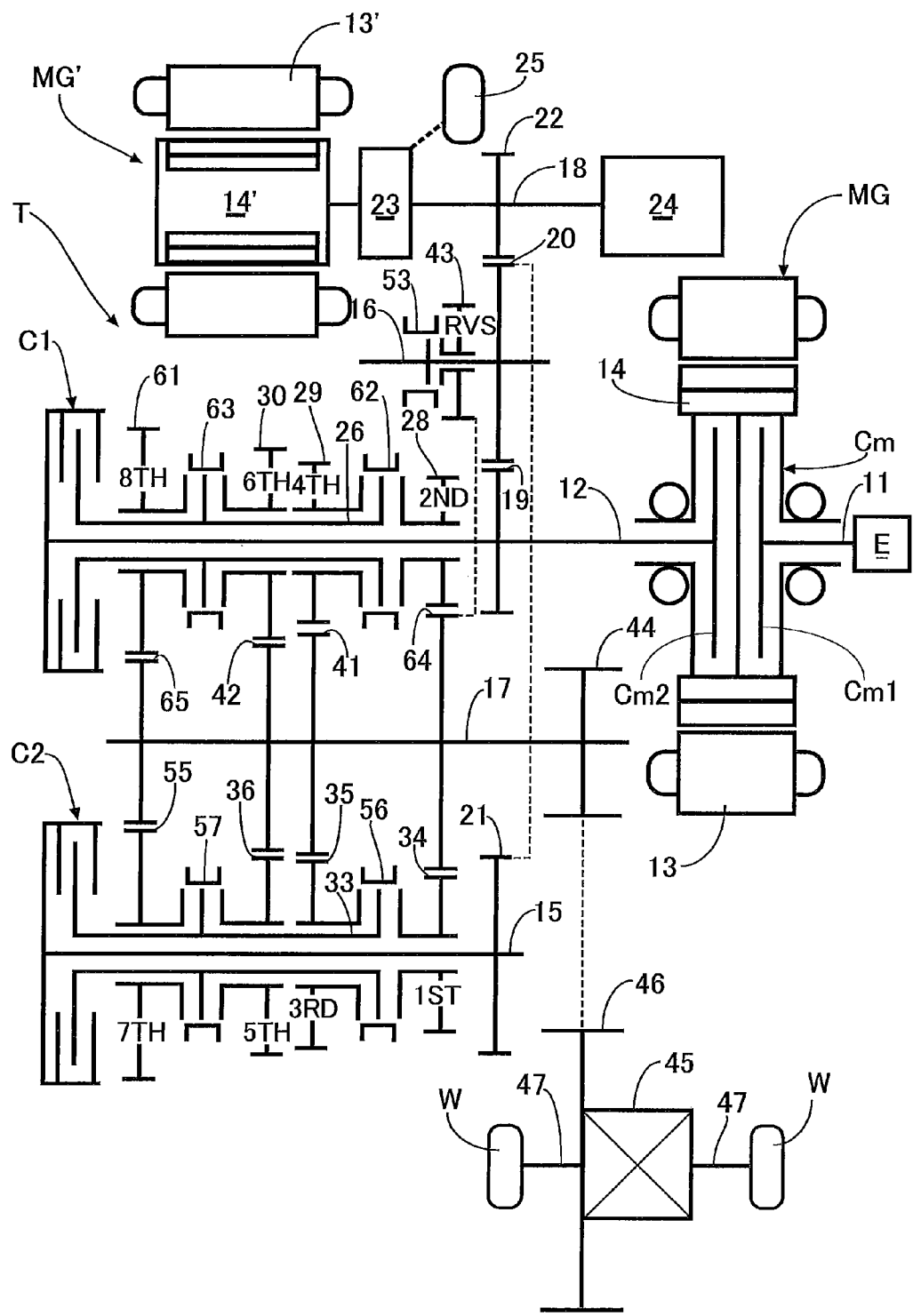
FIG. 45 is a skeleton diagram of a transmission for a hybrid vehicle. (eighteenth embodiment)

FIG. 43 to FIG. 45 show sixteenth to eighteenth embodiments of the present invention; the sixteenth embodiment of FIG. 43 is one in which a second motor/generator MG' is added to the auxiliary equipment drive shaft 18 of the eighth embodiment of FIG. 30, the seventeenth embodiment of FIG. 44 is one in which a second motor/generator MG' is added to the auxiliary equipment drive shaft 18 of the ninth embodiment of FIG. 31, and the eighteenth embodiment of FIG. 45 is one in which a second motor/generator MG' is added to the auxiliary equipment drive shaft 18 of the tenth embodiment of FIG. 32.

In accordance with the sixteenth to eighteenth embodiments, the same operational effects as those of the above-mentioned fifteenth embodiment can be achieved.

The seventh to eighteenth embodiments of the present invention are explained above, but the present invention may be modified in a variety of ways as long as the modifications do not depart from the spirit and scope thereof.

For example, in the seventh to eighteenth embodiments, the motor/generator MG is provided on the first auxiliary input shaft 12 or the auxiliary equipment drive shaft 18, but the motor/generator MG may be provided at any position on the power transmission path from the main clutch Cm to the first and second clutches C1 and C2.

Furthermore, in the seventh to eighteenth embodiments, the hydraulic pump 23 is provided on the auxiliary equipment drive shaft 18, but it may be provided on any of the first auxiliary input shaft 12, the second auxiliary input shaft 15, and the idle shaft 16.

Moreover, in the seventh and eighth embodiments, the hydraulic pump 23 and the air conditioning compressor 24 are driven by the auxiliary equipment drive shaft 18 driven by the idle gear 20, but the hydraulic pump 23 and the air conditioning compressor 24 may be detached from the transmission T and be driven by an exclusive electric motor that is separately provided.

Furthermore, in the ninth to twelfth embodiments, the hydraulic pump 23 and the air conditioning compressor 24 provided on the auxiliary equipment drive shaft 18 are driven by the motor/generator MG directly connected to the auxiliary equipment drive shaft 18, but the hydraulic pump 23 and the air conditioning compressor 24 may be detached from the transmission T and be driven by an exclusive electric motor that is separately provided.

Moreover, the air conditioning compressor 24 may be disposed within the second motor/generator MG'.

[Embodiment 19]

A nineteenth embodiment of the present invention is now explained by reference to FIG. 46 to FIG. 54.

Figure 46:
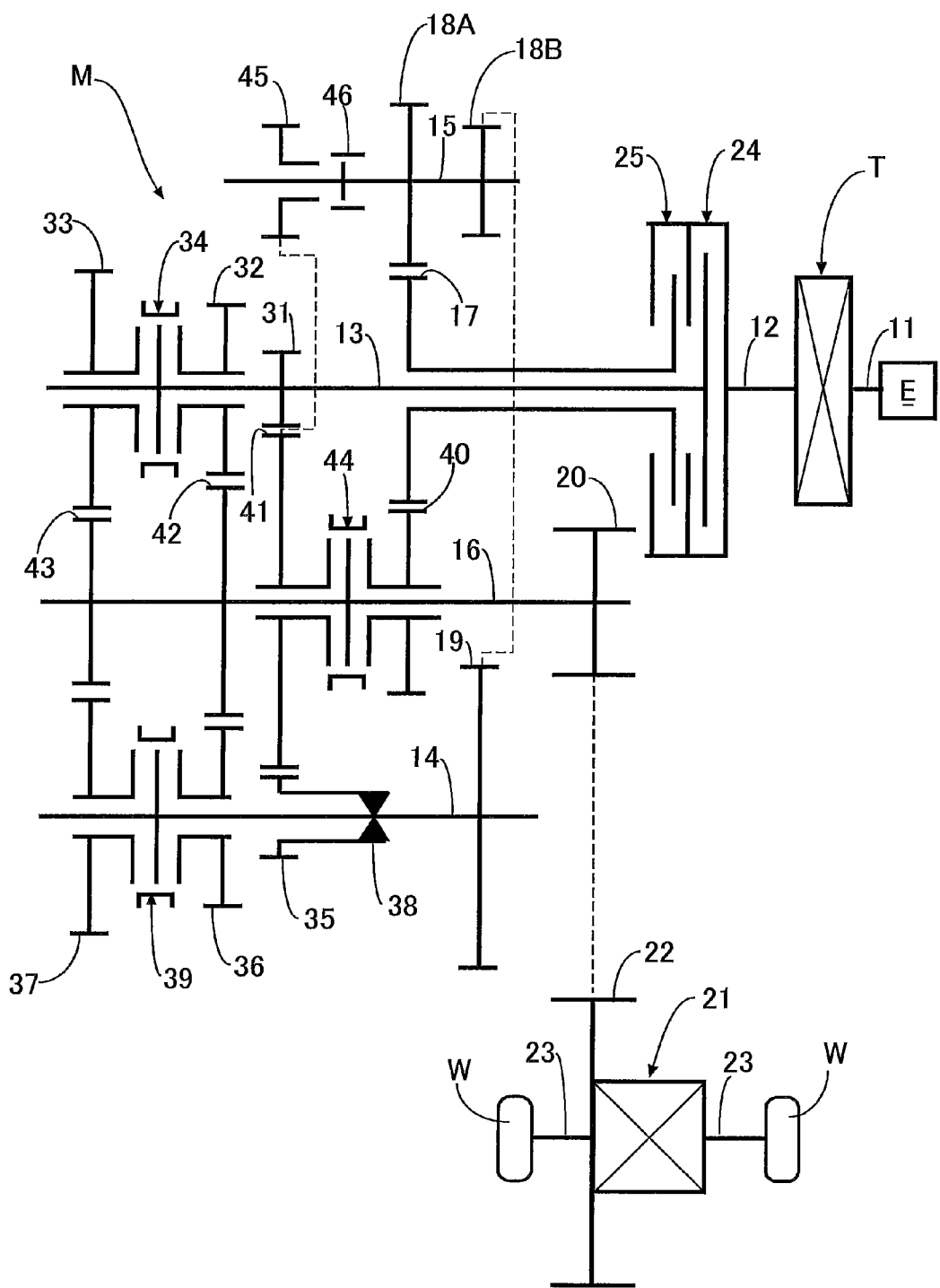
FIG. 46 is a skeleton diagram of a transmission. (nineteenth embodiment)

As shown in FIG. 46, an automatic transmission M having seven forward speeds and one reverse speed includes a main input shaft 12 coaxially connected to a crankshaft 11 of an engine E via a torque converter T, a first auxiliary input shaft 13 disposed coaxially with the main input shaft 12, a second auxiliary input shaft 14 disposed in parallel to the main input shaft 12, an idle shaft 15 disposed in parallel to the main input shaft 12, and an output shaft 16 disposed in parallel to the main input shaft 12.

An idle drive gear 17 relatively rotatably supported on the first auxiliary input shaft 13 meshes with a first idle gear 18A fixedly provided on the idle shaft 15, and a second idle gear 18B fixedly provided on the idle shaft 15 meshes with an idle driven gear 19 fixedly provided on the second auxiliary input shaft 14. Furthermore, a final drive gear 20 fixedly provided on the output shaft 16 meshes with a final driven gear 22 of a differential gear 21, and the differential gear 21 is connected to left and right driven wheels W and W via left and right drive shafts 23 and 23.

A first clutch 24 and a second clutch 25, which are multiple plate wet clutches, are disposed at the downstream end of the main input shaft 12 in a superimposed aggregated state. Engaging the first clutch 24 allows the driving force of the main input shaft 12 to be transmitted directly to the first auxiliary input shaft 13. Furthermore, engaging the second clutch 25 allows the driving force of the main input shaft 12 to be transmitted to the second auxiliary input shaft 14 via the idle drive gear 17, the first and second idle gears 18A and 18B, and the idle driven gear 19. Therefore, selectively engaging the first and second clutches 24 and 25, which are integrated, allows the driving force of the main input shaft 12 to be transmitted selectively and in the same direction to the first and second auxiliary input shafts 13 and 14.

A second speed drive gear 31 is fixedly provided on the first auxiliary input shaft 13, a fourth speed drive gear 32 and a sixth speed drive gear 33 are each independently and relatively rotatably supported thereon, and the fourth speed drive gear 32 and the sixth speed drive gear 33 can be selectively connected to the first auxiliary input shaft 13 by means of a first synchronizing device 34.

On the other hand, a first speed drive gear 35, a third speed drive gear 36, and a fifth speed drive gear 37 are each independently and relatively rotatably supported on the second auxiliary input shaft 14; the first speed drive gear 35 can be connected to the second auxiliary input shaft 14 via a one-way clutch 38, and the third speed drive gear 36 and the fifth speed drive gear 37 can be selectively connected to the second auxiliary input shaft 14 by means of a second synchronizing device 39.

A seventh speed driven gear 40 and a first speed-second speed-reverse driven gear 41 are relatively rotatably supported on the output shaft 16, and a third speed-fourth speed driven gear 42 and a fifth speed-sixth speed driven gear 43 are fixedly provided thereon. The seventh speed driven gear 40 and the first speed-second speed-reverse driven gear 41 can be selectively connected to the output shaft 16 via a third synchronizing device 44. The seventh speed driven gear 40 meshes with the idle drive gear 17 relatively rotatably supported on the first auxiliary input shaft 13, and the first speed-second speed-reverse driven gear 41 meshes with the first speed drive gear 35 relatively rotatably supported on the second auxiliary input shaft 14, the second speed drive gear 31 relatively rotatably supported on the first auxiliary input shaft 13, and a reverse gear 45 relatively rotatably supported on the idle shaft 15. The reverse gear 45 can be connected to the idle shaft 15 via a dog clutch 46.

Since the transmission of the present embodiment is an automatic transmission M, the first to third synchronizing devices 34, 39, and 44 and the dog clutch 46 are operated by an electronically controlled actuator, which is not illustrated.

Establishment of first speed to seventh speed gear positions and a reverse gear position of the automatic transmission M having the above-mentioned arrangement is now explained.

Figure 47:
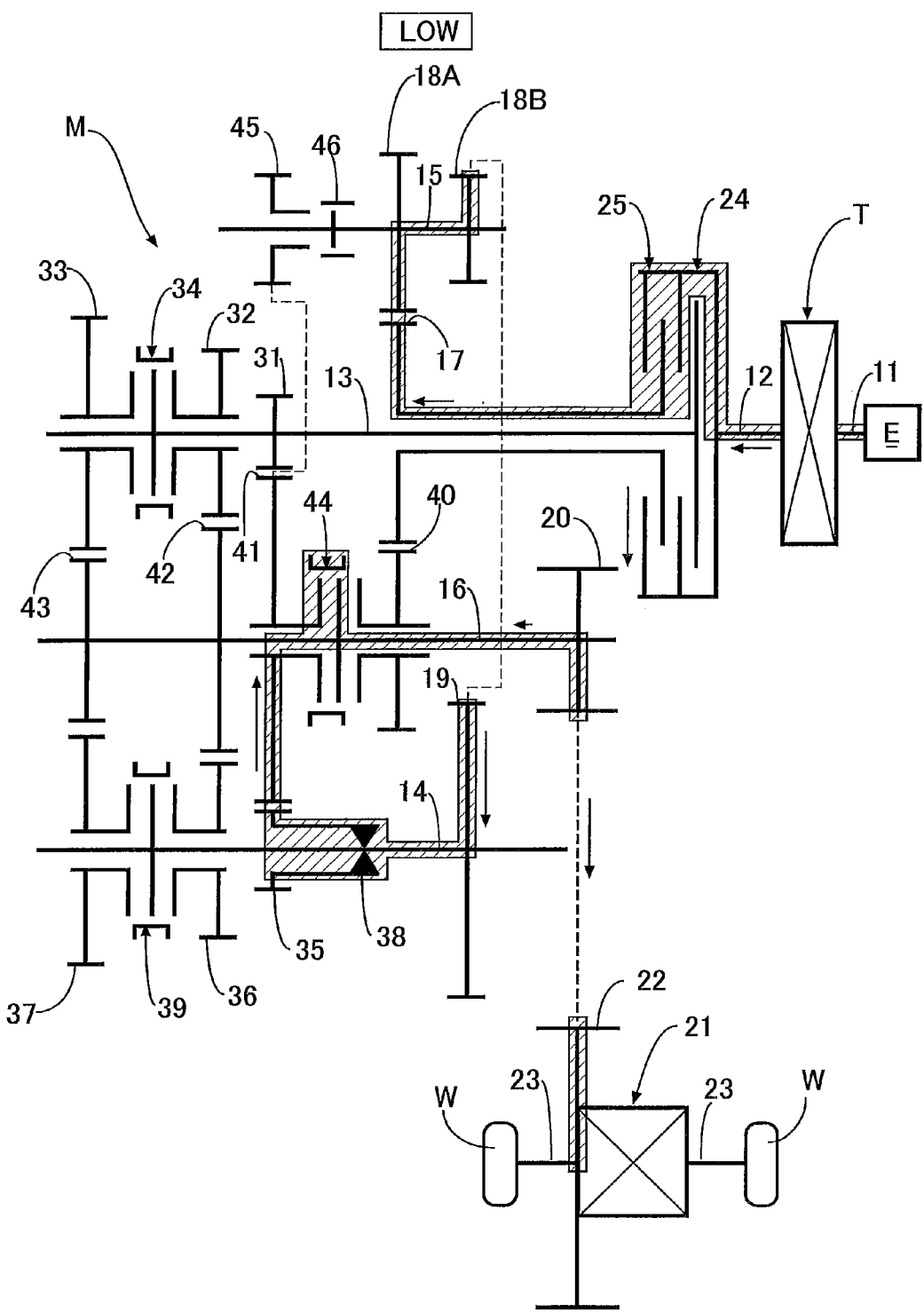
FIG. 47 is a diagram showing a state in which a first speed gear position is established. (nineteenth embodiment)

As shown in FIG. 47, when establishing the first speed gear position, in a state in which the first speed-second speed-reverse driven gear 41 is connected to the output shaft 16 by means of the third synchronizing device 44, the second clutch 25 is engaged so as to connect the main input shaft 12 to the idle drive gear 17. In this state, the driving force of the engine E is transmitted to the driven wheels W and W via the path: torque converter T→main input shaft 12→second clutch 25→idle drive gear 17→first idle gear 18A→idle shaft 15→second idle gear 18B→idle driven gear 19→second auxiliary input shaft 14→one-way clutch 38→first speed drive gear 35→first speed-second speed-reverse driven gear 41→third synchronizing device 44→output shaft 16→final drive gear 20→final driven gear 22→differential gear 21→drive shafts 23 and 23.

Figure 48:
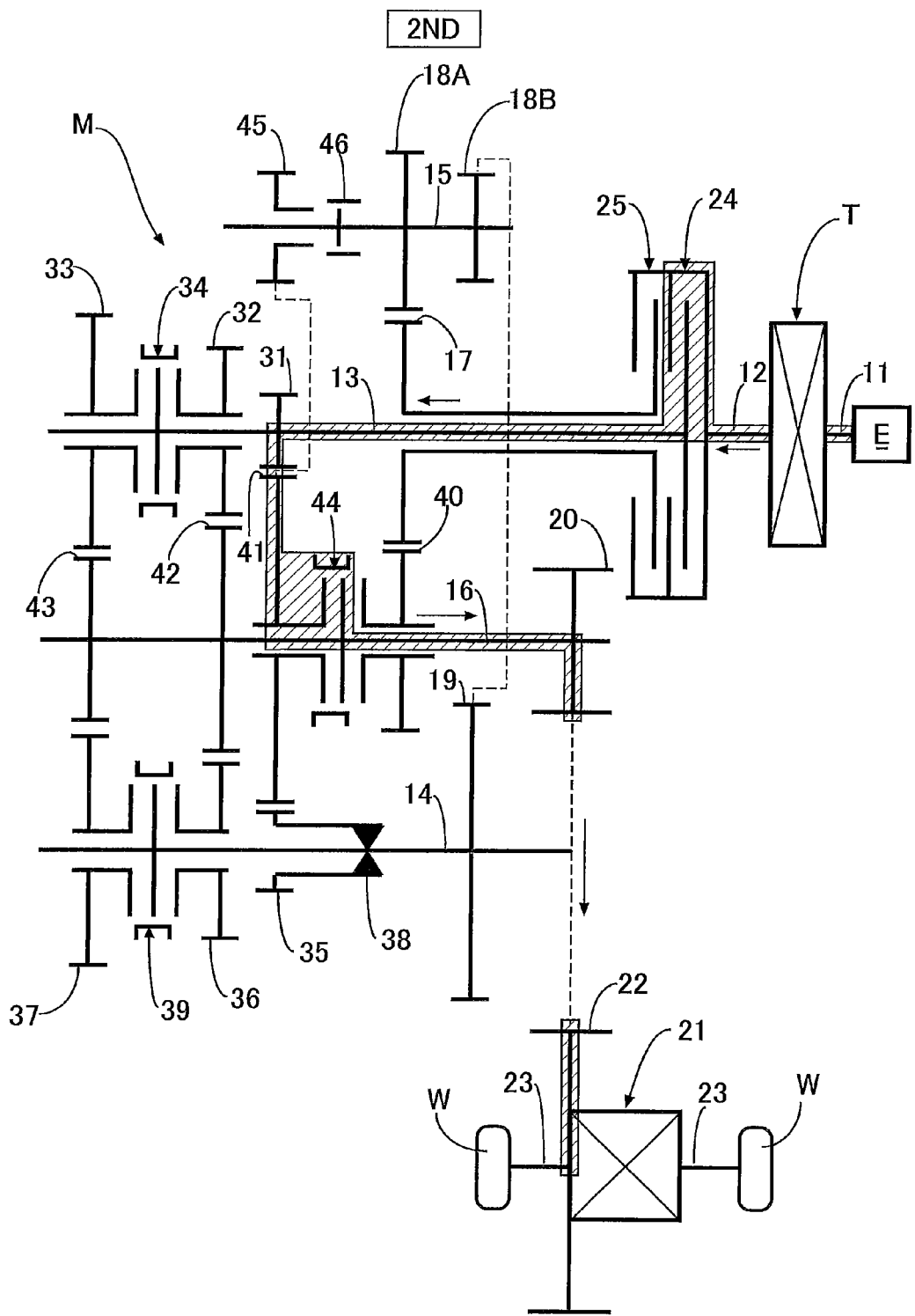
FIG. 48 is a diagram showing a state in which a second speed gear position is established. (nineteenth embodiment)

As shown in FIG. 48, when establishing the second speed gear position, in a state in which the first speed-second speed-reverse driven gear 41 is connected to the output shaft 16 by means of the third synchronizing device 44, the first clutch 24 is engaged so as to connect the main input shaft 12 to the first auxiliary input shaft 13. In this state, the driving force of the engine E is transmitted to the driven wheels W and W via the path: torque converter T→main input shaft 12 →first clutch 24→first auxiliary input shaft 13→second speed drive gear 31→first speed-second speed-reverse driven gear 41→third synchronizing device 44→output shaft 16→final drive gear 20→final driven gear 22→differential gear 21→drive shafts 23 and 23.

Figure 49:
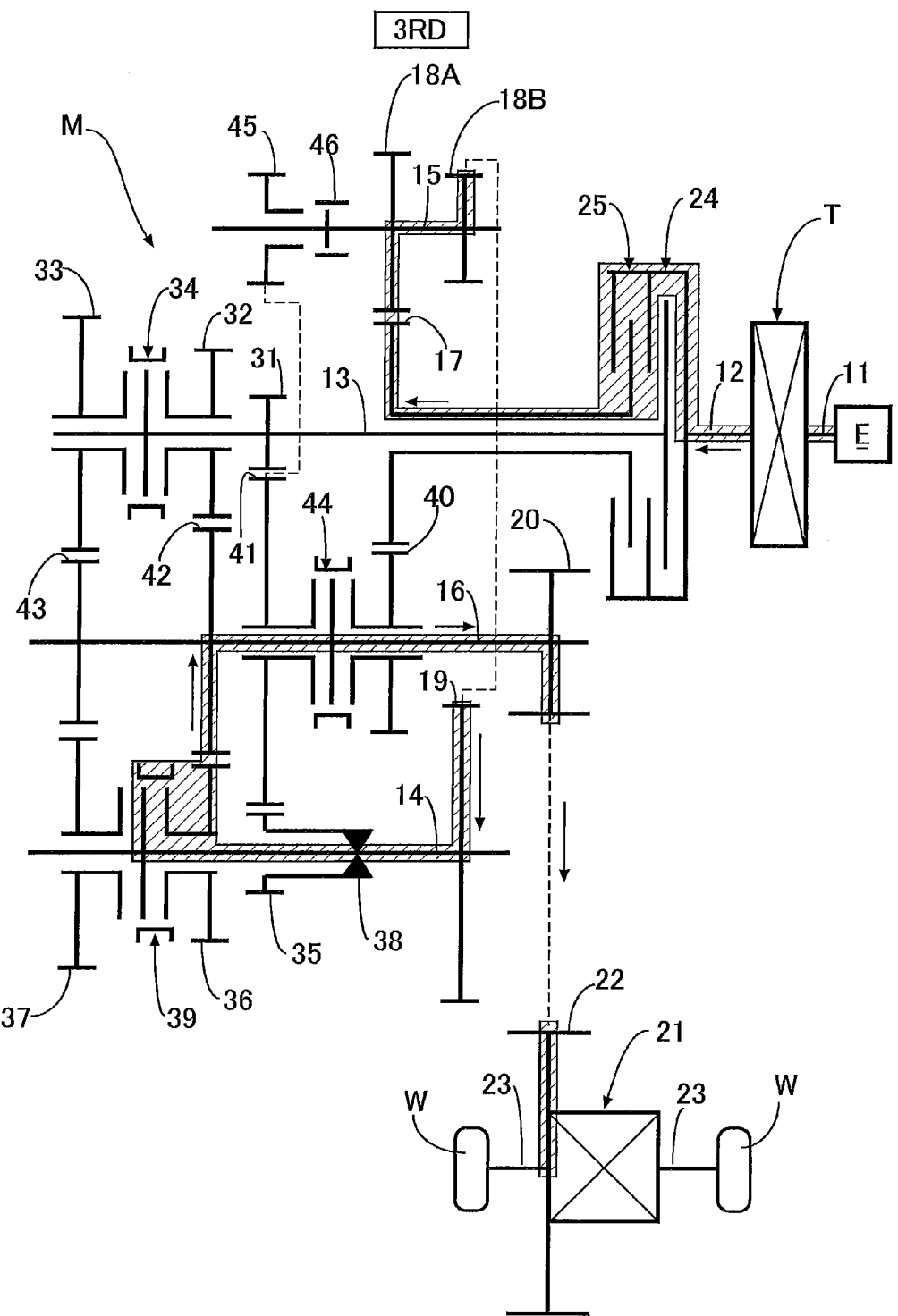
FIG. 49 is a diagram showing a state in which a third speed gear position is established. (nineteenth embodiment)

As shown in FIG. 49, when establishing the third speed gear position, in a state in which the third speed drive gear 36 is connected to the second auxiliary input shaft 14 by means of the second synchronizing device 39, the second clutch 25 is engaged so as to connect the main input shaft 12 to the idle drive gear 17. In this state, the driving force of the engine E is transmitted to the driven wheels W and W via the path: torque converter T→main input shaft 12→second clutch 25→idle drive gear 17→first idle gear 18A→idle shaft 15→second idle gear 18B→idle driven gear 19→second auxiliary input shaft 14→second synchronizing device 39→third speed drive gear 36→third speed-fourth speed driven gear 42→output shaft 16→final drive gear 20→final driven gear 22→differential gear 21→drive shafts 23 and 23.

Figure 50:
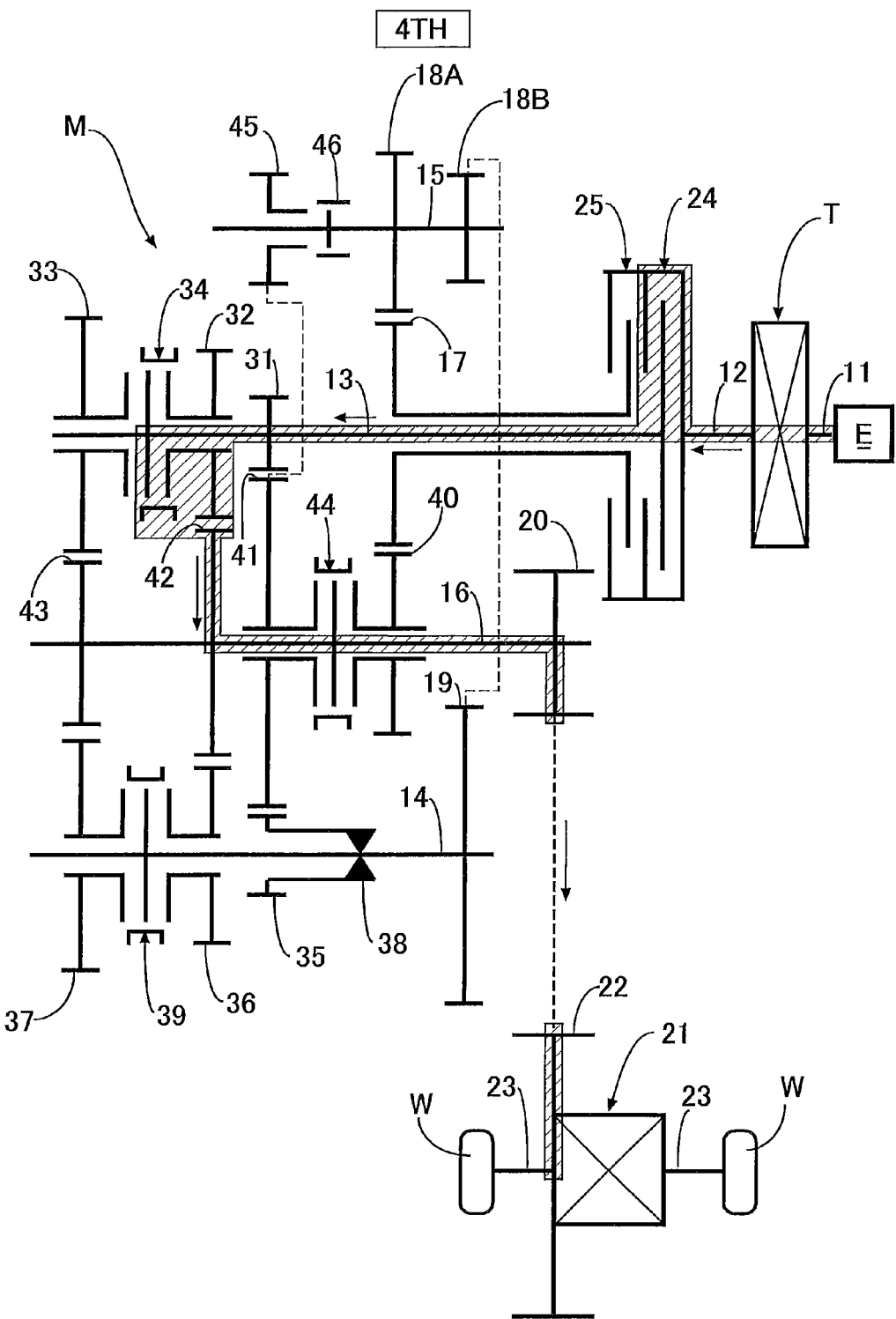
FIG. 50 is a diagram showing a state in which a fourth speed gear position is established. (nineteenth embodiment)

As shown in FIG. 50, when establishing the fourth speed gear position, in a state in which the fourth speed drive gear 32 is connected to the first auxiliary input shaft 13 by means of the first synchronizing device 34, the first clutch 24 is engaged so as to connect the main input shaft 12 to the first auxiliary input shaft 13. In this state, the driving force of the engine E is transmitted to the driven wheels W and W via the path: torque converter T→main input shaft 12→first clutch 24→first auxiliary input shaft 13→first synchronizing device 34→fourth speed drive gear 32→third speed-fourth speed driven gear 42→output shaft 16→final drive gear 20→final driven gear 22→differential gear 21→drive shafts 23 and 23.

Figure 51:
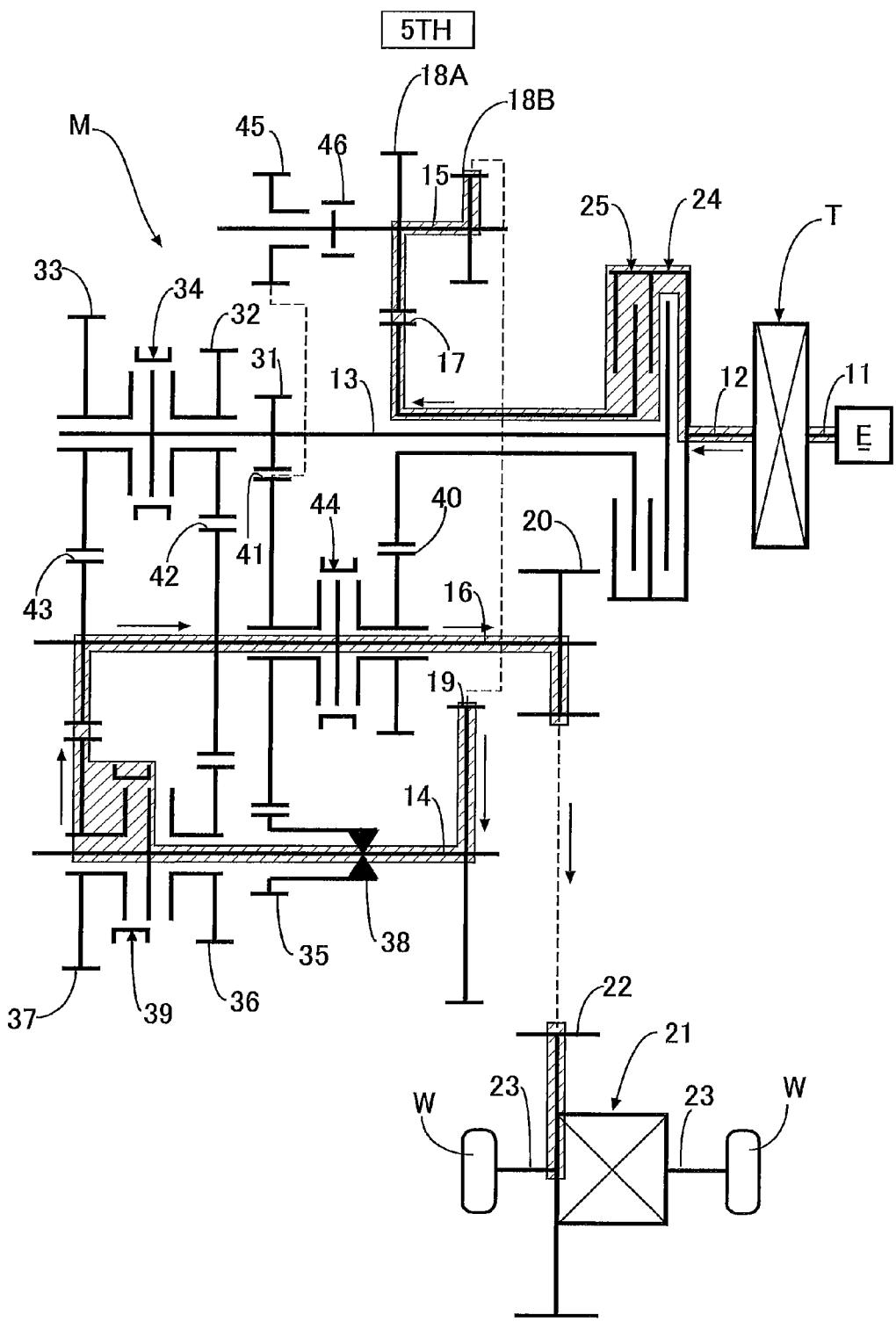
FIG. 51 is a diagram showing a state in which a fifth speed gear position is established. (nineteenth embodiment)

As shown in FIG. 51, when establishing the fifth speed gear position, in a state in which the fifth speed drive gear 37 is connected to the second auxiliary input shaft 14 by means of the second synchronizing device 39, the second clutch 25 is engaged so as to connect the main input shaft 12 to the idle drive gear 17. In this state, the driving force of the engine E is transmitted to the driven wheels W and W via the path: torque converter T→main input shaft 12→second clutch 25→idle drive gear 17→first idle gear 18A→idle shaft 15→second idle gear 18B→idle driven gear 19→second auxiliary input shaft 14→second synchronizing device 39→fifth speed drive gear 37→fifth speed-sixth speed driven gear 43→output shaft 16→final drive gear 20→final driven gear 22→differential gear 21→drive shafts 23 and 23.

Figure 52:
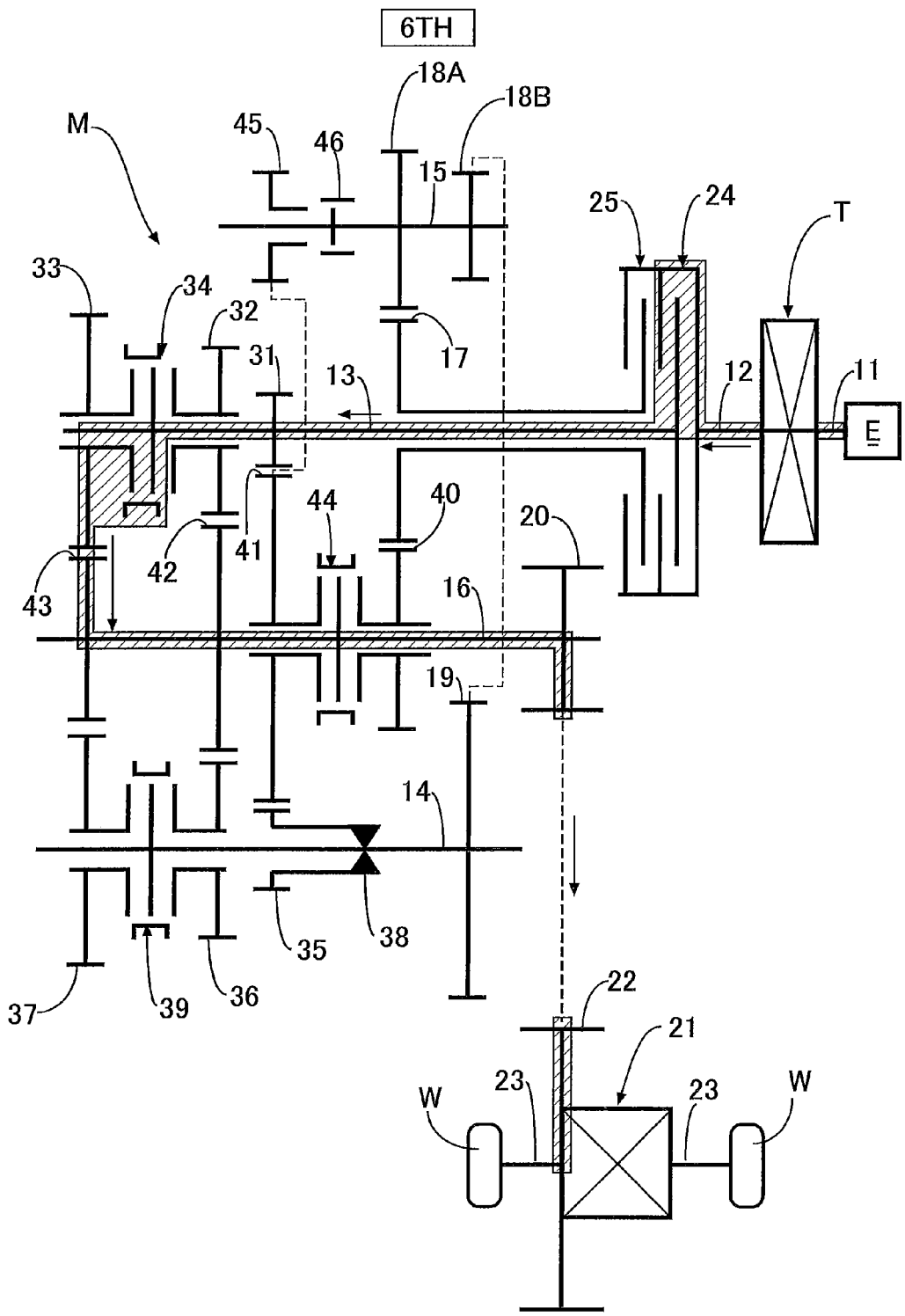
FIG. 52 is a diagram showing a state in which a sixth speed gear position is established. (nineteenth embodiment)

As shown in FIG. 52, when establishing the sixth speed gear position, in a state in which the sixth speed drive gear 23 is connected to the first auxiliary input shaft 13 by means of the first synchronizing device 34, the first clutch 24 is engaged so as to connect the main input shaft 12 to the first auxiliary input shaft 13. In this state, the driving force of the engine E is transmitted to the driven wheels W and W via the path: torque converter T→main input shaft 12→first clutch 24→first auxiliary input shaft 13→first synchronizing device 34→sixth speed drive gear 33→fifth speed-sixth speed driven gear 43→output shaft 16→final drive gear 20→final driven gear 22→differential gear 21→drive shafts 23 and 23.

Figure 53:
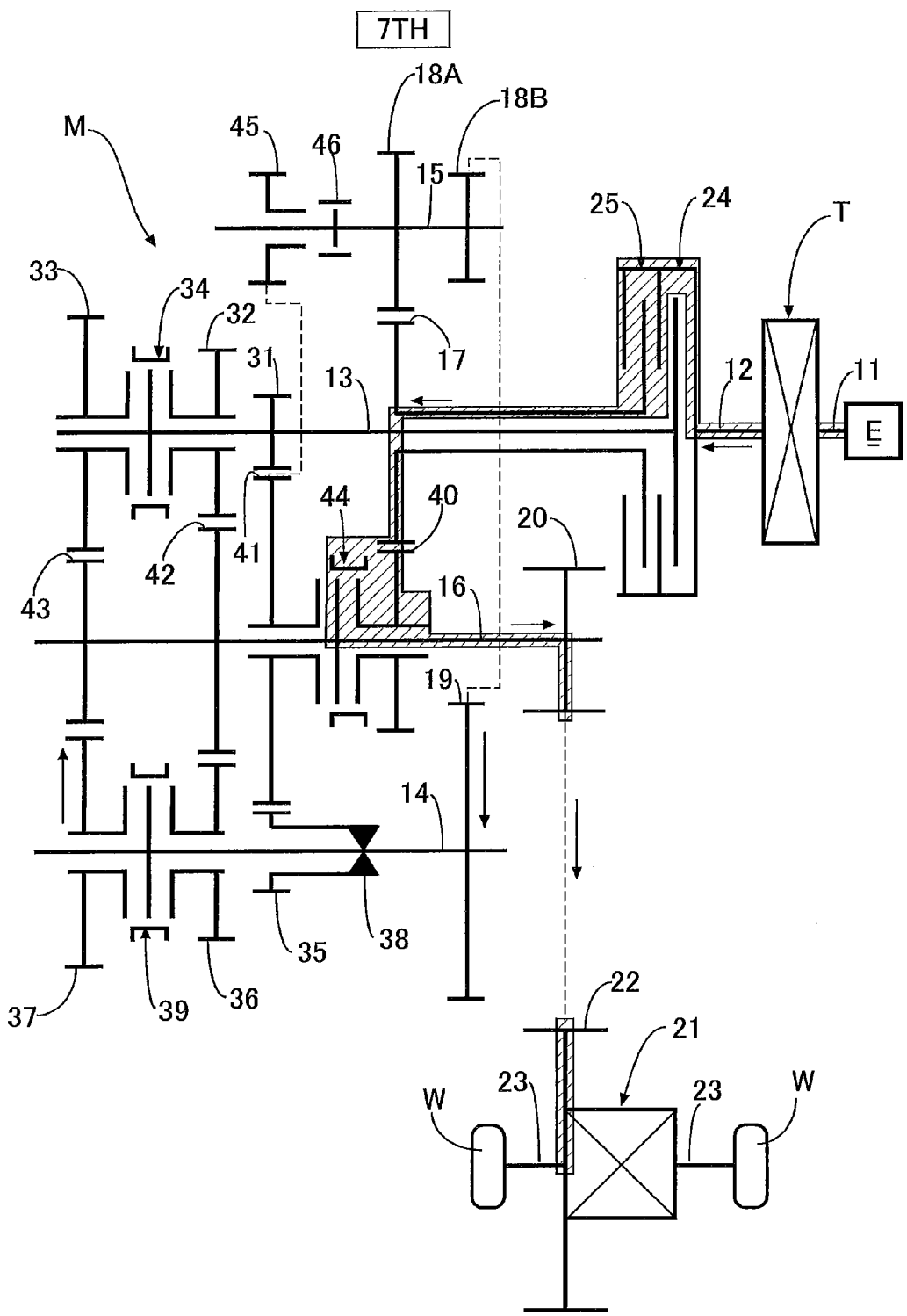
FIG. 53 is a diagram showing a state in which a seventh speed gear position is established. (nineteenth embodiment)

As shown in FIG. 53, when establishing the seventh speed gear position, in a state in which the seventh speed driven gear 40 is connected to the output shaft 16 by means of the third synchronizing device 44, the second clutch 25 is engaged so as to connect the main input shaft 12 to the idle drive gear 17. In this state, the driving force of the engine E is transmitted to the driven wheels W and W via the path: torque converter T→main input shaft 12→second clutch 25→idle drive gear 17→seventh speed driven gear 40→third synchronizing device 44→output shaft 16→final drive gear 20→final driven gear 22→differential gear 21→drive shafts 23 and 23.

Figure 54:
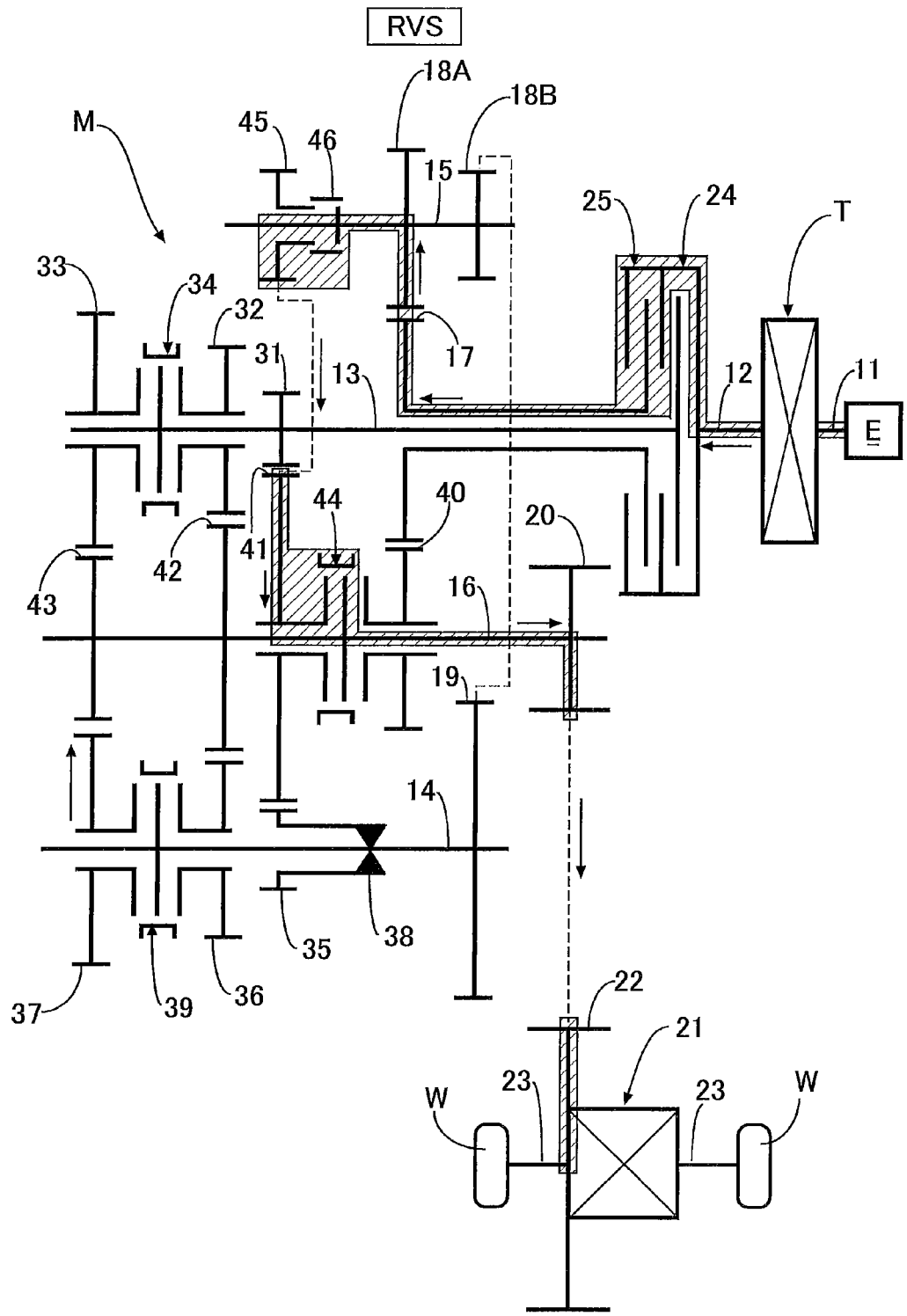
FIG. 54 is a diagram showing a state in which a reverse gear position is established. (nineteenth embodiment)

As shown in FIG. 54, when establishing the reverse gear position, in a state in which the first speed-second speed-reverse driven gear 41 is connected to the output shaft 16 by means of the third synchronizing device 44 and the reverse gear 45 is connected to the idle shaft 15 by means of the dog clutch 46, the second clutch 25 is engaged so as to connect the main input shaft 12 to the idle drive gear 17. In this state, the driving force of the engine E is transmitted as reverse rotation to the driven wheels W and W via the path: torque converter T→main input shaft 12→second clutch 25→idle drive gear 17→first idle gear 18A→idle shaft 15→dog clutch 46→reverse gear 45→first speed-second speed-reverse driven gear 41→third synchronizing device44→output shaft 16→final drive gear 20→final driven gear 22→differential gear 21→drive shafts 23 and 23.

As shown in FIG. 49 and FIG. 51, when establishing the third speed and fifth speed gear positions, the second clutch 25 is engaged so as to rotate the second auxiliary input shaft 14, and the rotation is transmitted to the output shaft 16 via the third speed drive gear 36 and the third speed-fourth speed driven gear 42 when the third speed gear position is established, and is transmitted to the output shaft 16 via the fifth speed drive gear 37 and the fifth speed-sixth speed driven gear 43 when the fifth speed gear position is established. In this process, there is a path for transmitting a driving force from the second auxiliary input shaft 14 to the output shaft 16 via the one-way clutch 38, the first speed drive gear 35, and the first speed-second speed-reverse driven gear 41, but since the rotational speed of the second auxiliary input shaft 14 is higher than the rotational speed of the first speed drive gear 35, the one-way clutch 38 is maintained in a slipping state, and there is no problem in establishing the third speed and fifth speed gear positions.

Furthermore, as shown in FIG. 48, when establishing the second speed gear position, the second clutch 25 becomes disengaged, and the second auxiliary input shaft 14 is detached from the main input shaft 12. In this process, even if a driving force is transmitted back from the rotating output shaft 16 side to the second auxiliary input shaft 14 via the first speed-second speed-reverse driven gear 41 and the first speed drive gear 35, since the one-way clutch 38 slips, reverse transmission of the driving force does not occur, and an increase in friction due to dragging of the second auxiliary input shaft 14 is avoided. However, when establishing the reverse gear position, since the output shaft 16 rotates in the reverse direction to that when establishing the forward gear position, the driving force is transmitted back from the reversely rotating output shaft 16 side to the second auxiliary input shaft 14 via the one-way clutch 38, but the time during which the reverse gear position is established is relatively short, and the increase in friction due to dragging of the second auxiliary input shaft 14 does not become a problem in practice.

As hereinbefore described, in accordance with the present embodiment, since the first speed-second speed-reverse driven gear 41 provided on the output shaft 16 is used in common for establishment of the first speed gear position, the second speed gear position, and the reverse gear position, the third speed-fourth speed driven gear 42 provided on the output shaft 16 is used in common for establishment of the third speed gear position and the fourth speed gear position, and the fifth speed-sixth speed driven gear 43 provided on the output shaft 16 is used in common for establishment of the fifth speed gear position and the sixth speed gear position, it becomes possible to cut the number of components and reduce the dimensions of the transmission M due to the gears being used in common.

Moreover, since the first speed drive gear 35 is supported on the second auxiliary input shaft 14 via the one-way clutch 38, it is possible to establish the first speed gear position without requiring a synchronizing device, and it is thus possible to increase the number of forward gear positions while avoiding any increase in the dimensions of the transmission M.

Furthermore, since the first and second idle gears 18A and 18B are fixedly provided on the idle shaft 15, and the driving force of the main input shaft 12 is transmitted to the second auxiliary input shaft 14 via the second clutch 25, the idle drive gear 17, the first and second idle gears 18A and 18B, and the idle driven gear 19, by selecting the numbers of teeth for the idle drive gear 17, the first and second idle gears 18A and 18B, and the idle driven gear 19 the rotational speed ratio of the first auxiliary input shaft 13 and the second auxiliary input shaft 14 can be set freely.

Moreover, since the first and second idle gears 18A and 18B for transmitting the driving force of the main input shaft 12 to the second auxiliary input shaft 14 and the reverse gear 45 for establishing the reverse gear position are supported by utilizing the common idle shaft 15, compared with a case in which the first and second idle gears 18A and 18B and the reverse gear 45 are each supported on separate shafts, it is possible to reduce the dimensions of the automatic transmission M.

Furthermore, since the idle drive gear 17 for transmitting a driving force to the idle shaft 15 by engagement of the second clutch 25 meshes with the seventh speed driven gear 40, which is the highest speed position gear and is disengageably supported on the output shaft 16, when establishing the seventh speed gear position the driving force of the main input shaft 12 is transmitted directly to the output shaft 16 without going through the first auxiliary input shaft 13, the second auxiliary input shaft 14, or the idle shaft 15, and it is therefore possible to reduce the friction of the transmission M in the seventh speed gear position, which is very frequently established over a long period of time when cruising at high vehicle speed, thus reducing fuel consumption.

When establishing the sixth speed gear position, which is the next position to the highest, seventh speed, gear position, since the driving force of the main input shaft 12 is transmitted to the output shaft 16 via the first auxiliary input shaft 13 without going through the idle system formed from idle drive gear 17, the idle gear 18, and the idle driven gear 19, it is possible to minimize friction and reduce fuel consumption. In this way, in accordance with the present embodiment, fuel consumption can be reduced effectively in the seventh speed gear position and the sixth speed gear position, which are the highest gear position and the second highest gear position and are very frequently established over a long period of time when cruising at middle-high vehicle speed.

Furthermore, since the third synchronizing device 44 is used in common for engagement of the seventh speed driven gear 40, which is the highest gear position gear, with the output shaft 16 and disengagement therefrom, and engagement of the first speed-second speed-reverse driven gear 41, which is the lowest gear position gear, with the output shaft 16 and disengagement therefrom, it is possible to reduce the dimensions and weight of the transmission.

[Embodiment 20]

Figure 55:
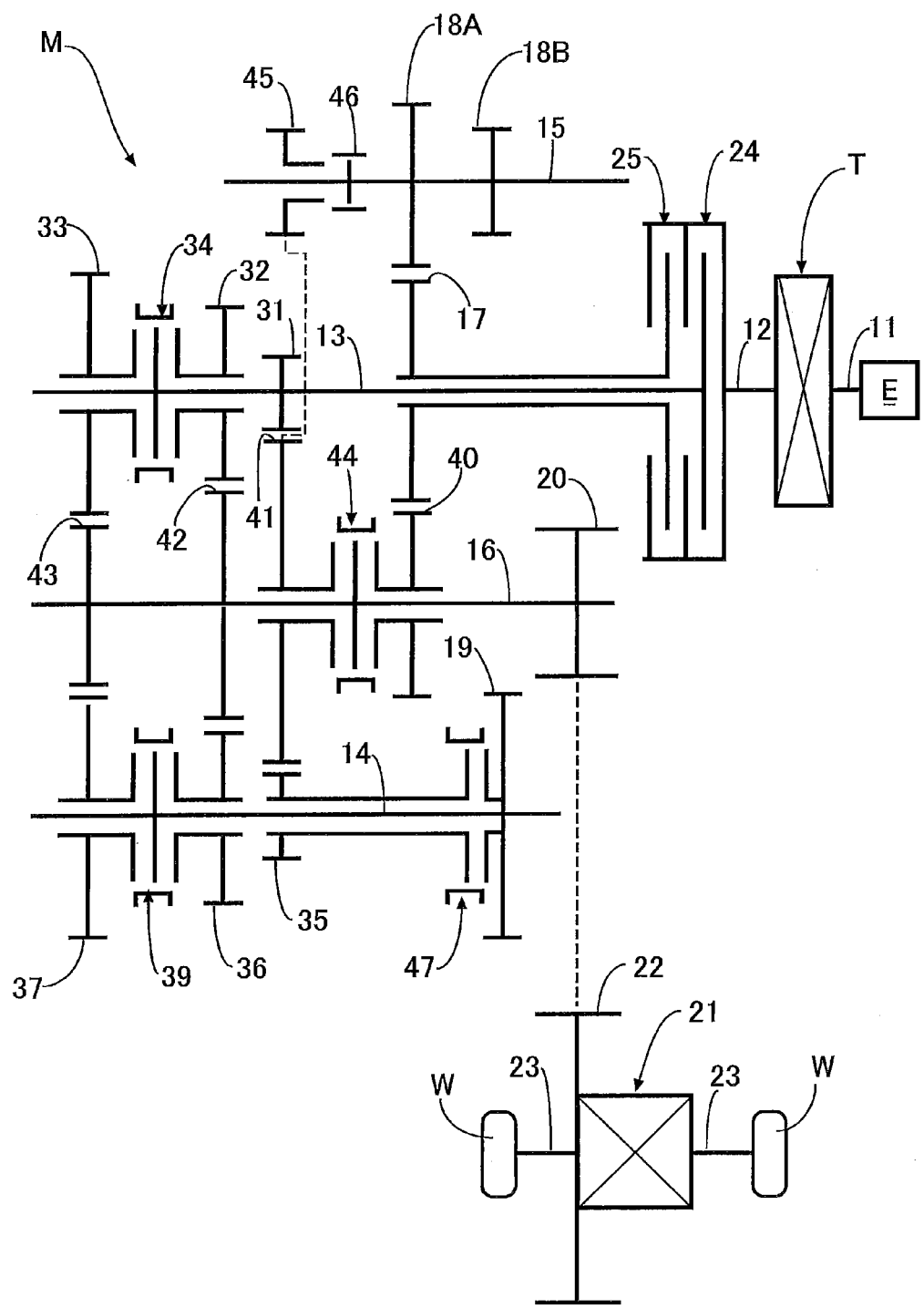
FIG. 55 is a skeleton diagram of a transmission. (twentieth embodiment)

A twentieth embodiment of the present invention is now explained by reference to FIG. 55. In the twentieth embodiment to a twenty-third embodiment, components corresponding to the components of the nineteenth embodiment are denoted by the same reference numerals and symbols as those for the components of the nineteenth embodiment, and duplication of the explanation is therefore omitted. Reference numerals and symbols used in the nineteenth to twenty-third embodiments are only used for the nineteenth to twenty-third embodiments, and are not related to reference numerals and symbols of other embodiments.

In the nineteenth embodiment, the first speed drive gear 35 is supported on the second auxiliary input shaft 14 via the one-way clutch 38, whereas in the twentieth embodiment a first speed drive gear 35 is supported on a second auxiliary input shaft 14 via a fourth synchronizing device 47. Also in accordance with the twentieth embodiment, engaging the first speed drive gear 35 with the second auxiliary input shaft 14 and disengaging it therefrom by means of the fourth synchronizing device 47 enables the same operational effects as those of the nineteenth embodiment to be achieved.

[Embodiment 21]

Figure 56:
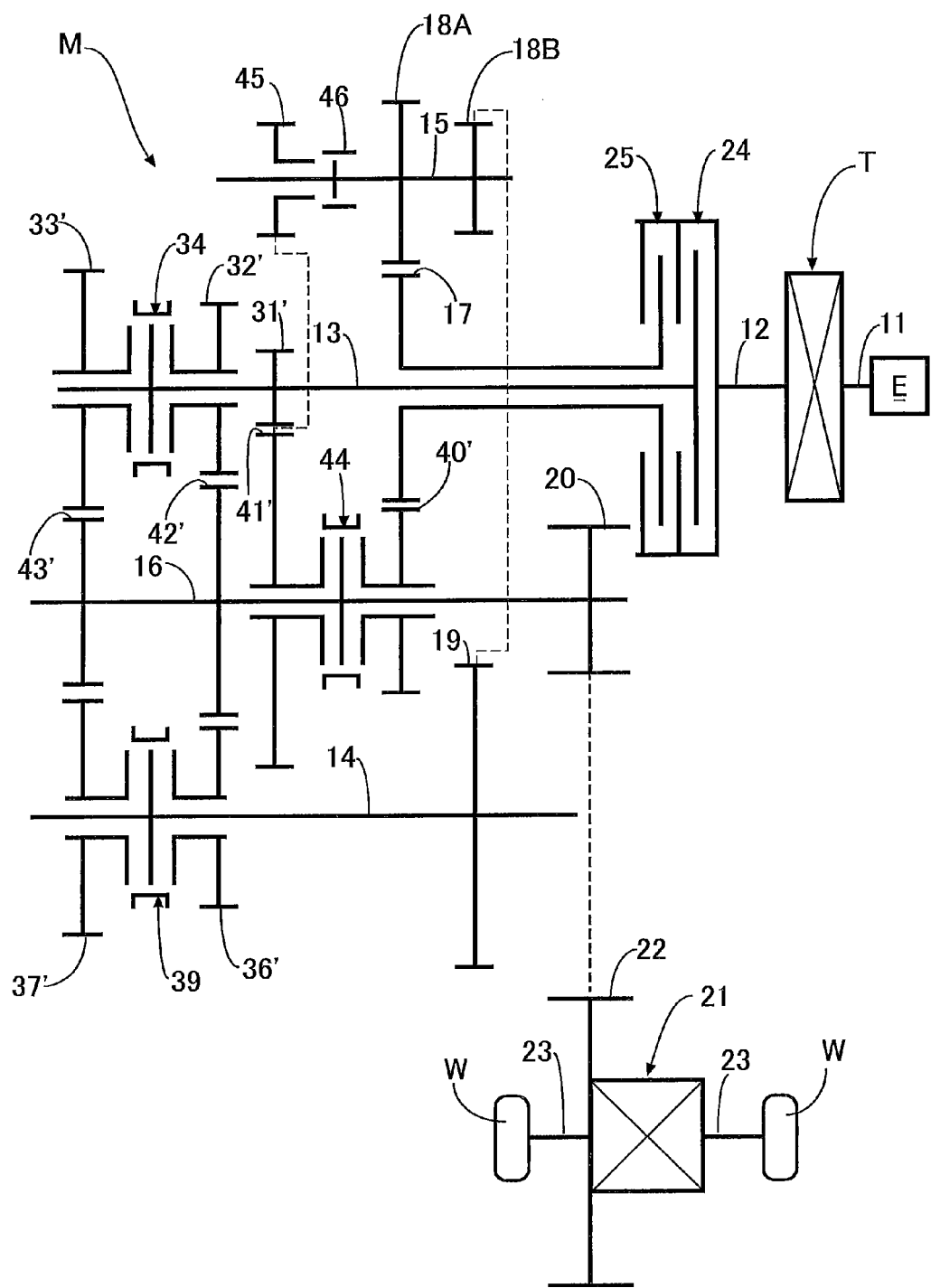
FIG. 56 is a skeleton diagram of a transmission. (twenty-first embodiment)

A twenty-first embodiment of the present invention is now explained by reference to FIG. 56.

In the twenty-first embodiment, the first speed drive gear 35 and the one-way clutch 38 of the nineteenth embodiment (see FIG. 46) are eliminated, and the number of forward gear positions is therefore decreased from seven positions to six positions. Therefore, a first speed drive gear 31', a second speed drive gear 36', a third speed drive gear 32', a fourth speed drive gear 37', a fifth speed drive gear 33', a sixth speed driven gear 40', a first speed-reverse driven gear 41', a second speed-third speed driven gear 42', and a fourth speed-fifth speed driven gear 43' of the twenty-first embodiment respectively correspond to the second speed drive gear 31, the third speed drive gear 36, the fourth speed drive gear 32, the fifth speed drive gear 37, the sixth speed drive gear 33, the seventh speed drive gear 40, the first speed-second speed-reverse driven gear 41, the third speed-fourth speed driven gear 42, and the fifth speed-sixth speed driven gear 43 of the nineteenth embodiment.

Controlling first and second clutches 24 and 25, first to third synchronizing devices 34, 39, and 44, and a dog clutch 46 as when establishing the second speed gear position to the seventh speed gear position and the reverse gear position in the nineteenth embodiment enables first speed to sixth speed gear positions and a reverse gear position to be established in the twenty-first embodiment.

[Embodiment 22]

Figure 57:
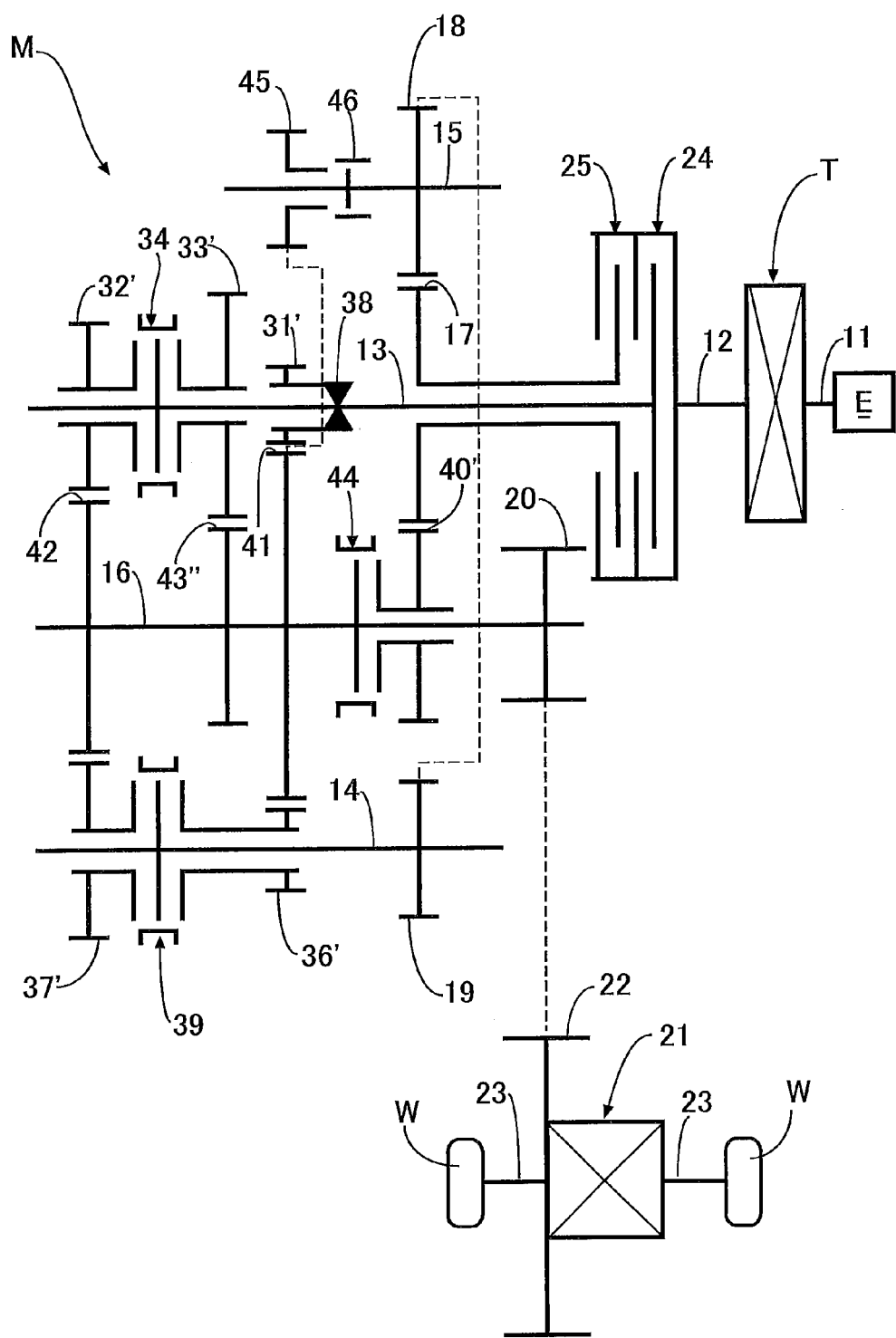
FIG. 57 is a skeleton diagram of a transmission. (twenty-second embodiment)

A twenty-second embodiment of the present invention is now explained by reference to FIG. 57.

In the nineteenth embodiment, the drive gears for even-numbered positions, that is, the second speed drive gear 31, the fourth speed drive gear 32, and the sixth speed drive gear 33 are supported on the first auxiliary input shaft 13, and the drive gears for odd-numbered positions, that is, the first speed drive gear 35, the third speed drive gear 36, and the fifth speed drive gear 37 are supported on the second auxiliary input shaft 14, whereas in the twenty-second embodiment, drive gears for odd-numbered positions, that is, a first speed drive gear 31', a third speed drive gear 32', and a fifth speed drive gear 33' are supported on a first auxiliary input shaft 13, and drive gears for even-numbered positions, that is, a second speed drive gear 36' and a fourth speed drive gear 37' are supported on a second auxiliary input shaft 14. Therefore, in the twenty-second embodiment, the second auxiliary input shaft 14 is increased in speed relative to the first auxiliary input shaft 13.

The first speed drive gear 31' is supported on the first auxiliary input shaft 13 via a one-way clutch 38. A first speed-second speed-reverse driven gear 41, a third speed-fourth speed driven gear 42, and a fifth speed driven gear 43" are fixedly provided on an output shaft 16. Furthermore, first and second idle gears 18A and 18B are combined into one idle gear 18.

In accordance with the twenty-second embodiment, engaging a first clutch 24 allows a first speed gear position to be established. Furthermore, engaging a second clutch 25 and connecting the second speed drive gear 36' to the second auxiliary input shaft 14 by means of a second synchronizing device 39 allows a second speed gear position to be established. Furthermore, engaging the first clutch 24 and connecting the third speed drive gear 32' to the first auxiliary input shaft 13 by means of a first synchronizing device 34 allows a third speed gear position to be established.

Furthermore, engaging the second clutch 25 and connecting the fourth speed drive gear 37' to the second auxiliary input shaft 14 by means of the second synchronizing device 39 allows a fourth speed gear position to be established. Moreover, engaging the first clutch 24 and connecting the fifth speed drive gear 33' to the first auxiliary input shaft 13 by means of the first synchronizing device 34 allows a fifth speed gear position to be established. Furthermore, engaging the first clutch 24 and connecting the sixth speed driven gear 40' to the output shaft 16 by means of a third synchronizing device 44 enables a sixth speed gear position to be established. Moreover, engaging the second clutch 25 and connecting a reverse gear 45 to an idle shaft 15 by means of a dog clutch 46 allows a reverse gear position to be established.

In the twenty-second embodiment, half of the functions of the third synchronizing device 44 of the twenty-first embodiment are taken care of by the one-way clutch 38, and it is therefore possible for the same operational effects as those of the twenty-first embodiment to be exhibited while reducing the dimensions of the third synchronizing device 44.

Furthermore, since the idle drive gear 17, the idle gear 18, the idle driven gear 19, and the sixth speed drive gear 40', which is the highest gear position, are disposed in the same plane, it is possible to decrease the number of idle gears 18 to one, reduce the dimensions and weight of the transmission M, and reduce the axial dimension. The reason why the number of idle gears 18 can be decreased to one and the idle drive gear 17, the idle gear 18, the idle driven gear 19, and the sixth speed drive gear 40' can be disposed in the same plane is that, since the second auxiliary input shaft 14 is increased in speed relative to the first auxiliary input shaft 13, the idle drive gear 17 has a large diameter, the idle driven gear 19 has a small diameter, and there is no possibility of the idle driven gear 19 interfering with the sixth speed drive gear 40'.

[Embodiment 23]

Figure 58:
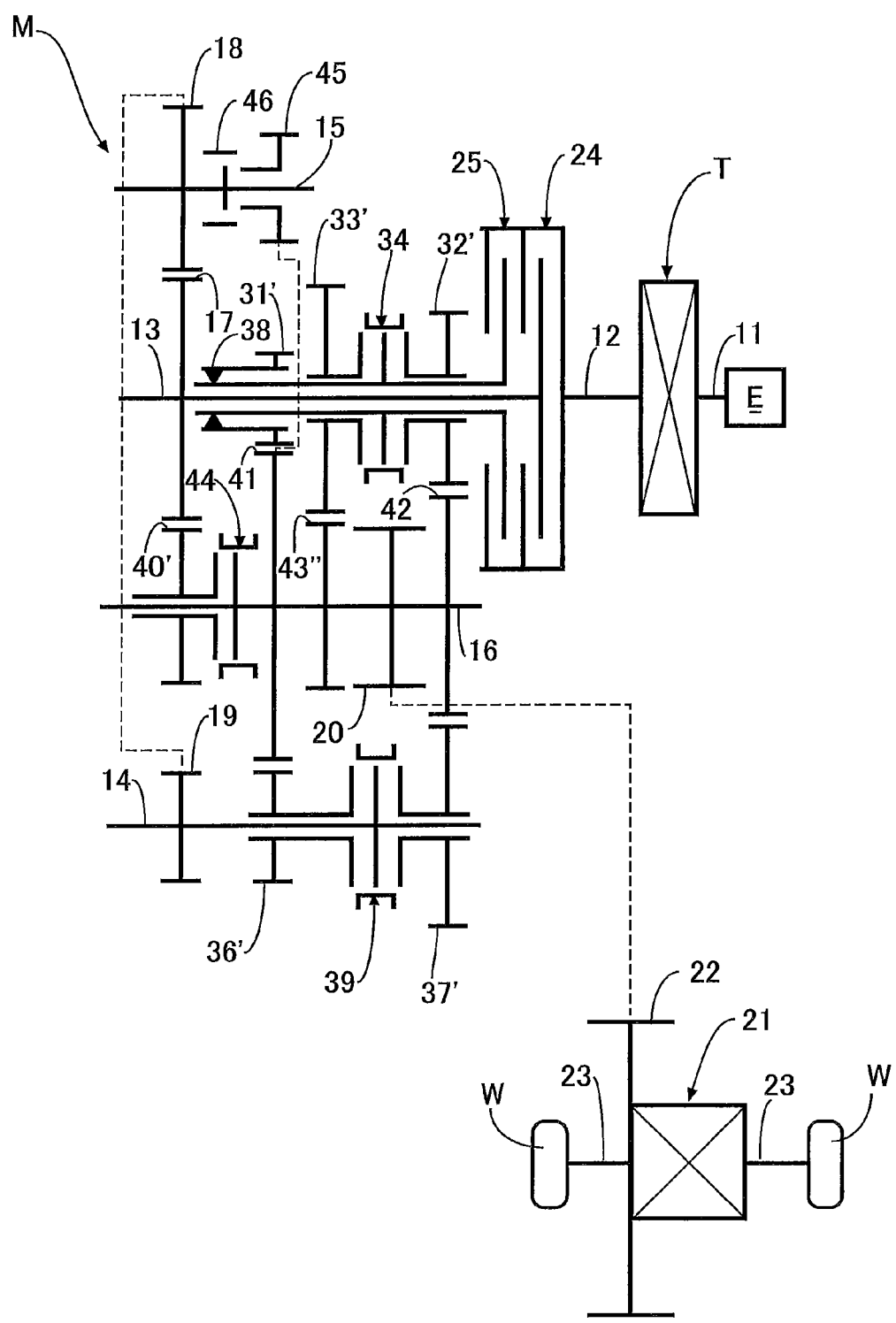
FIG. 58 is a skeleton diagram of a transmission. (twenty-third embodiment)

A twenty-third embodiment of the present invention is now explained by reference to FIG. 58.

The twenty-third embodiment is a modification of the twenty-second embodiment; in the twenty-third embodiment portions of the transmission T of the twenty-second embodiment apart from the first and second clutches 24 and 25 are flipped horizontally, and the final drive gear 20 is moved from a shaft end of the output shaft 16 to a position between the third speed-fourth speed driven gear 42 and the fifth speed driven gear 43" on the output shaft 16.

In accordance with the twenty-third embodiment, disposing the final drive gear 20 in an intermediate section in the axial direction of the transmission T enables the axial dimension of the transmission to be reduced.

The nineteenth to twenty-third embodiments of the present invention are explained above, but the present invention may be modified in a variety of ways as long as the modifications do not depart from the spirit and scope thereof.

For example, the automatic transmission M of the nineteenth to twenty-third embodiments includes the torque converter T, but when a further reduction in the axial dimension is required, the torque converter T can be eliminated.

Furthermore, in the nineteenth to twenty-third embodiments the automatic transmission M is illustrated, but an automated manual clutch may be provided at the position for the torque converter T.

Moreover, in the twenty-first embodiment the idle gear 18 is fixed on the idle shaft 15 and the reverse gear 45 is relatively rotatably supported, but the reverse gear 45 may be fixed and the idle gear 18 may be relatively rotatably supported.

Furthermore, the first and second clutches 24 and 25 may be used as starting clutches as well as gear clutches.

Moreover, the first and second clutches 24 and 25 are not limited to multiple plate wet clutches and may be dry clutches.

[Embodiment 24]

A twenty-fourth embodiment of the present invention is now explained by reference to FIG. 59 to FIG. 67.

Figure 59:
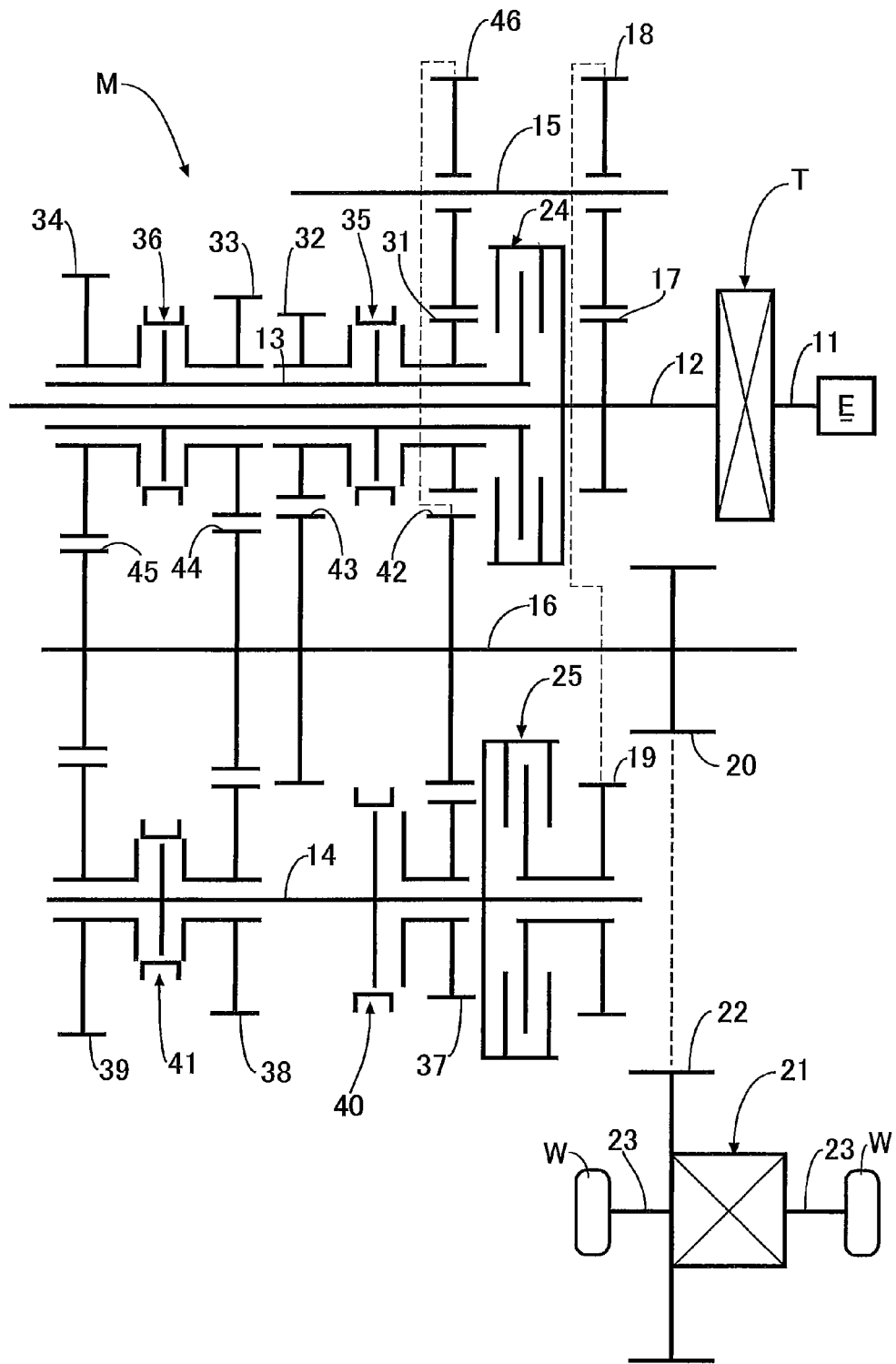
FIG. 59 is a skeleton diagram of a transmission. (twenty-fourth embodiment)
Figure 60:
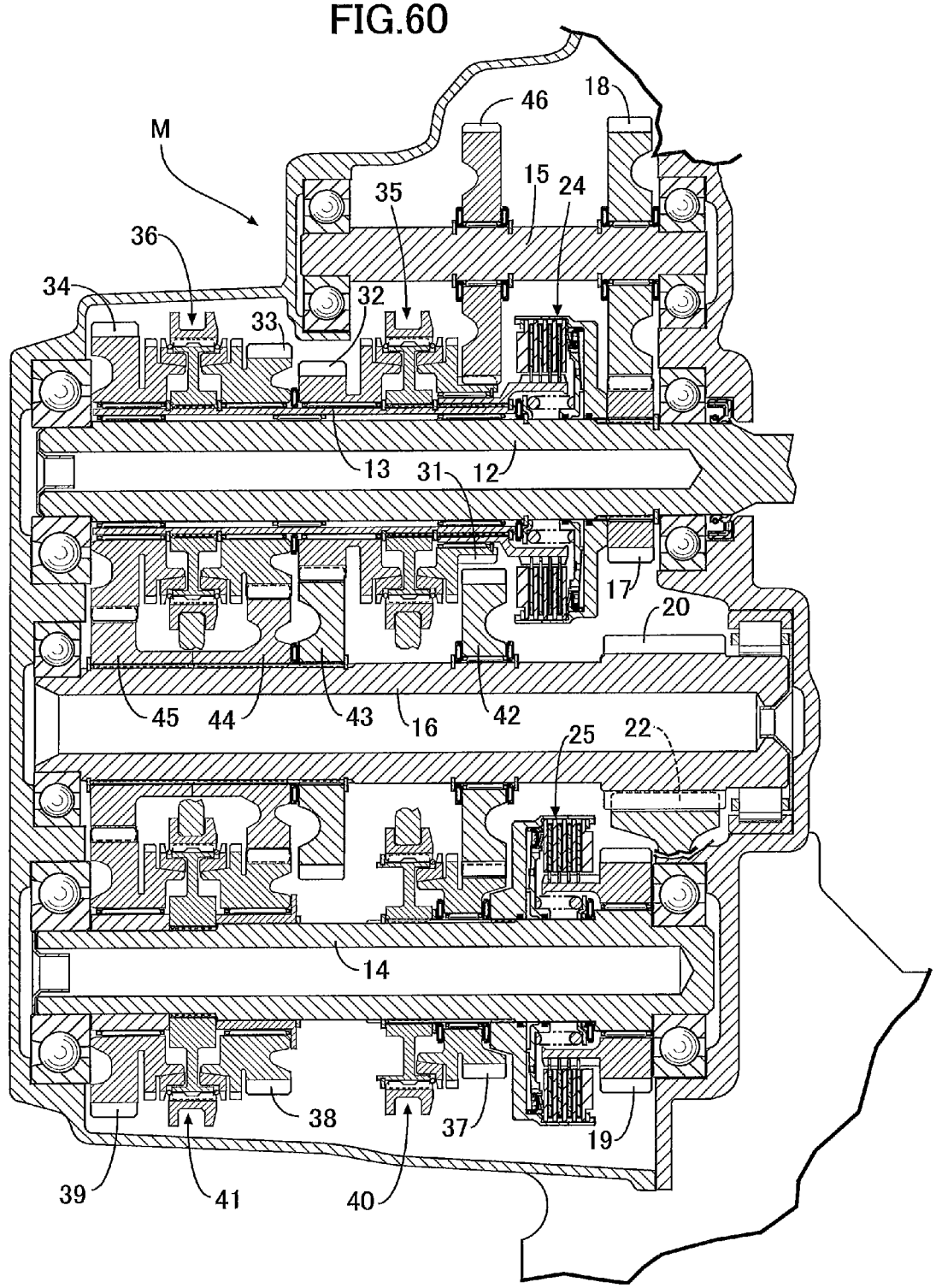
FIG. 60 is a sectional view of a transmission corresponding to FIG. 1. (twenty-fourth embodiment)

As shown in FIG. 59 and FIG. 60, an automatic transmission M having six forward speeds and one reverse speed includes a main input shaft 12 coaxially connected to a crankshaft 11 of an engine E via a torque converter T, a first auxiliary input shaft 13 relatively rotatably fitted around the outer periphery of the main input shaft 12, a second auxiliary input shaft 14 disposed in parallel to the main input shaft 12, an idle shaft 15 disposed in parallel to the main input shaft 12, and an output shaft 16 disposed in parallel to the main input shaft 12.

An idle drive gear 17 fixedly provided on the main input shaft 12 meshes with an idle gear 18 relatively rotatably supported on the idle shaft 15, and the idle gear 18 meshes with an idle driven gear 19 relatively rotatably supported on the second auxiliary input shaft 14. Therefore, when the main input shaft 12 is rotating, the idle driven gear 19 on the second auxiliary input shaft 14 is always rotating. Furthermore, a final drive gear 20 fixedly provided on the output shaft 16 meshes with a final driven gear 22 of a differential gear 21, and the differential gear 21 is connected to left and right wheels W and W via left and right drive shafts 23 and 23.

The main input shaft 12 can be connected to the first auxiliary input shaft 13 via a first clutch 24, which is a multiple plate wet clutch, and the main input shaft 12 can be connected to the second auxiliary input shaft 14 via the idle drive gear 17, the idle gear 18, the idle driven gear 19, and a second clutch 25, which is a multiple plate wet clutch. That is, selectively engaging the first and second clutches 24 and 25 enables the driving force of the main input shaft to be transmitted to the first and second auxiliary input shafts 13 and 14 selectively and in the same direction. In this process, setting the numbers of teeth of the idle drive gear 17, the idle gear 18, and the idle driven gear 19 enables the ratio of the rotational speed of the first auxiliary input shaft 13 and the rotational speed of the second auxiliary input shaft 14 to be set freely.

A reverse drive gear 31, a second speed drive gear 32, a fourth speed drive gear 33, and a sixth speed drive gear 34 are each independently and relatively rotatably supported on the first auxiliary input shaft 13; the reverse drive gear 31 and the second speed drive gear 32 can be selectively connected to the first auxiliary input shaft 13 by means of a first synchronizing device 35, and the fourth speed drive gear 33 and the sixth speed drive gear 34 can be selectively connected to the first auxiliary input shaft 13 by means of a second synchronizing device 36.

On the other hand, a first speed drive gear 37, a third speed drive gear 38, and a fifth speed drive gear 39 are each independently and relatively rotatably supported on the second auxiliary input shaft 14; the first speed drive gear 37 can be connected to the second auxiliary input shaft 14 by means of a third synchronizing device 40, and the third speed drive gear 38 and the fifth speed drive gear 39 can be selectively connected to the second auxiliary input shaft 14 by means of a fourth synchronizing device 41.

Furthermore, a reverse-first speed driven gear 42, a second speed driven gear 43, a third speed-fourth speed driven gear 44, and a fifth speed-sixth speed driven gear 45 are fixedly provided on the output shaft 16. The reverse-first speed driven gear 42 meshes with a reverse idle gear 46 relatively rotatably supported on the idle shaft 15 and the first speed drive gear 37, the second speed driven gear 43 meshes only with the second speed drive gear 32, the third speed-fourth speed driven gear 44 meshes with the third speed drive gear 38 and the fourth speed drive gear 33, and the fifth speed-sixth speed driven gear 45 meshes with the fifth speed drive gear 39 and the sixth speed drive gear 34.

In addition, since the transmission of the present embodiment is an automatic transmission M, the first to fourth synchronizing devices 35, 36, 40, and 41 are operated by an electronically controlled actuator, which is not illustrated.

Establishment of first speed to sixth speed gear positions and a reverse gear position of the automatic transmission M having the above-mentioned arrangement is now explained.

Figure 61:
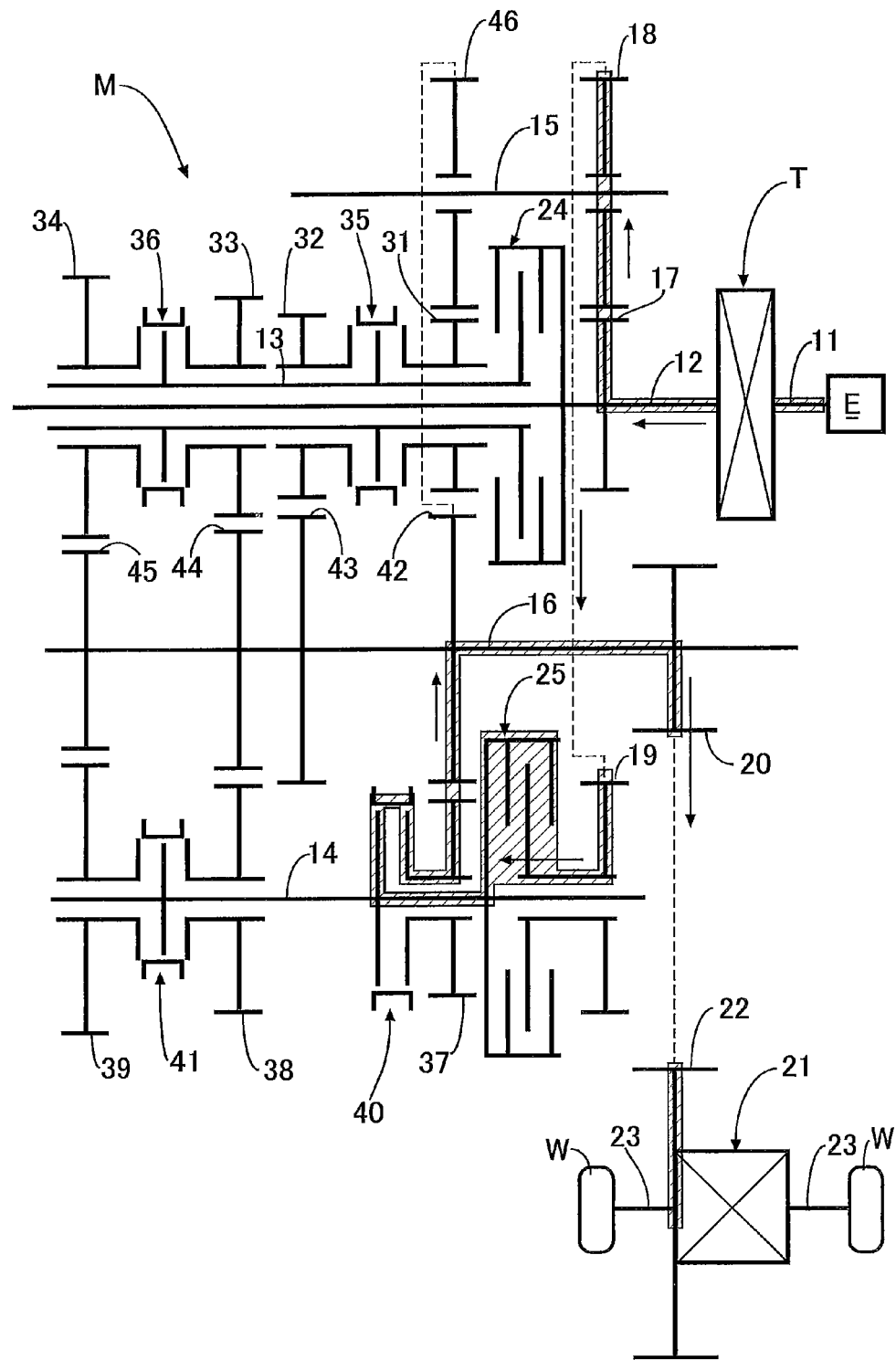
FIG. 61 is a diagram showing a state in which a first speed gear position is established. (twenty-fourth embodiment)

As shown in FIG. 61, when establishing the first speed gear position, the second clutch 25 is engaged so as to connect the idle driven gear 19 to the second auxiliary input shaft 14, and the first speed drive gear 37 is connected to the second auxiliary input shaft 14 by means of the third synchronizing device 40. In this state, the driving force of the engine E is transmitted to the wheels W and W via the path: torque converter T→main input shaft 12→idle drive gear 17→idle gear 18→idle driven gear 19→second clutch 25→second auxiliary input shaft 14→third synchronizing device 40→first speed drive gear 37→reverse-first speed driven gear 42→output shaft 16→final drive gear 20→final driven gear 22→differential gear 21→drive shafts 23 and 23.

Figure 62:
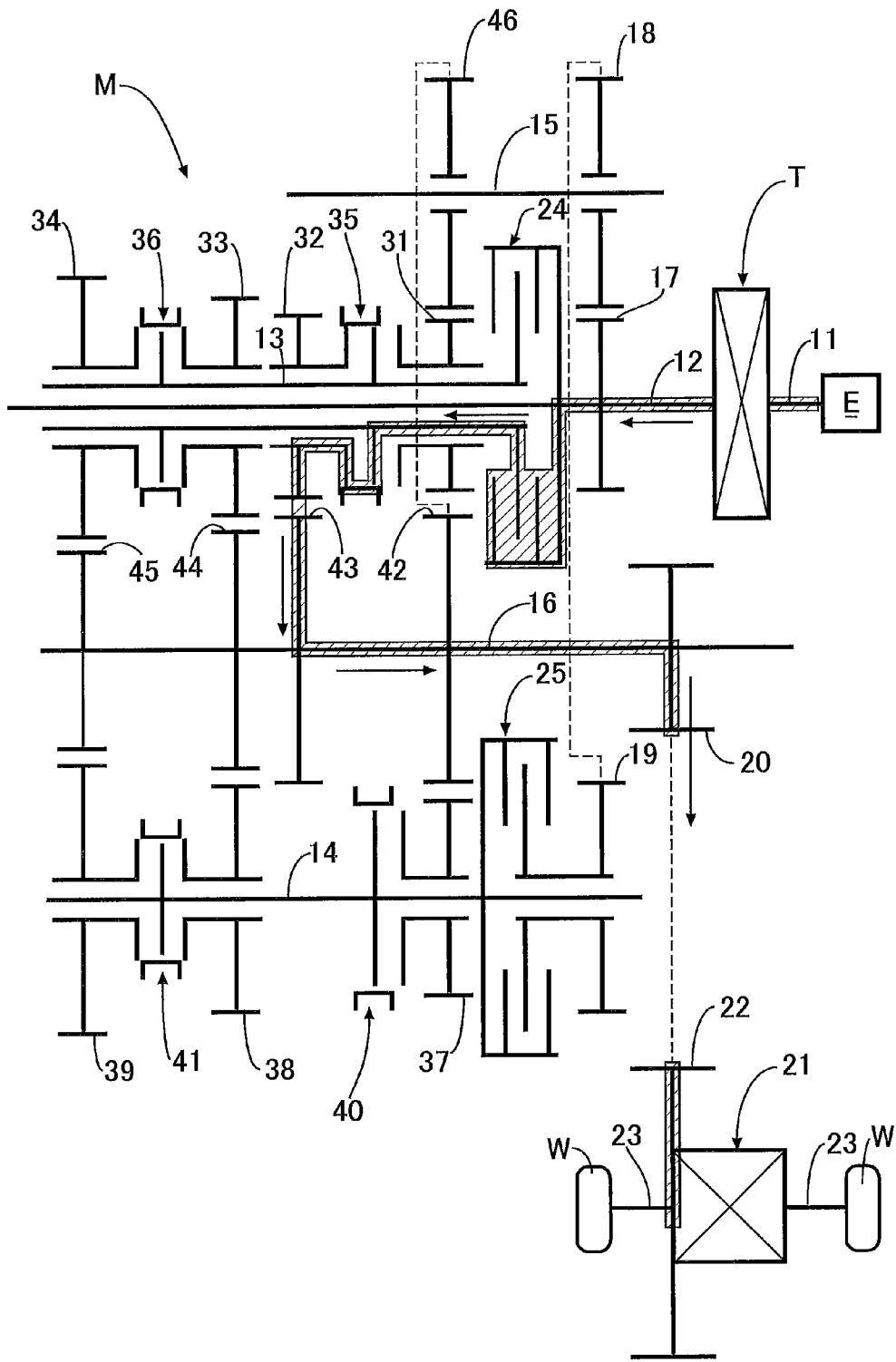
FIG. 62 is a diagram showing a state in which a second speed gear position is established. (twenty-fourth embodiment)

As shown in FIG. 62, when establishing the second speed gear position, the first clutch 24 is engaged so as to connect the main input shaft 12 to the first auxiliary input shaft 13, and the second speed drive gear 32 is connected to the first auxiliary input shaft 13 by means of the first synchronizing device 35. In this state, the driving force of the engine E is transmitted to the wheels W and W via the path: torque converter T→main input shaft 12→first clutch 24→first auxiliary input shaft 13→first synchronizing device 35→second speed drive gear 32→second speed driven gear 43→output shaft 16→final drive gear 20→final driven gear 22→differential gear 21→drive shafts 23 and 23.

Figure 63:
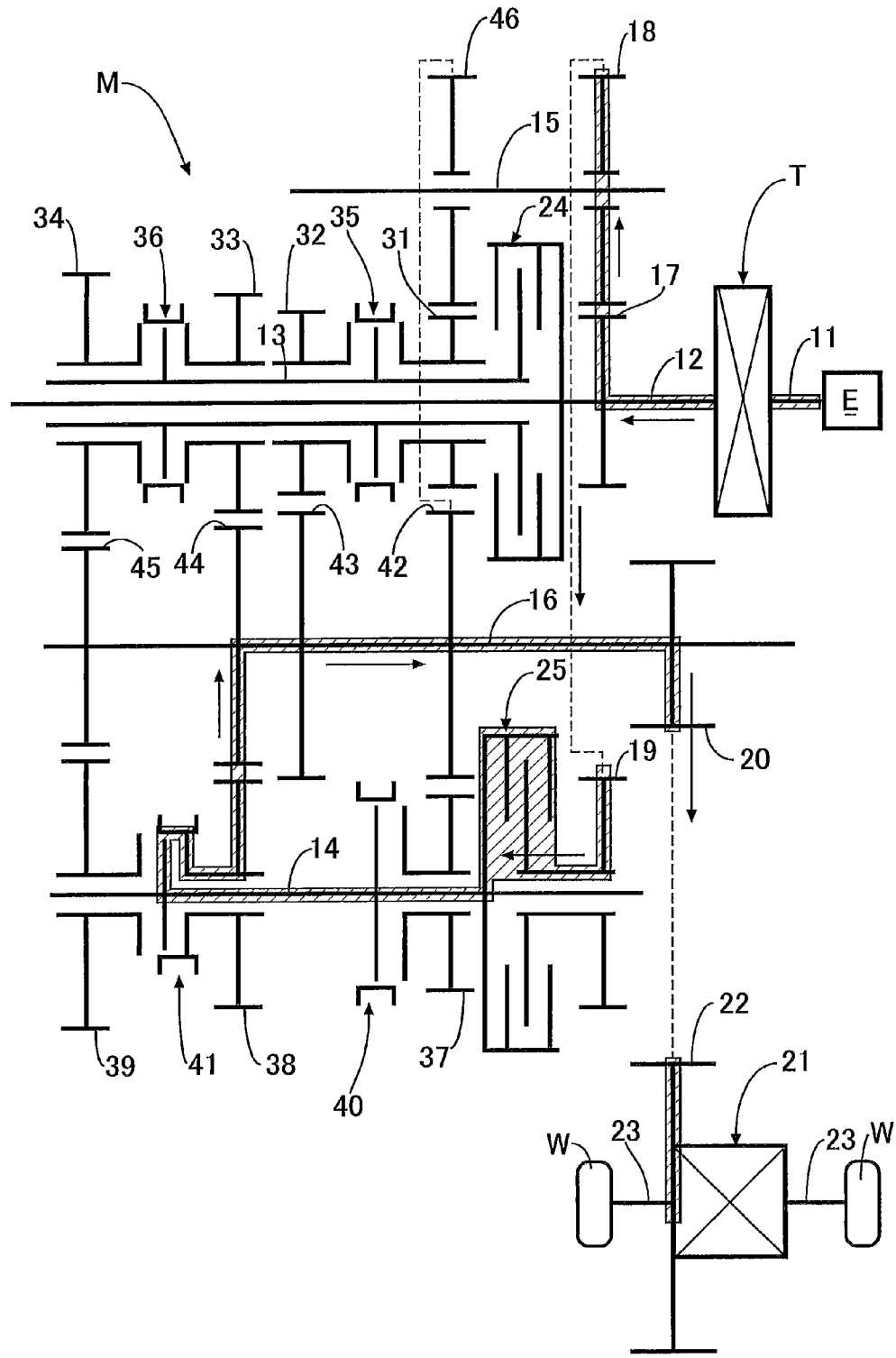
FIG. 63 is a diagram showing a state in which a third speed gear position is established. (twenty-fourth embodiment)

As shown in FIG. 63, when establishing the third speed gear position, the second clutch 25 is engaged so as to connect the idle driven gear 19 to the second auxiliary input shaft 14, and the third speed drive gear 38 is connected to the second auxiliary input shaft 14 by means of the fourth synchronizing device 41. In this state, the driving force of the engine E is transmitted to the wheels W and W via the path: torque converter T→main input shaft 12→idle drive gear 17→idle gear 18→idle driven gear 19→second clutch 25→second auxiliary input shaft 14→fourth synchronizing device 41→third speed drive gear 38→third speed-fourth speed driven gear 44→output shaft 16→final drive gear 20→final driven gear 22→differential gear 21→drive shafts 23 and 23.

Figure 64:
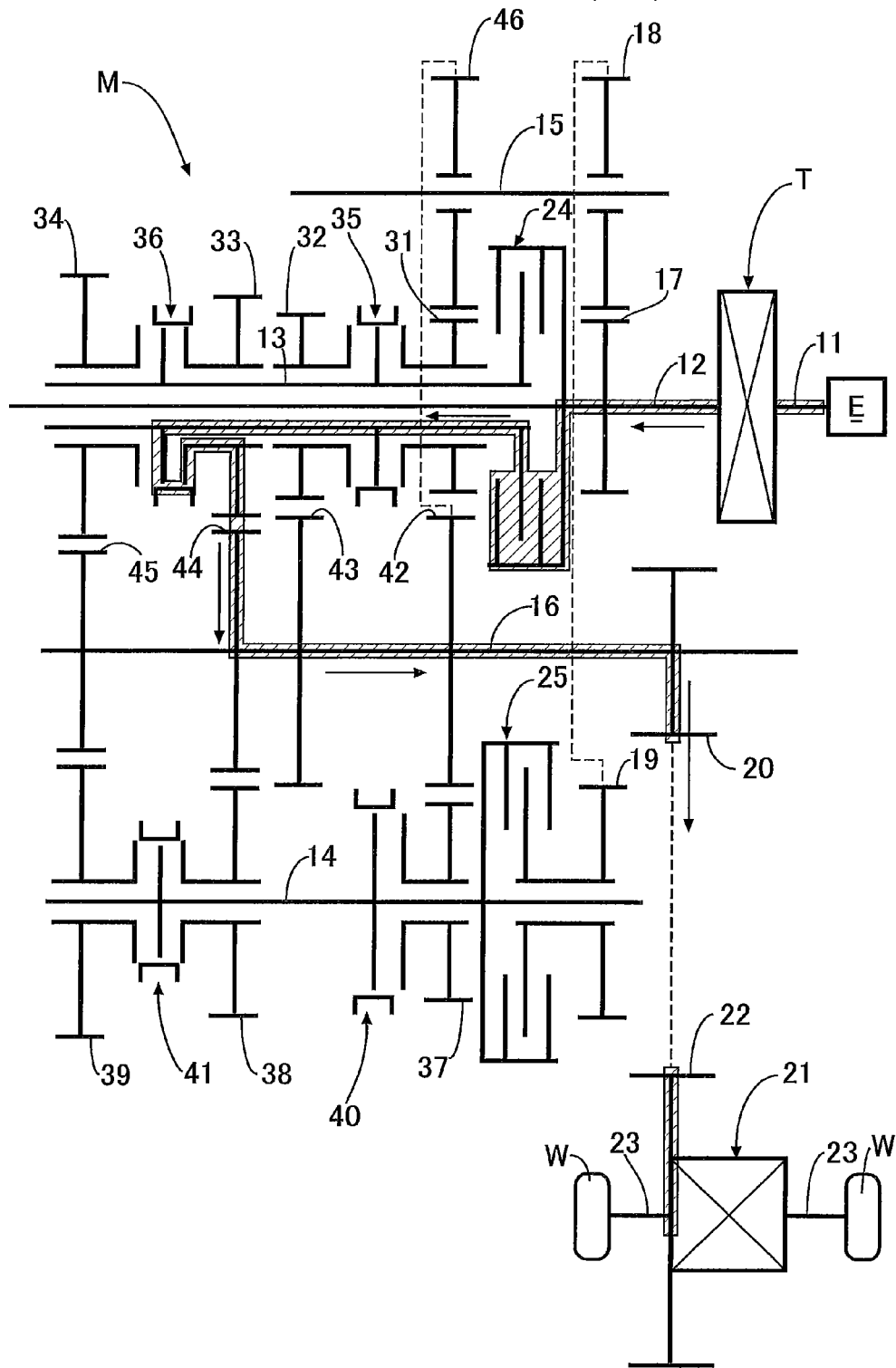
FIG. 64 is a diagram showing a state in which a fourth speed gear position is established. (twenty-fourth embodiment)

As shown in FIG. 64, when establishing the fourth speed gear position, the first clutch 24 is engaged so as to connect the main input shaft 12 to the first auxiliary input shaft 13, and the fourth speed drive gear 33 is connected to the first auxiliary input shaft 13 by means of the second synchronizing device 36. In this state, the driving force of the engine E is transmitted to the wheels W and W via the path: torque converter T→main input shaft 12→first clutch 24→first auxiliary input shaft 13→second synchronizing device 36→fourth speed drive gear 33→third speed-fourth speed driven gear 44→output shaft 16→final drive gear 20→final driven gear 22→differential gear 21→drive shafts 23 and 23.

Figure 65:
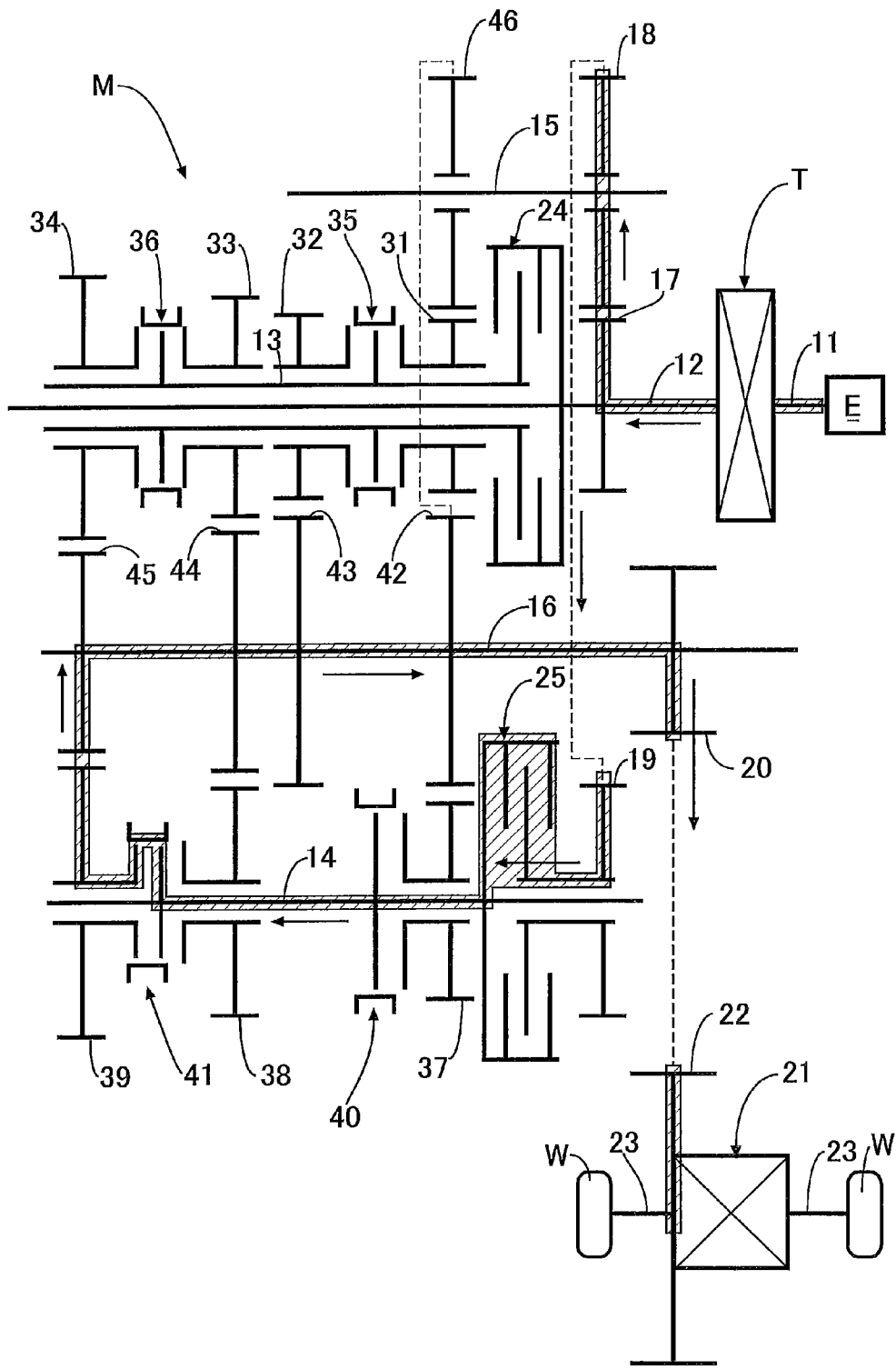
FIG. 65 is a diagram showing a state in which a fifth speed gear position is established. (twenty-fourth embodiment)

As shown in FIG. 65, when establishing the fifth speed gear position, the second clutch 25 is engaged so as to connect the idle driven gear 19 to the second auxiliary input shaft 14, and the fifth speed drive gear 39 is connected to the second auxiliary input shaft 14 by means of the fourth synchronizing device 41. In this state, the driving force of the engine E is transmitted to the wheels W and W via the path: torque converter T→main input shaft 12→idle drive gear 17→idle gear 18→idle driven gear 19→second clutch 25→second auxiliary input shaft 14→fourth synchronizing device 41→fifth speed drive gear 39→fifth speed-sixth speed driven gear 45→output shaft 16→final drive gear 20→final driven gear 22→differential gear 21→drive shafts 23 and 23.

Figure 66:
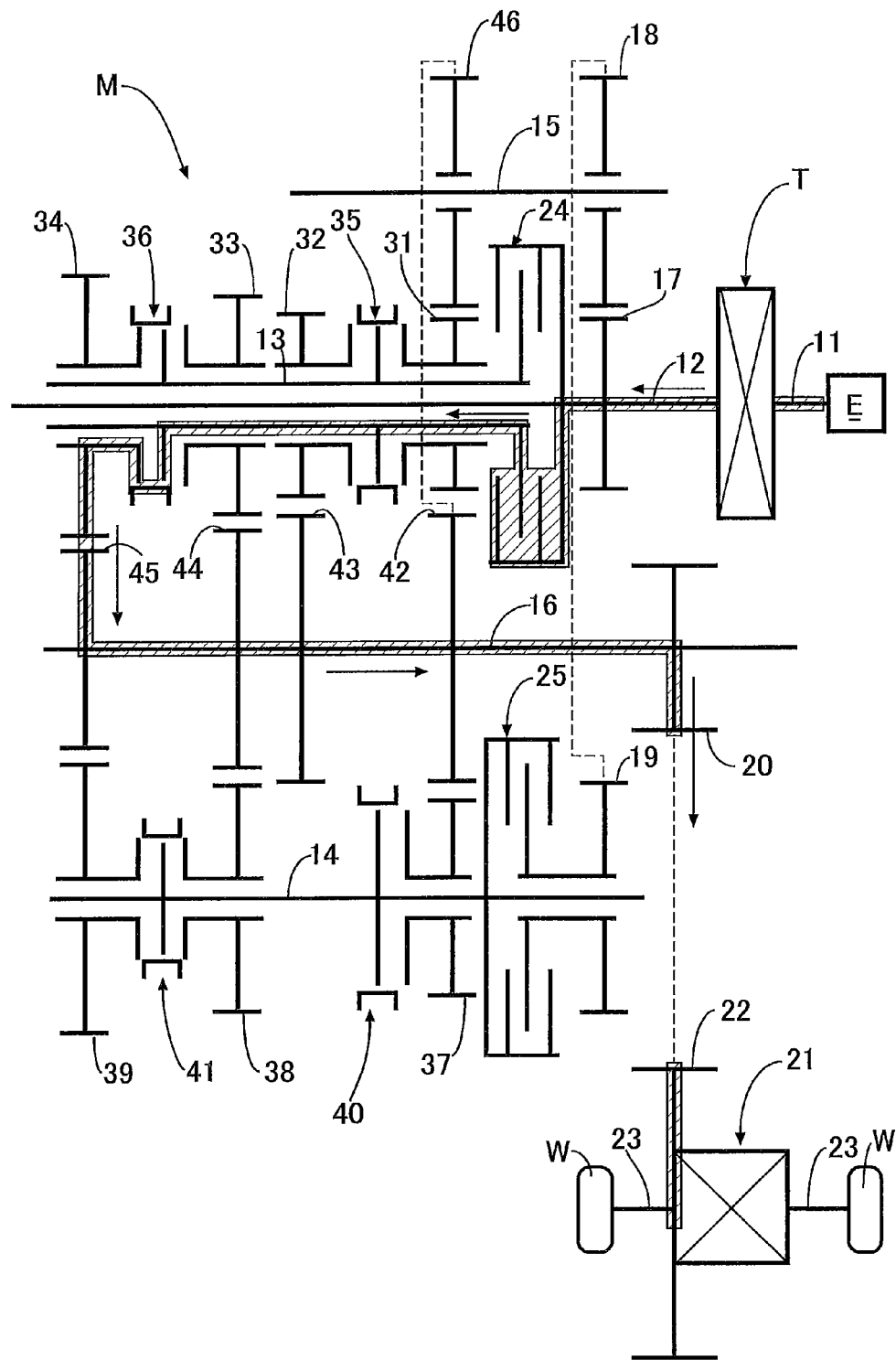
FIG. 66 is a diagram showing a state in which a sixth speed gear position is established. (twenty-fourth embodiment)

As shown in FIG. 66, when establishing the sixth speed gear position, the first clutch 24 is engaged so as to connect the main input shaft 12 to the first auxiliary input shaft 13, and the sixth speed drive gear 34 is connected to the first auxiliary input shaft 13 by means of the second synchronizing device 36. In this state, the driving force of the engine E is transmitted to the wheels W and W via the path: torque converter T→main input shaft 12→first clutch 24→first auxiliary input shaft 13→second synchronizing device 36→sixth speed drive gear 34→fifth speed-sixth speed driven gear 45→output shaft 16→final drive gear 20→final driven gear 22→differential gear 21→drive shafts 23 and 23.

Figure 67:
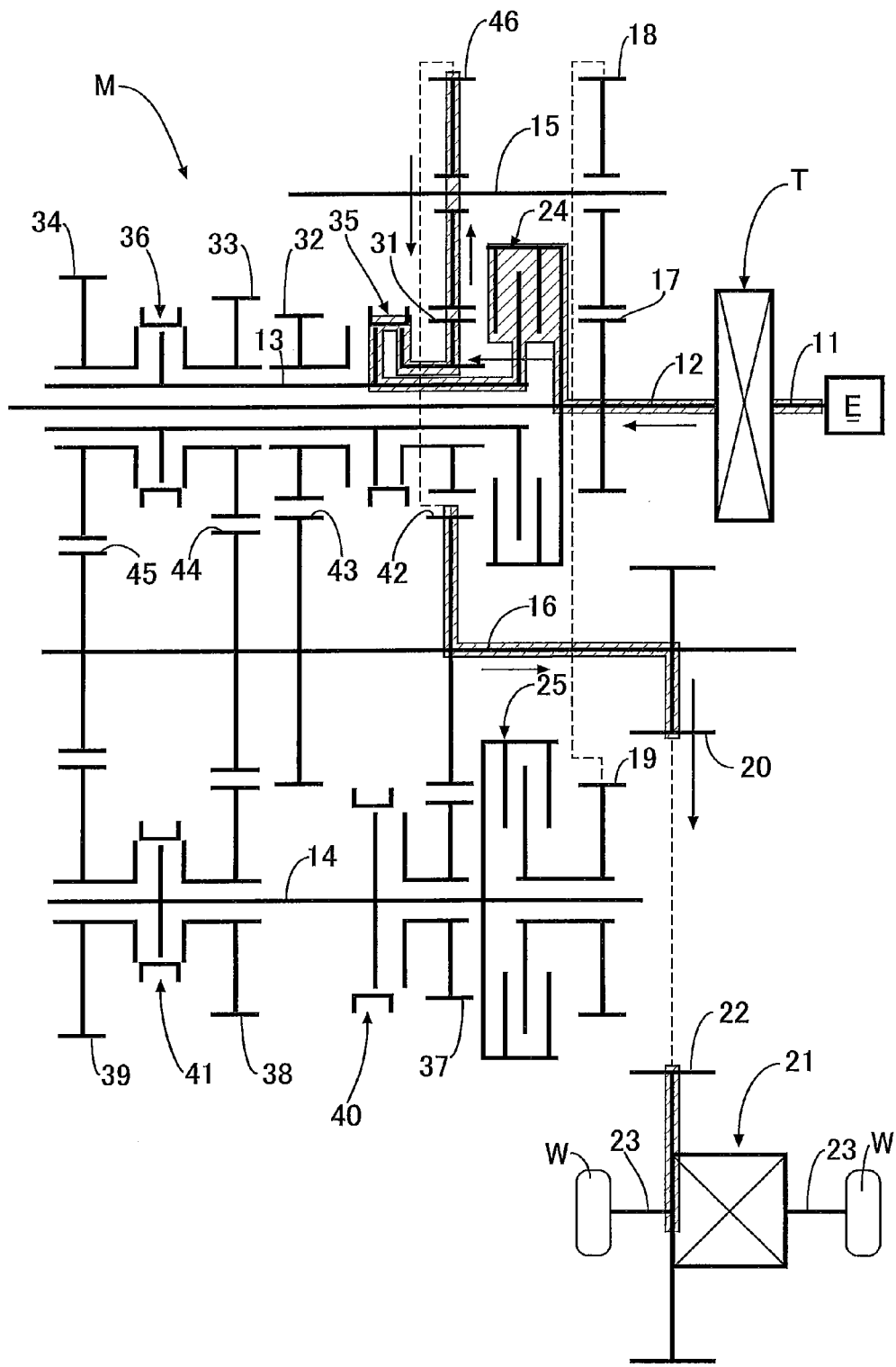
FIG. 67 is a diagram showing a state in which a reverse gear position is established. (twenty-fourth embodiment)

As shown in FIG. 67, when establishing the reverse gear position, the first clutch 24 is engaged so as to connect the main input shaft 12 to the first auxiliary input shaft 13, and the reverse drive gear 31 is connected to the first auxiliary input shaft 13 by means of the first synchronizing device 35. In this state, the driving force of the engine E is transmitted to the wheels W and W via the path: torque converter T→main input shaft 12→first clutch 24→first auxiliary input shaft 13→first synchronizing device 35→reverse drive gear 31→reverse idle gear 46→reverse-first speed driven gear 42→output shaft 16→final drive gear 20→final driven gear 22→differential gear 21→drive shafts 23 and 23. In this process, since the reverse idle gear 46 is present in the transmission path for the driving force, the rotational direction of the output shaft 16 becomes reversed from that when establishing the forward gear position, and the wheels W and W reversely rotate in the reverse direction.

As hereinbefore described, in accordance with the present embodiment, since the first clutch 24, which transmits the driving force of the main input shaft 12 to the first auxiliary input shaft 13, and the second clutch 25, which transmits the driving force of the main input shaft 12 to the second auxiliary input shaft 14, are dividedly disposed on the first and second auxiliary input shafts 13 and 14, compared with a case in which integrated first and second clutches are disposed on a main input shaft 12 it is possible to simplify the structure of the first and second clutches 24 and 25, reduce the dimensions thereof, and cut the production cost therefor.

Furthermore, since the idle gear 18 for transmitting the driving force of the main input shaft 12 to the second auxiliary input shaft 14 and the reverse idle gear 46 for establishing the reverse gear position are supported by utilizing the common idle shaft 15, compared with a case in which an idle gear 18 and a reverse idle gear 46 are each supported on separate shafts, it is possible to reduce the dimensions of the automatic transmission M.

Moreover, since the reverse-first speed driven gear 42 provided on the output shaft 16 is used in common for establishing the reverse gear position and the first speed gear position, the third speed-fourth speed driven gear 44 provided on the output shaft 16 is used in common for establishing the third speed gear position and the fourth speed gear position, and the fifth speed-sixth speed driven gear 45 provided on the output shaft 16 is used in common for establishing the fifth speed gear position and the sixth speed gear position, a total of three gears, that is, 43, 44, and 45, are each used in common for establishing two gear positions, and it is thus possible to cut the number of components and reduce the dimensions of the automatic transmission M.

In the present embodiment, the reason why the third speed-fourth speed driven gear 44 used in common for the third speed gear position and the fourth speed gear position and the fifth speed-sixth speed driven gear 45 used in common for the fifth speed gear position and the sixth speed gear position are used but a first speed-second speed driven gear used in common for the first speed gear position and the second speed gear position is not used and the reverse-first speed driven gear 42 used in common for the first speed gear position and the reverse gear position is used is as follows.

If a first speed-second speed driven gear were used, due to the relationship between the rotational speed ratio of the first and second auxiliary input shafts 13 and 14 and the common use of the first speed-second speed driven gear, the third speed-fourth speed driven gear 44, and the fifth speed-sixth speed driven gear 45, the proportions between the gear ratios from the first speed gear position to the sixth speed gear position inevitably become substantially constant, it becomes difficult to meet the needs for improvement of starting performance by setting a large gear ratio for low speed gear positions such as the first speed gear position and the second speed gear position and for improvement of fuel economy by setting a small gear ratio for high speed positions such as the fifth speed gear position and the sixth speed gear position.

However, in accordance with the present embodiment, without using a first speed-second speed driven gear used in common for the first speed gear position and the second speed gear position, in accordance with use of the reverse-first speed driven gear 42 used in common for the first speed gear position and the reverse gear position and setting gear ratios independently without using in common the driven gear for the second speed gear position, it becomes possible to freely set a gear ratio for a low speed gear position such as the first speed gear position or the second speed gear position and a gear ratio for a high speed gear position such as the fifth speed gear position or the sixth speed gear position independently from each other, thus enabling a balance to be achieved between starting performance and fuel economy.

In this case, restrictions are imposed on setting of a gear ratio for the reverse gear position, but in the present embodiment there is no problem since a value between the gear ratio for the first speed gear position and the gear ratio for the second speed gear position, which is a normal gear ratio for the reverse gear position, can be ensured.

[Embodiment 25]

Figure 68:
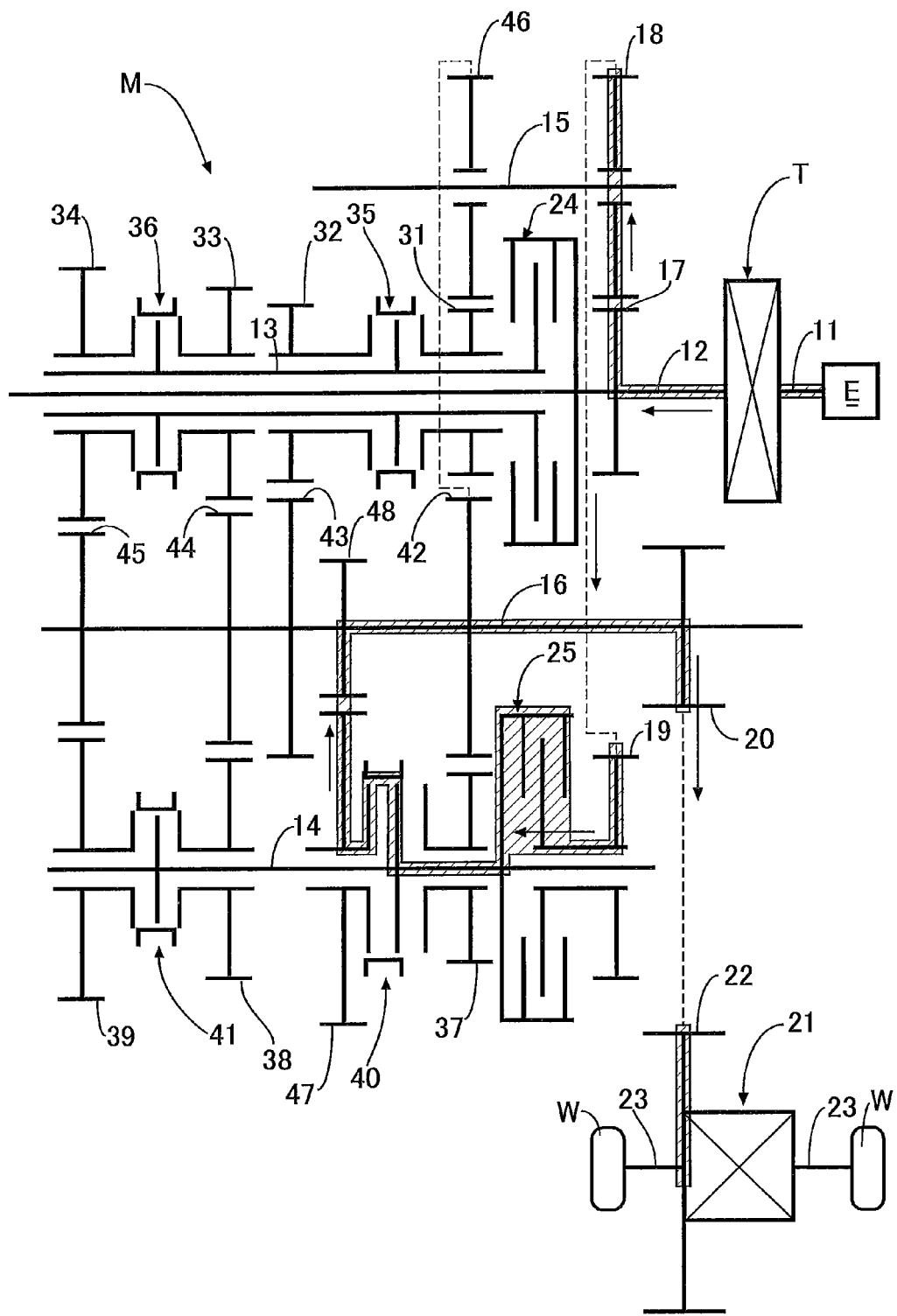
FIG. 68 is a skeleton diagram of a transmission (when establishing a seventh speed gear position). (twenty-fifth embodiment)

A twenty-fifth embodiment of the present invention is now explained by reference to FIG. 68. In the twenty-fifth embodiment and a twenty-sixth embodiment, components corresponding to the components of the twenty-fourth embodiment are denoted by the same reference numerals and symbols as those for the components of the twenty-fourth embodiment, and duplication of the explanation is therefore omitted. Reference numerals and symbols used in the twenty-fourth to twenty-sixth embodiments are only used for the twenty-fourth to twenty-sixth embodiments, and are not related to reference numerals and symbols of other embodiments.

The automatic transmission M of the twenty-fourth embodiment is one having six forward speeds and one reverse speed, but an automatic transmission M of the twenty-fifth embodiment is one having seven forward speeds and one reverse speed, with a seventh speed gear position added.

Two components are added for establishing the seventh speed gear position, that is, a seventh speed drive gear 47 relatively rotatably supported on a second auxiliary input shaft 14 and a seventh speed driven gear 48 fixedly provided on an output shaft 16 and always meshing with the seventh speed drive gear 47. Therefore, a second clutch 25 is engaged so as to connect an idle driven gear 19 to the second auxiliary input shaft 14, and the seventh speed drive gear 47 is connected to the second auxiliary input shaft 14 by means of a third synchronizing device 40. In this state, the driving force of an engine E is transmitted to wheels W and W via the path: torque converter T→main input shaft 12→idle drive gear 17→idle gear 18→idle driven gear 19→second clutch 25→second auxiliary input shaft 14→third synchronizing device 40→seventh speed drive gear 47→seventh speed driven gear 48→output shaft 16→final drive gear 20→final driven gear 22→differential gear 21→drive shafts 23 and 23.

The other operational effects of the twenty-fifth embodiment are the same as the above-mentioned operational effects of the twenty-fourth embodiment.

[Embodiment 26]

Figure 69:
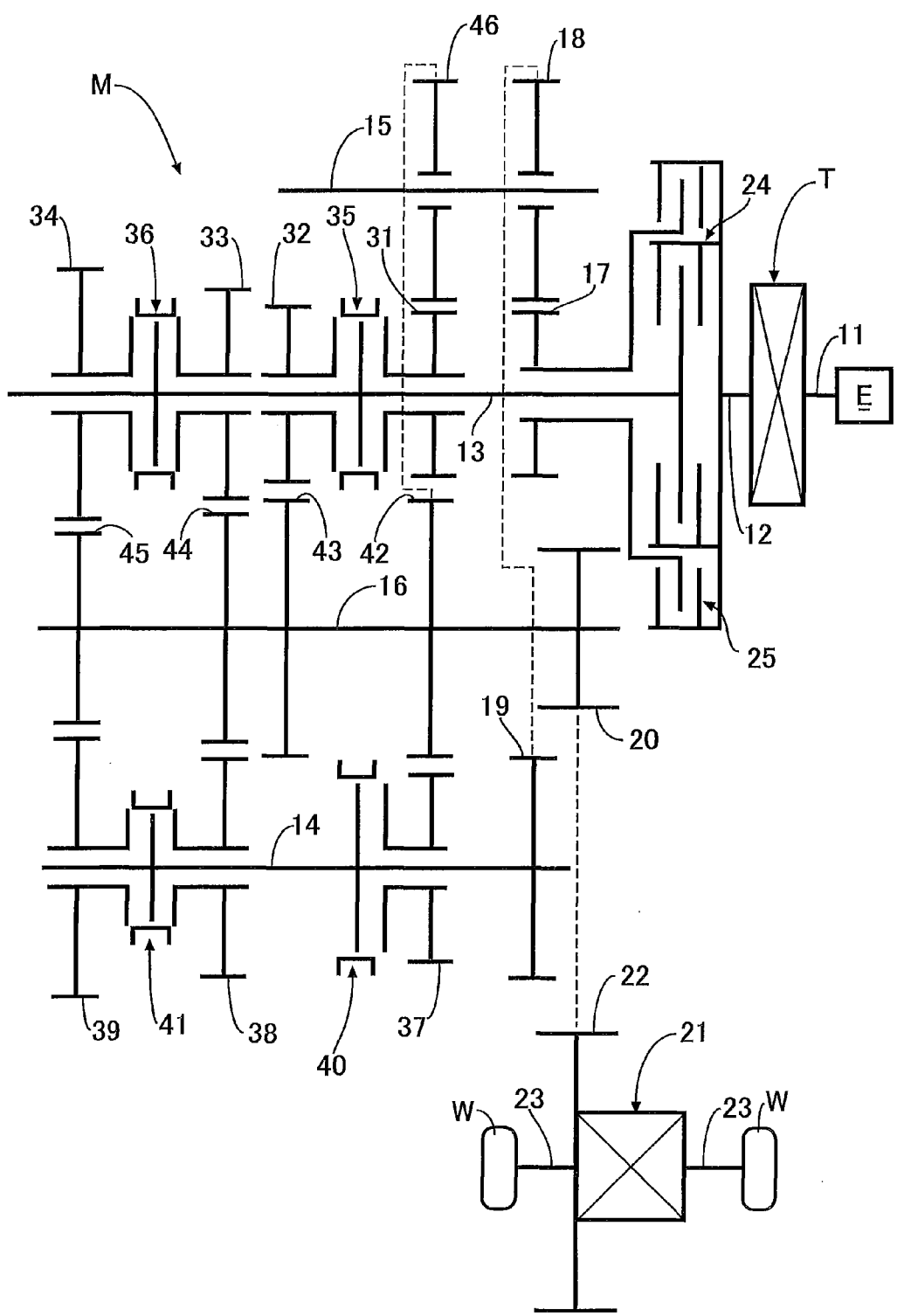
FIG. 69 is a skeleton diagram of a transmission. (twenty-sixth embodiment)

The twenty-sixth embodiment of the present invention is now explained by reference to FIG. 69.

In the twenty-fourth embodiment, the first clutch 24 is disposed on the first auxiliary input shaft 13 side and the second clutch 25 is disposed on the second auxiliary input shaft 14 side, but in the twenty-sixth embodiment a first clutch 24 and a second clutch 25 are disposed on a first auxiliary input shaft 13 side in an aggregated manner.

That is, the first clutch 24 and the second clutch 25, which are integrated, are disposed between a main input shaft 12 and the first auxiliary input shaft 13, which are coaxially disposed, the first clutch 24, which is positioned on the radially inner side, connects the main input shaft 12 to the first auxiliary input shaft 13, and the second clutch 25, which is positioned on the radially outer side, connects the main input shaft 12 to an idle drive gear 17. An idle driven gear 19 is fixedly provided on a second auxiliary input shaft 14.

Therefore, engaging the first clutch 24 allows rotation of the main input shaft 12 to be transmitted to the first auxiliary input shaft 13, and engaging the second clutch 25 allows rotation of the main input shaft 12 to be transmitted to the second auxiliary input shaft 14 via the idle drive gear 17, an idle gear 18, and the idle driven gear 19. The relationship between the operation of first to fourth synchronizing mechanisms 35, 36, 40, and 41 and the establishment of each gear position is the same as that of the twenty-fourth embodiment.

Also in accordance with the twenty-sixth embodiment, since a reverse-first speed driven gear 42 provided on an output shaft 16 is used in common for establishing a reverse gear position and a first speed gear position, a third speed-fourth speed driven gear 44 provided on the output shaft 16 is used in common for establishing a third speed gear position and a fourth speed gear position, and a fifth speed-sixth speed driven gear 45 provided on the output shaft 16 is used in common for establishing a fifth speed gear position and a sixth speed gear position, a total of three gears, that is, 43, 44, and 45, are used in common for establishing two gear positions, thus cutting the number of components and reducing the dimensions of an automatic transmission M.

The twenty-fourth to twenty-sixth embodiments of the present invention are explained above, but the present invention may be modified in a variety of ways as long as the modifications do not depart from the spirit and scope thereof.

For example, the automatic transmission M of the twenty-fourth to twenty-sixth embodiments includes the torque converter T, but when a further reduction in the axial dimension is required, the torque converter T can be eliminated.

Furthermore, in the twenty-fourth to twenty-sixth embodiments the automatic transmission M is illustrated, but an automated manual clutch may be provided at the position for the torque converter T.

[Embodiment 27]

A twenty-seventh embodiment of the present invention is now explained by reference to FIG. 70 to FIG. 78. Reference numerals and symbols used in the twenty-seventh embodiment are only used for the twenty-seventh embodiment, and are not related to reference numerals and symbols of other embodiments.

Figure 70:
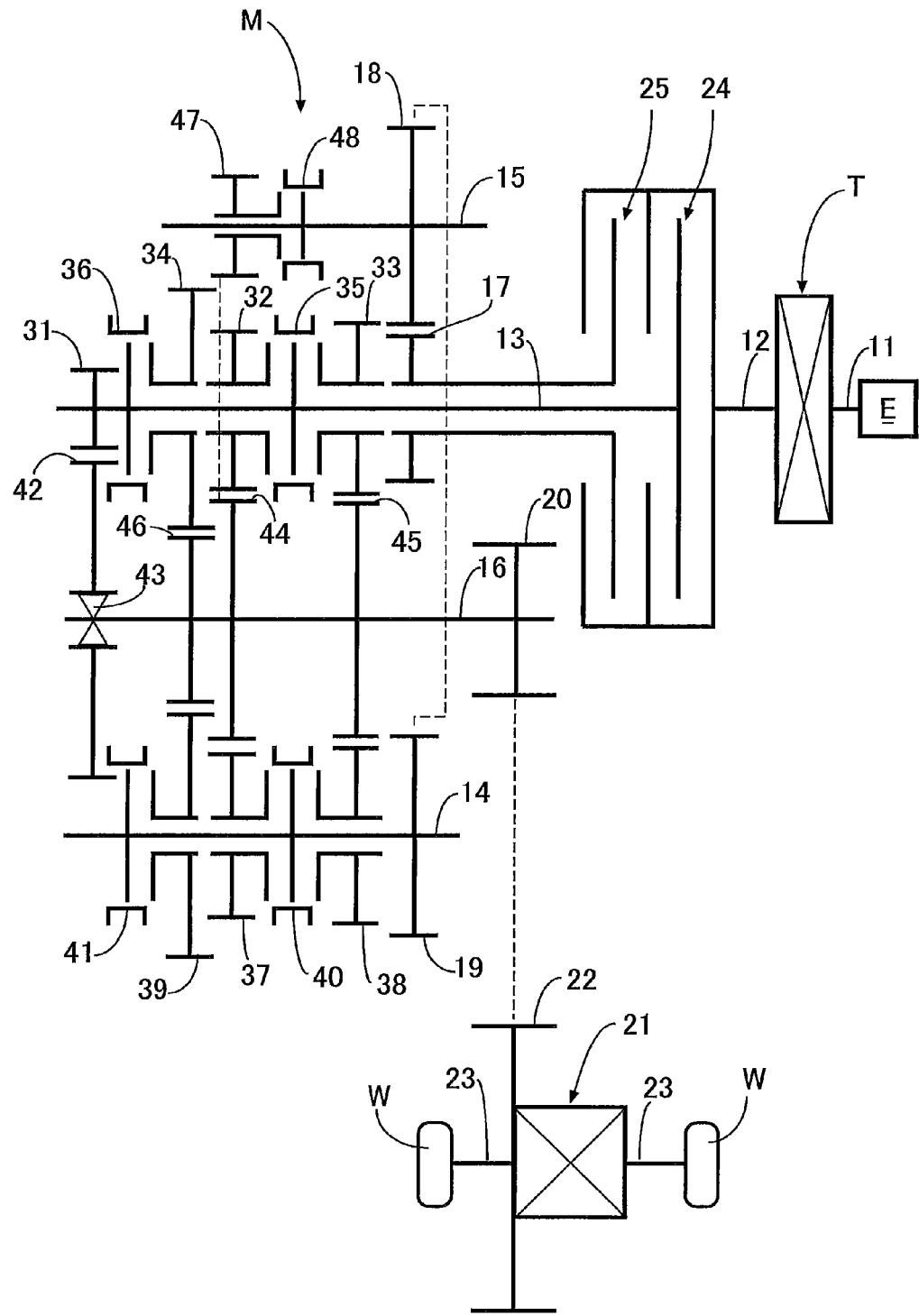
FIG. 70 is a skeleton diagram of a transmission. (twenty-seventh embodiment)

As shown in FIG. 70, an automatic transmission M having seven forward speeds and one reverse speed includes a main input shaft 12 coaxially connected to a crankshaft 11 of an engine E via a torque converter T, a first auxiliary input shaft 13 disposed coaxially with the main input shaft 12, a second auxiliary input shaft 14 disposed in parallel to the main input shaft 12, an idle shaft 15 disposed in parallel to the main input shaft 12, and an output shaft 16 disposed in parallel to the main input shaft 12.

An idle drive gear 17 fixedly provided on the first auxiliary input shaft 13 meshes with an idle gear 18 fixedly provided on the idle shaft 15, and an idle gear 18 meshes with an idle driven gear 19 fixedly provided on the second auxiliary input shaft 14. Furthermore, a final drive gear 20 fixedly provided on the output shaft 16 meshes with a final driven gear 22 of a differential gear 21, and the differential gear 21 is connected to left and right wheels W and W via left and right drive shafts 23 and 23.

Engaging a first clutch 24, which is a multiple plate wet clutch, allows the driving force of the main input shaft 12 to be transmitted directly to the first auxiliary input shaft 13. Engaging a second clutch 25, which is a multiple plate wet clutch, allows the driving force of the main input shaft 12 to be transmitted to the second auxiliary input shaft 14 via the idle drive gear 17, the idle gear 18, and the idle driven gear 19. Therefore, selectively engaging the first and second clutches 24 and 25, which are integrated, enables the driving force of the main input shaft 12 to be transmitted to the first and second auxiliary input shafts 13 and 14 selectively and in the same direction.

A first speed drive gear 31 is fixedly provided on the first auxiliary input shaft 13, and a third speed drive gear 32, a fifth speed drive gear 33, and a seventh speed drive gear 34 are each independently and relatively rotatably supported thereon; the third speed drive gear 32 and the fifth speed drive gear 33 can be selectively connected to the first auxiliary input shaft 13 by means of a first synchronizing device 35, and the seventh speed drive gear 34 can be connected to the first auxiliary input shaft 13 by means of a second synchronizing device 36.

On the other hand, a second speed drive gear 37, a fourth speed drive gear 38, and a sixth speed drive gear 39 are each independently and relatively rotatably supported on the second auxiliary input shaft 14; the second speed drive gear 37 and the fourth speed drive gear 38 can be selectively connected to the second auxiliary input shaft 14 by means of a third synchronizing device 40, and the sixth speed drive gear 39 can be connected to the second auxiliary input shaft 14 by means of a fourth synchronizing device 41.

Furthermore, a first speed driven gear 42 is support on the output shaft 16 via a one-way clutch 43, and a second speed-third speed-reverse driven gear 44, a fourth speed-fifth speed driven gear 45, and a sixth speed-seventh speed driven gear 46 are fixedly provided thereon. The first speed driven gear 42 meshes with the first speed drive gear 31 fixedly provided on the first auxiliary input shaft 13, and the second speed-third speed-reverse driven gear 44 meshes with the second speed drive gear 37 relatively rotatably supported on the second auxiliary input shaft 14, the third speed drive gear 32 relatively rotatably supported on the first auxiliary input shaft 13, and a reverse gear 47 relatively rotatably supported on the idle shaft 15. The reverse gear 47 can be connected to the idle shaft 15 via a dog clutch 48.

Since the transmission of the present embodiment is the automatic transmission M, the first to fourth synchronizing devices 35, 36, 40, and 41 and the dog clutch 48 are operated by an electronically controlled actuator, which is not illustrated.

Establishment of first speed to seventh speed gear positions and a reverse gear position of the automatic transmission M having the above-mentioned arrangement is now explained.

Figure 71:
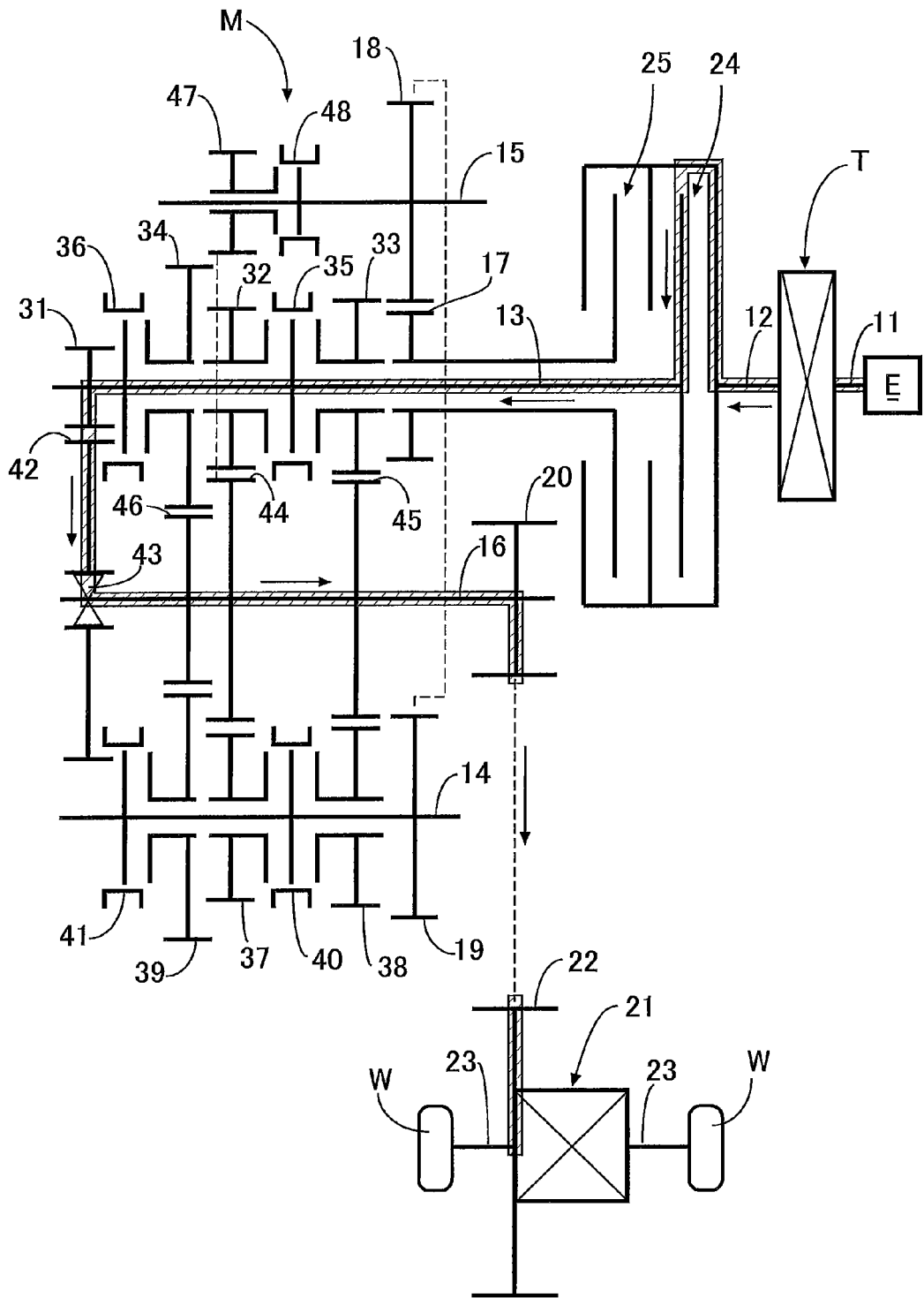
FIG. 71 is a diagram showing a state in which a first speed gear position is established. (twenty-seventh embodiment)

As shown in FIG. 71, when establishing the first speed gear position, in a state in which all of the first to fourth synchronizing devices 35, 36, 40, and 41 and the dog clutch 48 are disengaged, the first clutch 24 is engaged so as to connect the main input shaft 12 to the first auxiliary input shaft 13. In this state, the driving force of the engine E is transmitted to the wheels W and W via the path: torque converter T→main input shaft 12→first clutch 24→first auxiliary input shaft 13→first speed drive gear 31→first speed driven gear 42→one-way clutch 43→output shaft 16→final drive gear 20→final driven gear 22→differential gear 21→drive shafts 23 and 23.

Figure 72:
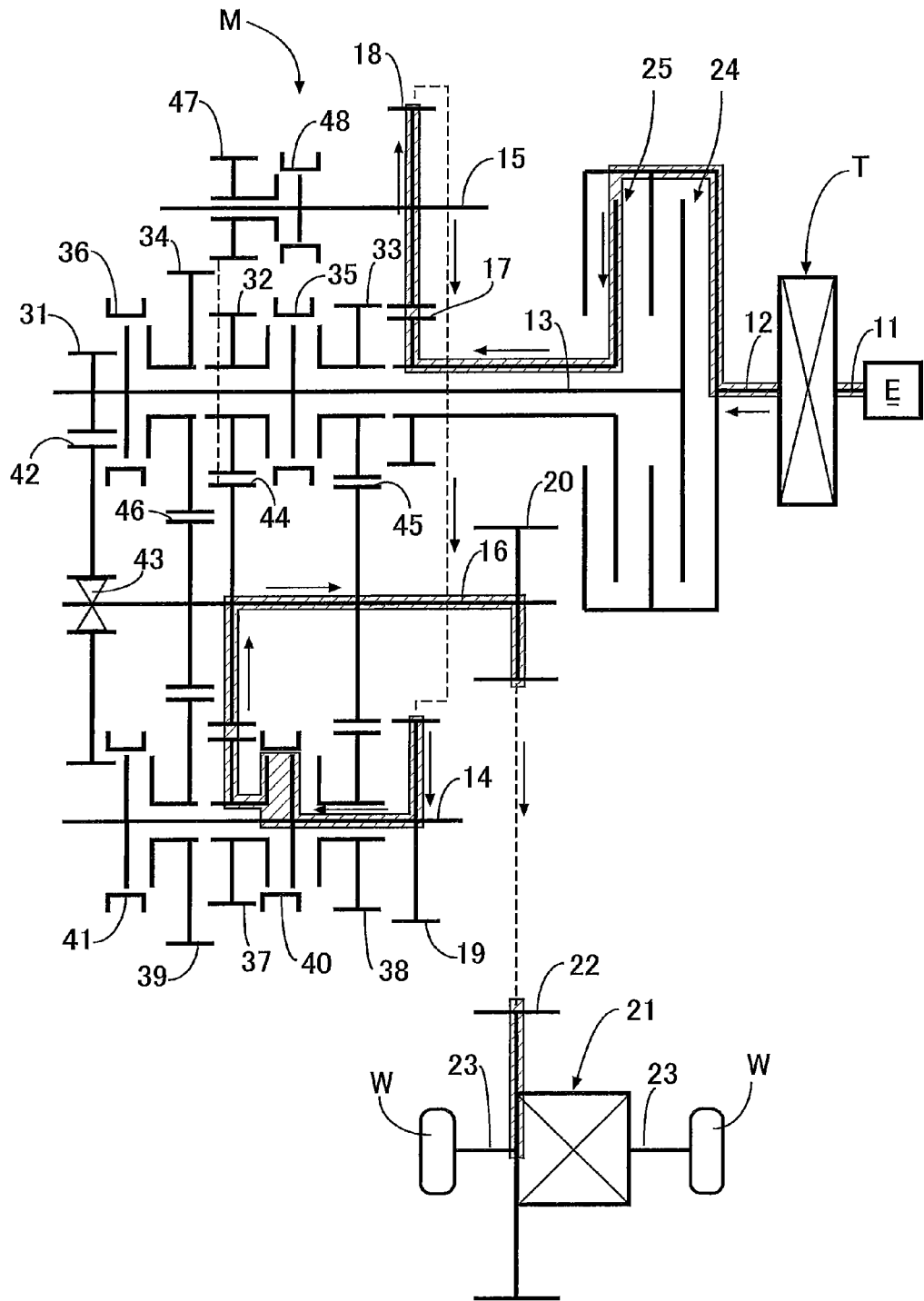
FIG. 72 is a diagram showing a state in which a second speed gear position is established. (twenty-seventh embodiment)

As shown in FIG. 72, when establishing the second speed gear position, the second clutch 25 is engaged so as to connect the main input shaft 12 to the idle drive gear 17, and the second speed drive gear 37 is connected to the second auxiliary input shaft 14 by means of the third synchronizing device 40. In this state, the driving force of the engine E is transmitted to the wheels W and W via the path: torque converter T→main input shaft 12→second clutch 25→idle drive gear 17→idle gear 18→idle driven gear 19→second auxiliary input shaft 14→third synchronizing device 40→second speed drive gear 37→second speed-third speed-reverse driven gear 44→output shaft 16→final drive gear 20→final driven gear 22→differential gear 21→drive shafts 23 and 23.

Figure 73:
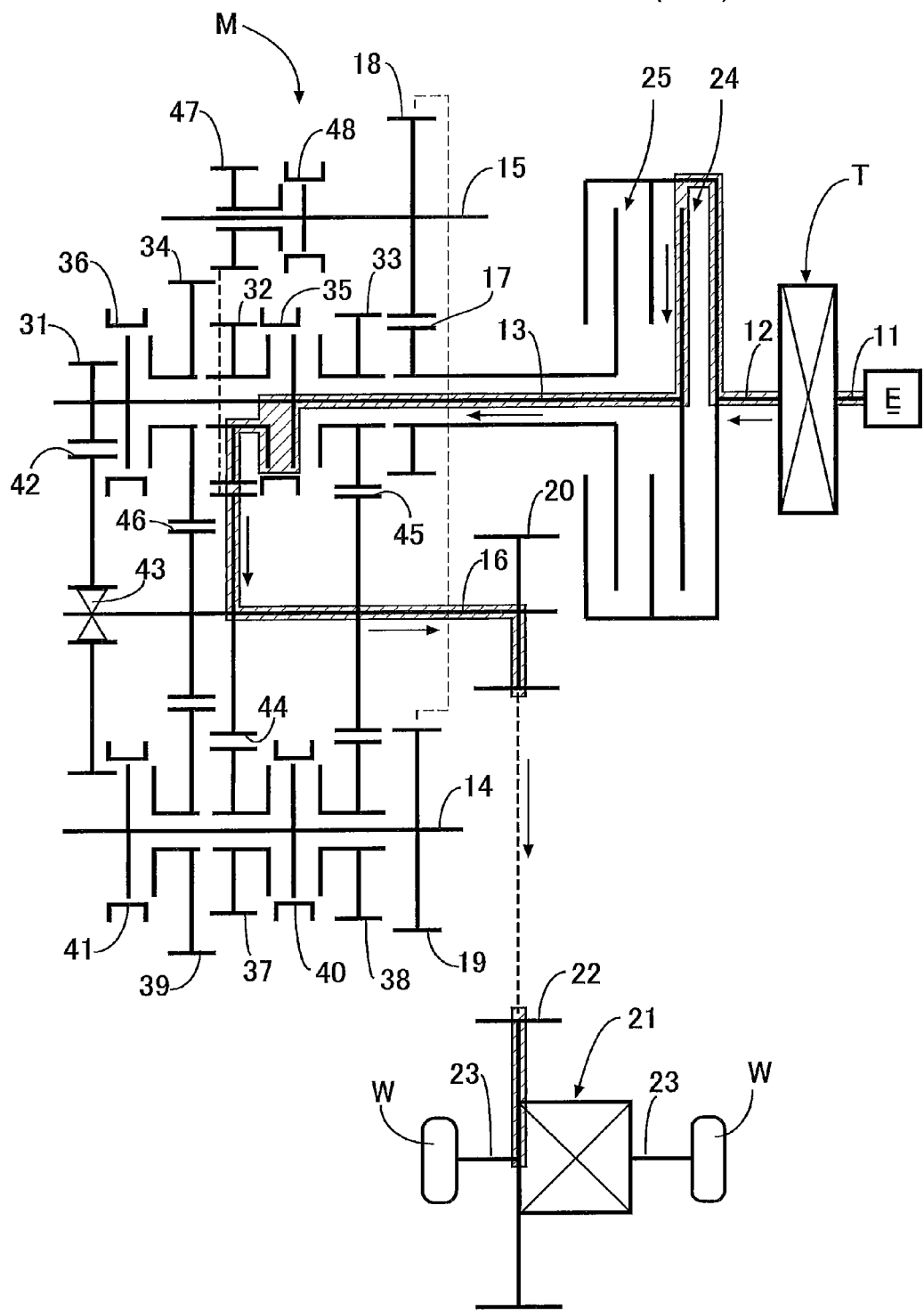
FIG. 73 is a diagram showing a state in which a third speed gear position is established. (twenty-seventh embodiment)

As shown in FIG. 73, when establishing the third speed gear position, the first clutch 24 is engaged so as to connect the main input shaft 12 to the first auxiliary input shaft 13, and the third speed drive gear 32 is connected to the first auxiliary input shaft 13 by means of the first synchronizing device 35. In this state, the driving force of the engine E is transmitted to the wheels W and W via the path: torque converter T→main input shaft 12→first clutch 24→first auxiliary input shaft 13→first synchronizing device 35→third speed drive gear 32→second speed-third speed-reverse driven gear 44→output shaft 16→final drive gear 20→final driven gear 22→differential gear 21→drive shafts 23 and 23.

Figure 74:
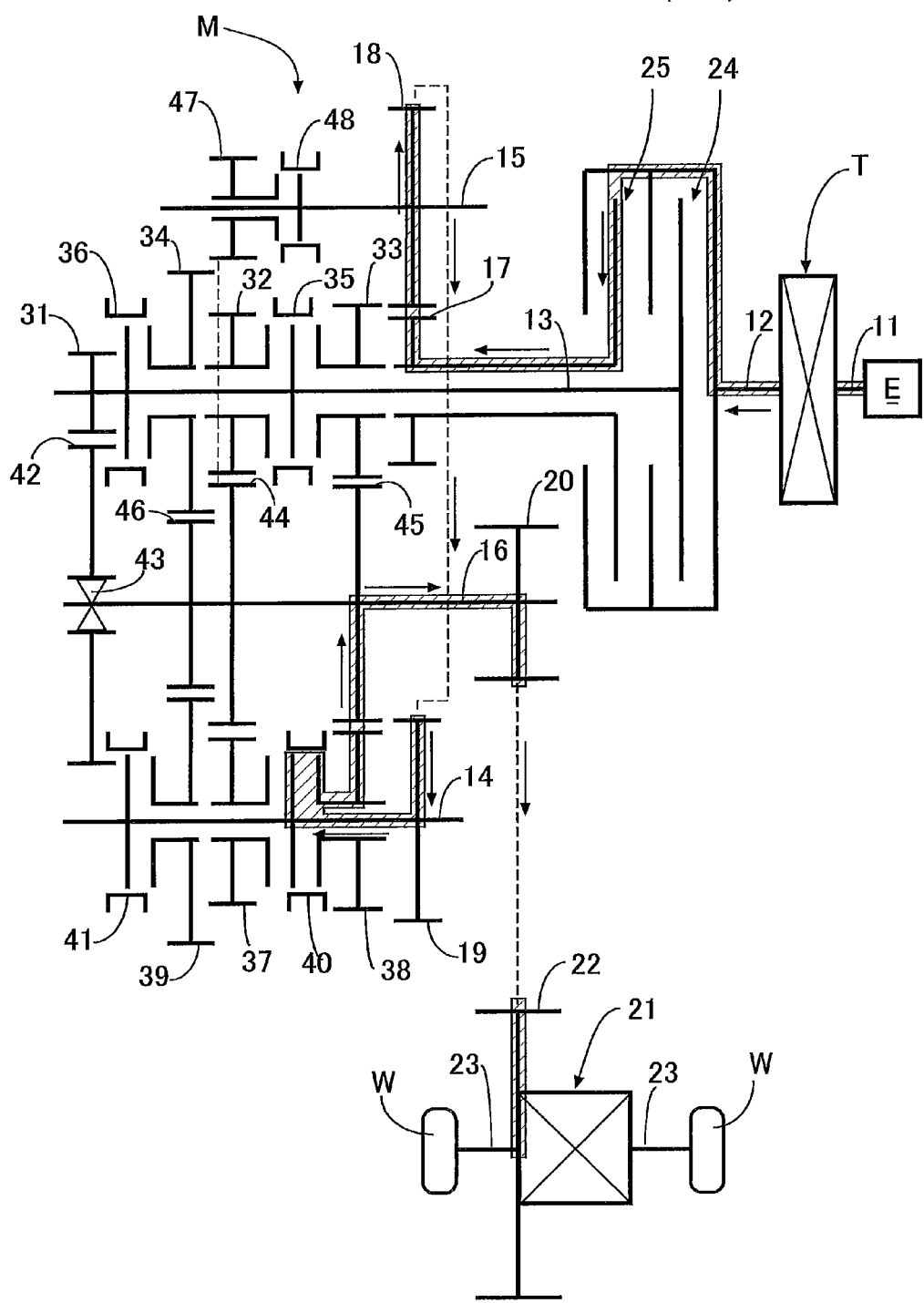
FIG. 74 is a diagram showing a state in which a fourth speed gear position is established. (twenty-seventh embodiment)

As shown in FIG. 74, when establishing the fourth speed gear position, the second clutch 25 is engaged so as to connect the main input shaft 12 to the idle drive gear 17, and the fourth speed drive gear 38 is connected to the second auxiliary input shaft 14 by means of the third synchronizing device 40. In this state, the driving force of the engine E is transmitted to the wheels W and W via the path: torque converter T→main input shaft 12→second clutch 25→idle drive gear 17→idle gear 18→idle driven gear 19→second auxiliary input shaft 14→third synchronizing device 40→fourth speed drive gear 38→fourth speed-fifth speed driven gear 45→output shaft 16→final drive gear 20→final driven gear 22→differential gear 21→drive shafts 23 and 23.

Figure 75:
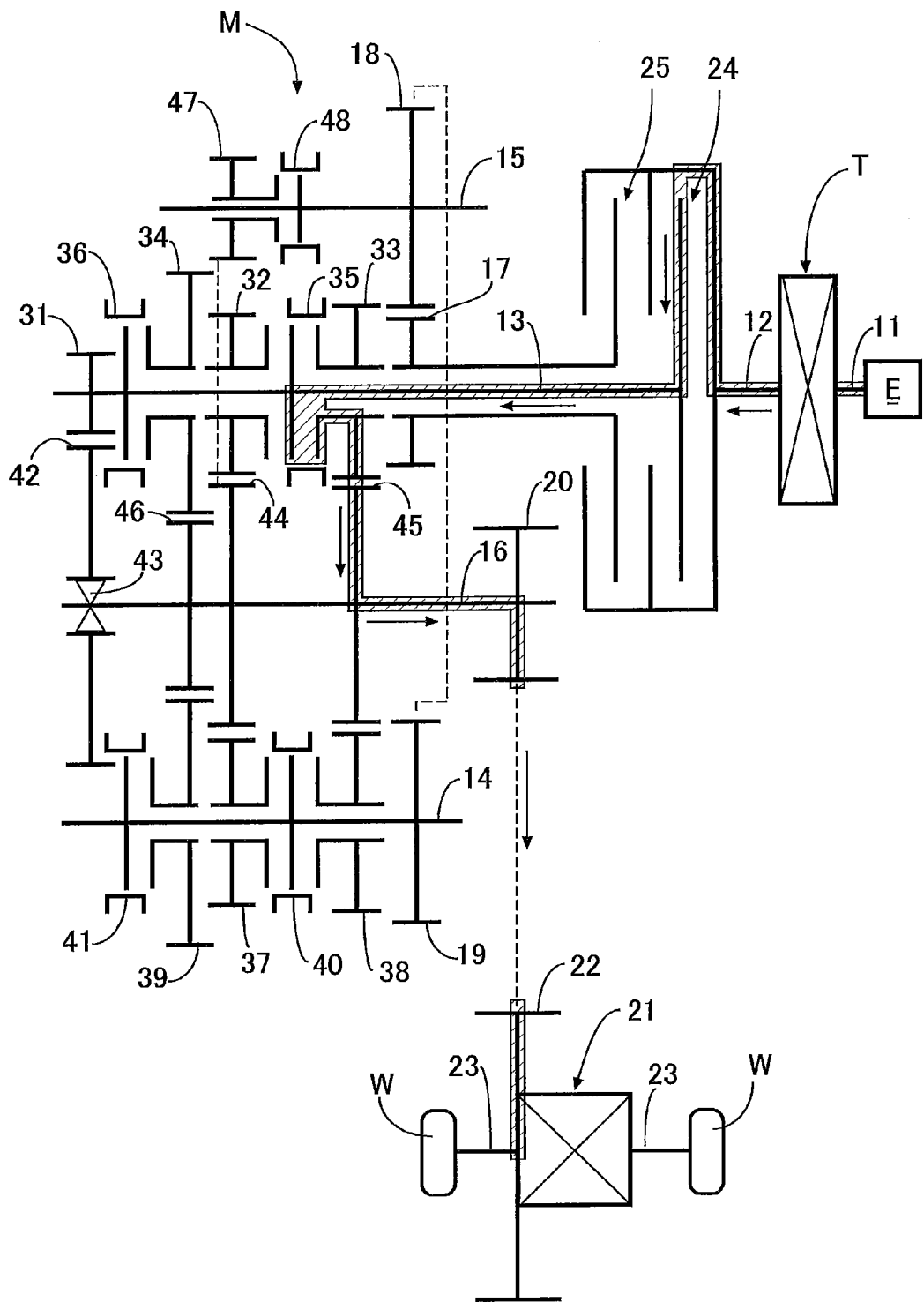
FIG. 75 is a diagram showing a state in which a fifth speed gear position is established. (twenty-seventh embodiment)

As shown in FIG. 75, when establishing the fifth speed gear position, the first clutch 24 is engaged so as to connect the main input shaft 12 to the first auxiliary input shaft 13, and the fifth speed drive gear 33 is connected to the first auxiliary input shaft 13 by means of the first synchronizing device 35. In this state, the driving force of the engine E is transmitted to the wheels W and W via the path: torque converter T→main input shaft 12→first clutch 24→first auxiliary input shaft 13→first synchronizing device 35→fifth speed drive gear 33→fourth speed-fifth speed driven gear 45→output shaft 16→final drive gear 20→final driven gear 22→differential gear 21→drive shafts 23 and 23.

Figure 76:
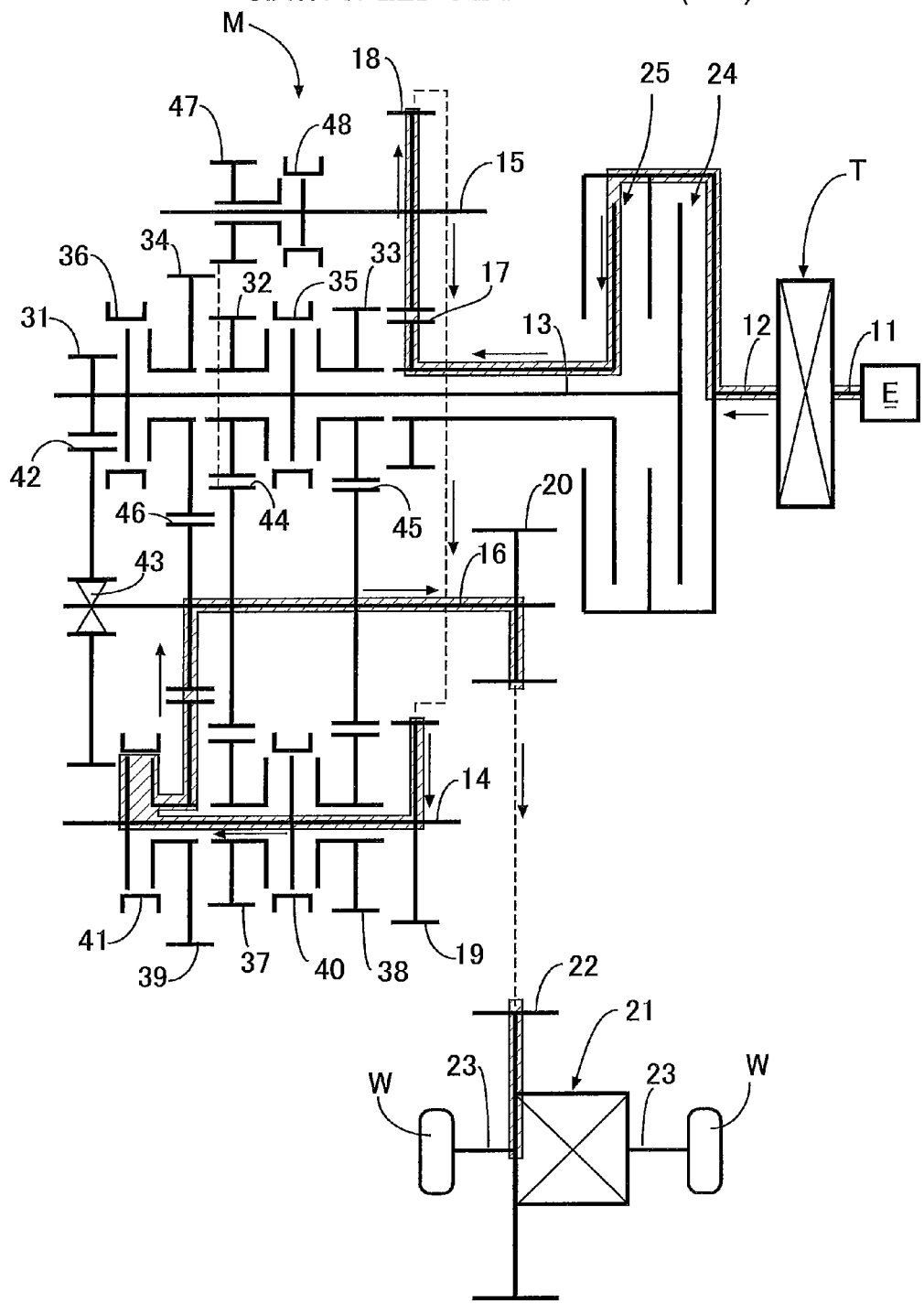
FIG. 76 is a diagram showing a state in which a sixth speed gear position is established. (twenty-seventh embodiment)

As shown in FIG. 76, when establishing the sixth speed gear position, the second clutch 25 is engaged so as to connect the main input shaft 12 to the idle drive gear 17, and the sixth speed drive gear 39 is connected to the second auxiliary input shaft 14 by means of the fourth synchronizing device 41. In this state, the driving force of the engine E is transmitted to the wheels W and W via the path: torque converter T→main input shaft 12→second clutch 25→idle drive gear 17→idle gear 18→idle driven gear 19→second auxiliary input shaft 14→fourth synchronizing device 41→sixth speed drive gear 39→sixth speed-seventh speed driven gear 46→output shaft 16→final drive gear 20→final driven gear 22→differential gear 21→drive shafts 23 and 23.

Figure 77:
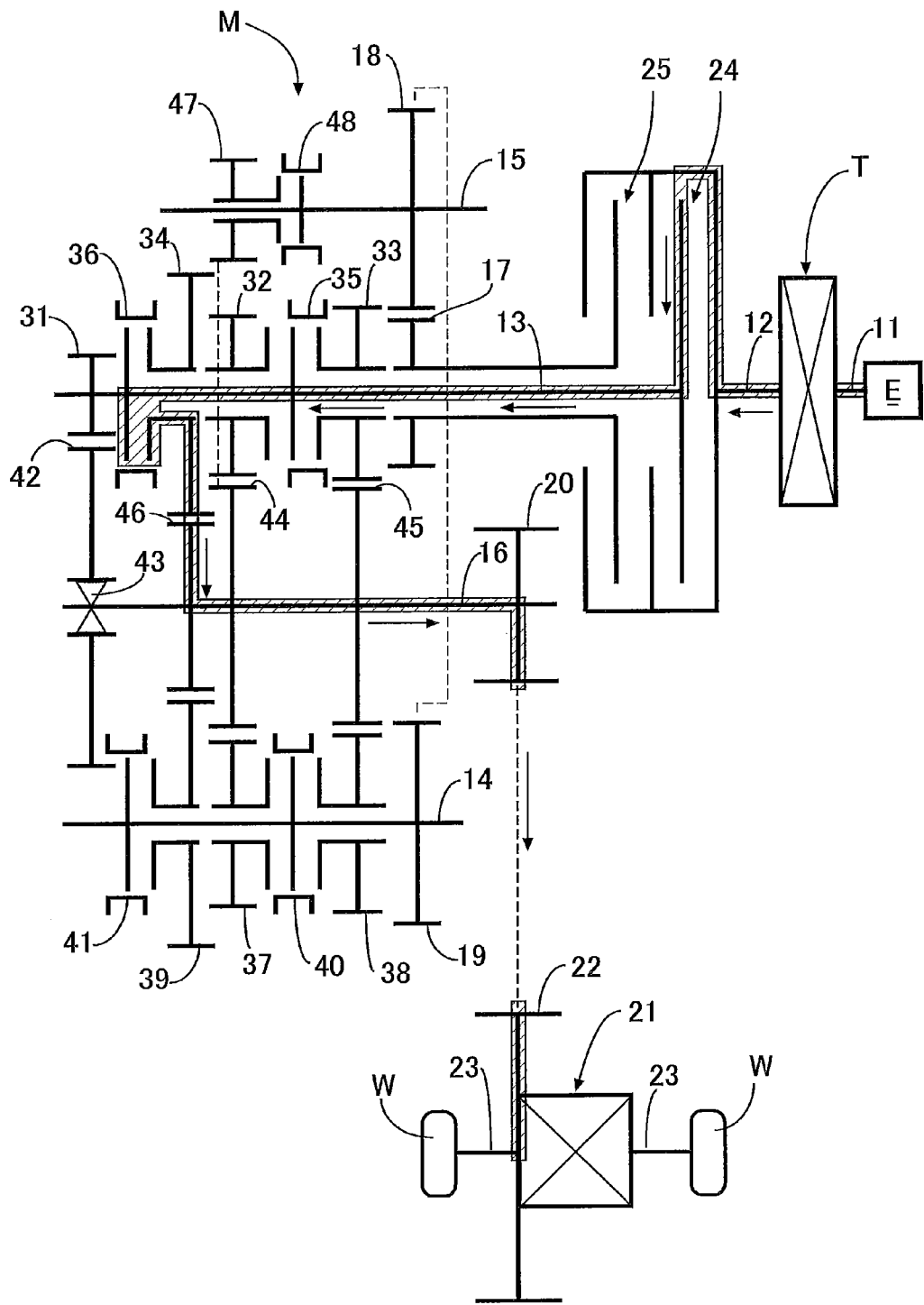
FIG. 77 is a diagram showing a state in which a seventh speed gear position is established. (twenty-seventh embodiment)

As shown in FIG. 77, when establishing the seventh speed gear position, the first clutch 24 is engaged so as to connect the main input shaft 12 to the first auxiliary input shaft 13, and the seventh speed drive gear 34 is connected to the first auxiliary input shaft 13 by means of the second synchronizing device 36. In this state, the driving force of the engine E is transmitted to the wheels W and W via the path: torque converter T→main input shaft 12→first clutch 24→first auxiliary input shaft 13→second synchronizing device 36→seventh speed drive gear 34→sixth speed-seventh speed driven gear 46→output shaft 16→final drive gear 20→final driven gear 22→differential gear 21→drive shafts 23 and 23.

Figure 78:
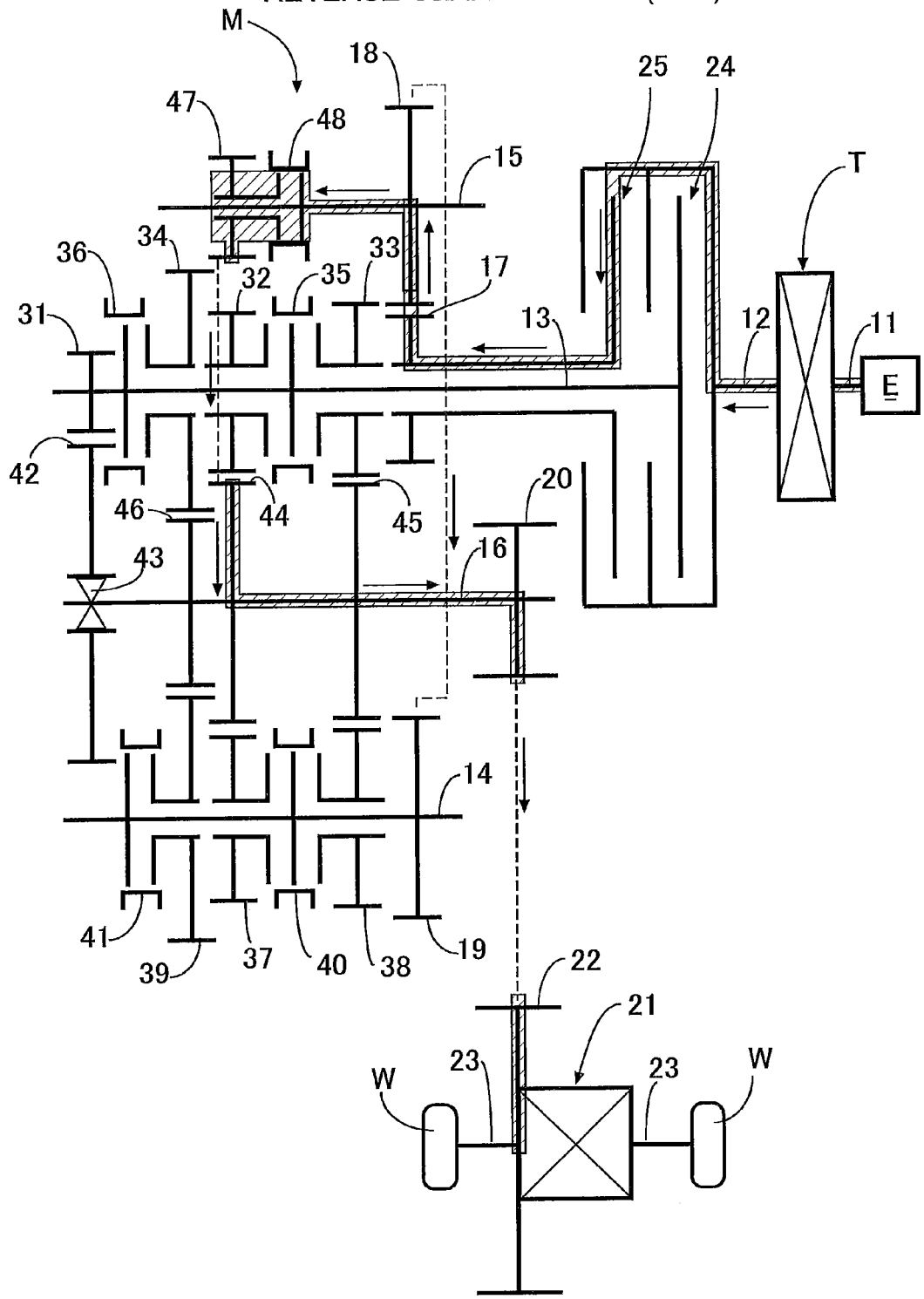
FIG. 78 is a diagram showing a state in which a reverse gear position is established. (twenty-seventh embodiment)

As shown in FIG. 78, when establishing the reverse gear position, the second clutch 25 is engaged so as to connect the main input shaft 12 to the idle drive gear 17, and the reverse gear 47 is connected to the idle shaft 15 by means of the dog clutch 48. In this state, the driving force of the engine E is transmitted to the wheels W and W as reverse rotation via the path: torque converter T→main input shaft 12→second clutch 25→idle drive gear 17→idle gear 18→idle shaft 15→reverse gear 47→second speed-third speed-reverse driven gear 44→output shaft 16→final drive gear 20→final driven gear 22→differential gear 21→drive shafts 23 and 23.

When establishing the third speed, fifth speed and seventh speed gear positions, the first clutch 24 is engaged so as to rotate the first auxiliary input shaft 13; the rotation is transmitted to the output shaft 16 via the third speed drive gear 32 and the second speed-third speed-reverse driven gear 44 when establishing the third speed gear position, is transmitted to the output shaft 16 via the fifth speed drive gear 33 and the fourth speed-fifth speed driven gear 45 when establishing the fifth speed gear position, and is transmitted to the output shaft 16 via the seventh speed drive gear 34 and the sixth speed-seventh speed driven gear 46 when establishing the seventh speed gear position. In this process, although there is a path for transmitting a driving force from the first auxiliary input shaft 13 to the output shaft 16 via the first speed drive gear 31, the first speed driven gear 42, and the one-way clutch 43, since the rotational speed of the output shaft 16 is higher than the rotational speed of the first speed driven gear 42, the one-way clutch 43 is maintained in a slipping state, and there is no problem in establishing the third speed, fifth speed, and seventh speed gear positions.

When establishing the second speed, fourth speed, and sixth speed gear positions, the first clutch 24 is disengaged, and the first auxiliary input shaft 13 is detached from the main input shaft 12. In this process, even if a driving force is likely to be transmitted back from the rotating output shaft 16 side to the first auxiliary input shaft 13 side via the one-way clutch 43, since the one-way clutch 43 slips, reverse transmission of the driving force does not occur, and an increase in friction due to dragging of the first auxiliary input shaft 13 is avoided. However, when establishing the reverse gear position, since the output shaft 16 rotates in the reverse direction to that when establishing the forward gear position, the driving force is transmitted back from the reversely rotating output shaft 16 side to the first auxiliary input shaft 13 side via the one-way clutch 43, but the time during which the reverse gear position is established is relatively short, and the increase in friction due to dragging of the first auxiliary input shaft 13 does not become a problem in practice.

As hereinbefore described, in accordance with the present embodiment, since the second speed-third speed-reverse driven gear 44 provided on the output shaft 16 is used in common for establishing the second speed gear position, the third speed gear position, and the reverse gear position, the fourth speed-fifth speed driven gear 45 provided on the output shaft 16 is used in common for establishing the fourth speed gear position and the fifth speed gear position, and the sixth speed-seventh speed driven gear 46 provided on the output shaft 16 is used in common for establishing the sixth speed gear position and the seventh speed gear position, due to the gears being used in common it becomes possible to cut the number of components and reduce the dimensions of the transmission M.

Moreover, since the first speed drive gear 31 fixedly provided on the first auxiliary input shaft 13 is meshed with the first speed driven gear 42 supported on the output shaft 16 via the one-way clutch 43, it becomes possible to establish the first speed gear position without requiring a synchronizing device, thus increasing the number of forward gear positions while avoiding any increase in the dimensions of the transmission M.

Furthermore, since the idle gear 18 is fixedly provided on the idle shaft 15, and the driving force of the main input shaft 12 is transmitted to the second auxiliary input shaft 14 via the second clutch 25, the idle drive gear 17, the idle gear 18, and the idle driven gear 19, selecting the numbers of teeth for the idle drive gear 17, the idle gear 18, and the idle driven gear 19 enables the rotational speed ratio of the first auxiliary input shaft 13 and the second auxiliary input shaft 14 to be set freely.

Moreover, since the idle gear 18 for transmitting the driving force of the main input shaft 12 to the second auxiliary input shaft 14 and the reverse gear 47 for establishing the reverse gear position are supported by utilizing the common idle shaft 15, compared with a case in which an idle gear 18 and a reverse gear 47 are each supported on separate shafts, it is possible to reduce the dimensions of the automatic transmission M.

The twenty-seventh embodiment of the present invention is explained above, but the present invention may be modified in a variety of ways as long as the modifications do not depart from the spirit and scope thereof.

For example, the automatic transmission M of the twenty-seventh embodiment includes the torque converter T, but when a further reduction in the axial dimension is required, the torque converter T can be eliminated.

Furthermore, in the twenty-seventh embodiment the automatic transmission M is illustrated, but an automated manual clutch may be provided at the position for the torque converter T.

Moreover, in the twenty-seventh embodiment, the idle gear 18 is fixed on the idle shaft 15 and the reverse gear 47 is relatively rotatably supported, but the reverse gear 47 may be fixed and the idle gear 18 may be relatively rotatably supported.

Furthermore, the first and second clutches 24 and 25 may be used as starting clutches as well as gear clutches.

Moreover, the first and second clutches 24 and 25 are not limited to multiple plate wet clutches and may be dry clutches.

Furthermore, instead of engagement of the first speed driven gear 42 with the output shaft 16 and disengagement therefrom by the one-way clutch 43, the first speed drive gear 31 may be engaged with the first auxiliary input shaft 13 and disengaged therefrom by means of a synchronizing device.

The invention claimed is:

1. A transmission comprising
   a main input shaft into which driving force of an engine is inputted,
   a first auxiliary input shaft disposed coaxially with the main input shaft and selectively connected to the main input shaft via a first clutch,
   a second auxiliary input shaft disposed in parallel to the main input shaft and selectively connected to the main input shaft via a second clutch,
   an output shaft disposed in parallel to the main input shaft and transmitting the driving force to a driven wheel,
   an idle shaft disposed in parallel to the main input shaft and supporting a reverse idle gear,
   a first gear group comprising a plurality of gears disposed on the first auxiliary input shaft and selectively connected to the first auxiliary input shaft via a synchronizing device,
   a second gear group comprising a plurality of gears disposed on the second auxiliary input shaft and selectively connected to the second auxiliary input shaft via a synchronizing device, and
   a third gear group comprising a plurality of gears connected to the output shaft and meshing with the gears of the first gear group and the gears of the second gear group,
   the gears of the third gear group being used in common by the gears of the first gear group and the gears of the second gear group, and an idle gear for transmitting the driving force from the main input shaft to the second auxiliary input shaft being supported on the idle shaft, and
   the reverse idle gear supported on the idle shaft directly meshes with one of the plurality of gears of the third gear group.

2. The transmission according to claim 1, wherein the first clutch is disposed on the first auxiliary input shaft, the second clutch is disposed on the second auxiliary input shaft, and the second clutch transmits the driving force of the main input shaft to the second auxiliary input shaft via the idle gear.

3. The transmission according to claim 2, wherein the first and second clutches are disposed on end parts, on the opposite side to the engine, of the first and second auxiliary input shafts.

4. The transmission according to any one of claim 1 to claim 3, wherein said reverse idle gear is a first reverse idle gear and a second reverse idle gear is supported on the idle shaft and meshing with a gear fixedly provided on the first auxiliary input shaft, and either one of the first and second reverse idle gears freely engages with and disengages from the idle shaft.

5. The transmission according to claim 4, wherein the first reverse idle gear meshes, among the gears of the third gear group, with a gear at the lowest gear position.

6. The transmission according to claim 1, wherein a main clutch is disposed between the main input shaft and the first and second clutches, and a motor/generator is connected in a power transmission path from the main clutch to the first and second clutches.

\* \* \* \* \*